United States Patent
Jamison et al.

(10) Patent No.: US 11,255,189 B2
(45) Date of Patent: Feb. 22, 2022

(54) METHODS TO CHARACTERIZE SUBTERRANEAN FLUID COMPOSITION AND ADJUST OPERATING CONDITIONS USING MEMS TECHNOLOGY

(71) Applicant: Halliburton Energy Services, Inc., Houston, TX (US)

(72) Inventors: Dale E. Jamison, Humble, TX (US); William Walter Shumway, Spring, TX (US); Preston Andrew May, Porter, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/879,170

(22) Filed: May 20, 2020

(65) Prior Publication Data

US 2021/0363872 A1 Nov. 25, 2021

(51) Int. Cl.
*E21B 49/08* (2006.01)
*E21B 43/16* (2006.01)
*G01V 15/00* (2006.01)

(52) U.S. Cl.
CPC .............. *E21B 49/08* (2013.01); *E21B 43/16* (2013.01); *E21B 49/0875* (2020.05); *G01V 15/00* (2013.01)

(58) Field of Classification Search
CPC ...... E21B 49/08; E21B 49/0875; E21B 43/16; E21B 49/10
See application file for complete search history.

(56) References Cited

U.S. PATENT DOCUMENTS

| | | | |
|---|---|---|---|
| 4,491,524 | A | 1/1985 | Gutierrez et al. |
| 4,635,735 | A | 1/1987 | Crownover |
| 5,045,219 | A | 9/1991 | Trahan et al. |
| 5,719,324 | A | 2/1998 | Thundat et al. |
| 5,780,727 | A | 7/1998 | Gimzewski et al. |
| 5,822,473 | A | 10/1998 | Magel et al. |

(Continued)

FOREIGN PATENT DOCUMENTS

TW 273222 B 2/2007

OTHER PUBLICATIONS

Filing Receipt, Specification and Drawings for U.S. Appl. No. 16/670,886, filed Oct. 31, 2019, entitled "Focused Formation Sampling Method and Apparatus," 76 pages.

(Continued)

*Primary Examiner* — Robert E Fuller
(74) *Attorney, Agent, or Firm* — Conley Rose, P.C.; Rodney B. Carroll

(57) ABSTRACT

A method includes determining a concentration of one or more components of a subterranean fluid, and adjusting or maintaining at least one operating parameter of a wellbore servicing operation based on the determining of the concentration of the one or more components. The subterranean fluid includes a fluid obtained from a subterranean formation during the wellbore servicing operation, and the determining of the concentration of the one or more components includes contacting a sample of the subterranean fluid with a microelectromechanical system (MEMS) device to provide a sample response indicative of the concentration of the one or more components.

20 Claims, 14 Drawing Sheets

(56) References Cited

U.S. PATENT DOCUMENTS

| | | | |
|---|---|---|---|
| 5,925,822 A | 7/1999 | Naughton | |
| 6,176,323 B1 | 1/2001 | Weirich et al. | |
| 6,402,302 B1 | 6/2002 | Ozaki et al. | |
| 6,457,360 B1 | 10/2002 | Daraktchiev et al. | |
| 6,664,540 B2 | 12/2003 | Shimizu et al. | |
| 6,925,392 B2 | 8/2005 | McNeil, III et al. | |
| 7,003,439 B2 | 2/2006 | Aldred et al. | |
| 7,044,239 B2 | 5/2006 | Pinckard et al. | |
| 7,392,697 B2 | 7/2008 | Chikenji et al. | |
| 7,434,457 B2 | 10/2008 | Goodwin et al. | |
| 7,458,257 B2 | 12/2008 | Pop et al. | |
| 7,595,876 B2 | 9/2009 | DiFoggio | |
| 7,687,108 B2 | 3/2010 | Xu et al. | |
| 7,712,527 B2 | 5/2010 | Roddy | |
| 7,748,266 B2 | 7/2010 | Evrard et al. | |
| 7,814,782 B2 | 10/2010 | DiFoggio | |
| 8,065,907 B2 | 11/2011 | Colquhoun | |
| 8,297,353 B2 | 10/2012 | Roddy et al. | |
| 8,302,686 B2 | 11/2012 | Roddy et al. | |
| 8,316,936 B2 | 11/2012 | Roddy et al. | |
| 8,513,042 B2 | 8/2013 | Perruchot et al. | |
| 8,527,249 B2 | 9/2013 | Jamison et al. | |
| 8,528,396 B2 | 9/2013 | Wu et al. | |
| 8,542,365 B2 | 9/2013 | Pruessner et al. | |
| 8,542,353 B2 | 11/2013 | Christian et al. | |
| 8,575,541 B1 | 11/2013 | Jamison et al. | |
| 8,684,109 B2 | 4/2014 | Orbell et al. | |
| 8,848,197 B2 | 9/2014 | Pruessner et al. | |
| 8,904,859 B2 | 12/2014 | Lawrence et al. | |
| 9,000,358 B2 | 4/2015 | Jamison et al. | |
| 9,103,195 B2 | 8/2015 | Gawski et al. | |
| 9,335,271 B2 | 5/2016 | Pruessner et al. | |
| 9,335,438 B2 | 5/2016 | Jamison et al. | |
| 9,359,882 B2 | 6/2016 | Snyder | |
| 9,518,434 B1 | 12/2016 | Champness et al. | |
| 9,547,968 B2 | 1/2017 | Adams et al. | |
| 9,567,852 B2 | 2/2017 | Jamison et al. | |
| 9,922,517 B2 | 3/2018 | Adams et al. | |
| 10,358,914 B2 | 7/2019 | Roberson et al. | |
| 10,442,986 B2 * | 10/2019 | He | C09K 8/602 |
| 10,453,321 B2 | 10/2019 | Adams et al. | |
| 11,060,400 B1 | 7/2021 | Jamison et al. | |
| 2002/0103630 A1 | 8/2002 | Aldred et al. | |
| 2002/0194906 A1 | 12/2002 | Goodwin et al. | |
| 2004/0045350 A1 | 3/2004 | Jones et al. | |
| 2004/0097002 A1 | 5/2004 | Pogge et al. | |
| 2004/0201012 A1 | 10/2004 | Faris | |
| 2005/0087336 A1 | 4/2005 | Surjaatmadja et al. | |
| 2005/0241382 A1 | 11/2005 | Coenen | |
| 2007/0033990 A1 | 2/2007 | Grey et al. | |
| 2008/0283294 A1 | 11/2008 | Colquhoun | |
| 2009/0120168 A1 | 5/2009 | Harrison et al. | |
| 2009/0250264 A1 | 10/2009 | Dupriest | |
| 2009/0320892 A1 | 12/2009 | Xu et al. | |
| 2010/0025784 A1 | 2/2010 | Desai et al. | |
| 2010/0133008 A1 | 6/2010 | Gawski et al. | |
| 2010/0192684 A1 | 8/2010 | Wu et al. | |
| 2010/0238454 A1 | 9/2010 | Pruessner et al. | |
| 2011/0052116 A1 | 3/2011 | Boersma | |
| 2011/0107852 A1 | 5/2011 | Edwards | |
| 2011/0192592 A1 | 8/2011 | Roddy et al. | |
| 2011/0192594 A1 | 8/2011 | Roddy et al. | |
| 2011/0192597 A1 | 8/2011 | Roddy et al. | |
| 2011/0203845 A1 | 8/2011 | Jamison et al. | |
| 2012/0013335 A1 | 1/2012 | Saasen et al. | |
| 2012/0024602 A1 | 2/2012 | Larson | |
| 2012/0056308 A1 | 3/2012 | Perruchot et al. | |
| 2012/0092175 A1 | 4/2012 | Adams et al. | |
| 2012/0145456 A1 | 6/2012 | Rowden | |
| 2012/0304758 A1 | 12/2012 | Kumar | |
| 2013/0089465 A1 | 4/2013 | Lazzarino et al. | |
| 2013/0119489 A1 | 5/2013 | Chang et al. | |
| 2013/0153296 A1 | 6/2013 | Aphale et al. | |
| 2013/0174642 A1 | 7/2013 | Bourlon et al. | |
| 2013/0192360 A1 | 8/2013 | Jamison et al. | |
| 2013/0213647 A1 | 8/2013 | Roddy et al. | |
| 2013/0030232 A1 | 12/2013 | Pruessner et al. | |
| 2013/0332089 A1 | 12/2013 | Kulkarni et al. | |
| 2014/0166361 A1 | 6/2014 | Jamison et al. | |
| 2014/0172177 A1 | 6/2014 | Jamison et al. | |
| 2014/0202689 A1 | 7/2014 | Walton et al. | |
| 2014/0238114 A1 | 8/2014 | Klasner | |
| 2014/0262510 A1 | 9/2014 | Beddoes et al. | |
| 2014/0291240 A1 | 10/2014 | Scheide | |
| 2014/0367092 A1 | 12/2014 | Roberson et al. | |
| 2015/0066371 A1 | 3/2015 | Brannigan et al. | |
| 2015/0211350 A1 * | 7/2015 | Norman | E21B 21/00 700/275 |
| 2015/0268374 A1 | 9/2015 | Rapoport | |
| 2016/0040524 A1 | 2/2016 | Ravi et al. | |
| 2016/0108687 A1 | 4/2016 | Rapoport | |
| 2016/0252454 A1 | 9/2016 | Zuo et al. | |
| 2016/0290131 A1 * | 10/2016 | Mitchell | E21B 49/087 |
| 2016/0312551 A1 | 10/2016 | Rowe et al. | |
| 2016/0315090 A1 | 10/2016 | Fox et al. | |
| 2016/0362972 A1 | 12/2016 | Dykstra et al. | |
| 2017/0069187 A1 | 3/2017 | Adams et al. | |
| 2017/0159370 A1 | 6/2017 | Evans et al. | |
| 2017/0167255 A1 * | 6/2017 | Zhang | G01N 1/14 |
| 2017/0299584 A1 * | 10/2017 | Adams | G01N 29/4418 |
| 2017/0343969 A1 | 11/2017 | Dykstra et al. | |
| 2017/0356282 A1 | 12/2017 | Close et al. | |
| 2018/0010446 A1 | 1/2018 | Roberson | |
| 2018/0010449 A1 | 1/2018 | Roberson et al. | |
| 2018/0023355 A1 | 1/2018 | Teodorescu et al. | |
| 2018/0030824 A1 | 2/2018 | Roberson et al. | |
| 2018/0082090 A1 | 3/2018 | Roberson et al. | |
| 2018/0174418 A1 | 6/2018 | Adams et al. | |
| 2019/0016939 A1 | 1/2019 | Tripuraneni et al. | |
| 2019/0178059 A1 | 6/2019 | Zheng et al. | |
| 2019/0226336 A1 | 7/2019 | Benson et al. | |
| 2019/0227048 A1 | 7/2019 | Ye et al. | |
| 2019/0309613 A1 | 10/2019 | Jamison et al. | |
| 2019/0376386 A1 | 12/2019 | Wright et al. | |
| 2020/0003046 A1 | 1/2020 | Zheng et al. | |
| 2020/0166478 A1 | 5/2020 | Mohr et al. | |
| 2020/0362694 A1 | 11/2020 | Al-Rubaii et al. | |
| 2020/0362695 A1 | 11/2020 | Al-Rubaii et al. | |
| 2020/0371084 A1 | 11/2020 | Havenga et al. | |
| 2021/0148215 A1 | 5/2021 | Jamison et al. | |

OTHER PUBLICATIONS

Electronic Filing Acknowledgement Receipt, Specification and Drawings for U.S. Appl. No. 16/879,167, filed May 20, 2020, entitled "Methods to Characterize Wellbore Fluid Composition and Provide Optimal Additive Dosing Using MEMS Technology," 57 pages.

Filing Receipt, Specification and Drawings for U.S. Appl. No. 16/879,172, filed May 20, 2020, entitled "Methods to Activate Downhole Tools," 57 pages.

Office Action dated Sep. 9, 2020 (20 pages), U.S. Appl. No. 16/879,172, filed May 20, 2020.

Foreign Communication from Related Application—International Search Report and Written Opinion of the International Searching Authority, International Application No. PCT/US2020/034694, dated Oct. 20, 2020, 11 pages.

Office Action dated Oct. 26, 2020 (14 pages), U.S. Appl. No. 16/879,172, filed May 20, 2020.

Office Action dated Dec. 17, 2020 (38 pages), U.S. Appl. No. 16/879,167, filed May 20, 2020.

Battiston, F.M. et al., "A chemical sensor based on a microfabricated cantilever array with simultaneous resonance-frequency and bending readout", Sensors and Actuators, 2001, pp. 122-131, vol. B, No. 77, Elsevier Science, B.V.

Joshi, Priyanka et al., "Distributed MEMS Mass-Sensor Based on Piezoelectric Resonant Micro-Cantilevers," Journal of Microelectromechanical System, Jun. 2019, pp. 382-389, vol. 28, No. 3, IEEE.

Norouzi, Maziar et al., "Design of Piezoelectric Microcantilever Chemical Sensors in Comsol Multiphysics Area," Islamic Azad University, 2009, pp. 184-188.

(56) References Cited

OTHER PUBLICATIONS

Redburn, H. et al., "Field Lubricity Measurements Corrilate with Improved Performance of Novel Water-Based Drilling Fluid," 11th Offshore Mediterranean Conference and Exhibition, Mar. 2013, 13 pages, OMC.
Vos, Bart E. et al., "The Benefits of Monitoring Torque & Drag in Real Time," IADC/SPE Pacific Drilling Technology Conference, Sep. 2000, 8 pages, IADC/SPE Asia Pacific Drilling Technology.
Advisory Action dated Dec. 16, 2020 (3 pages), U.S. Appl. No. 16/879,172, filed May 20, 2020.
Office Action dated Jan. 1, 2021 (23 pages) U.S. Appl. No. 16/879,172, filed May 20, 2020.
Foreign Communication from Related Application—International Search Report and Written Opinion of the International Searching Authority, International Application No. PCT/US20201034692, dated Feb. 2, 2021, 13 pages.
Foreign Communication from Related Application—International Search Report and Written Opinion of the International Searching Authority, International Application No. PCT/US2020/034693, dated Feb. 10, 2021, 10 pages.
Zhao, Libo et al., "A MEMS Resonant Sensor to Measure Fluid Density and Viscosity under Flexural and Torsional Vibrating Modes," Sensors, 2016, vol. 16, MDPI, 15 pages.
Final Office Action dated Mar. 23, 2021 (36 pages), U.S. Appl. No. 16/879,167, filed May 20, 2020.
Office Action dated May 6, 2021 (18 pages), U.S. Appl. No. 16/879,167, filed May 20, 2020.
Final Office Action dated Jun. 7, 2021 (25 pages), U.S. Appl. No. 16/879,167, filed May 20, 2020.
Office Action dated Aug. 4, 2021 (21 pages), U.S. Appl. No. 16/879,167 filed May 20, 2020.
Notice of Allowance and Fees Due (9 pages), dated Oct. 21, 2021, U.S. Appl. No. 16/879,167, filed May 20, 2020.

* cited by examiner

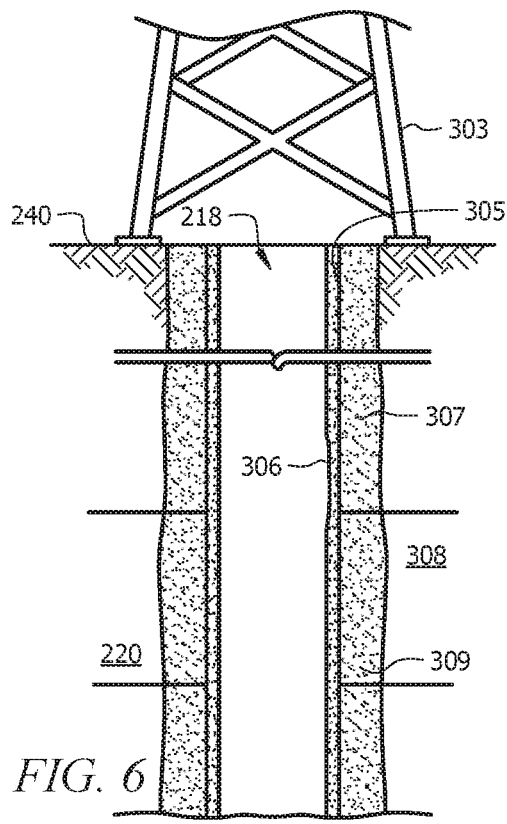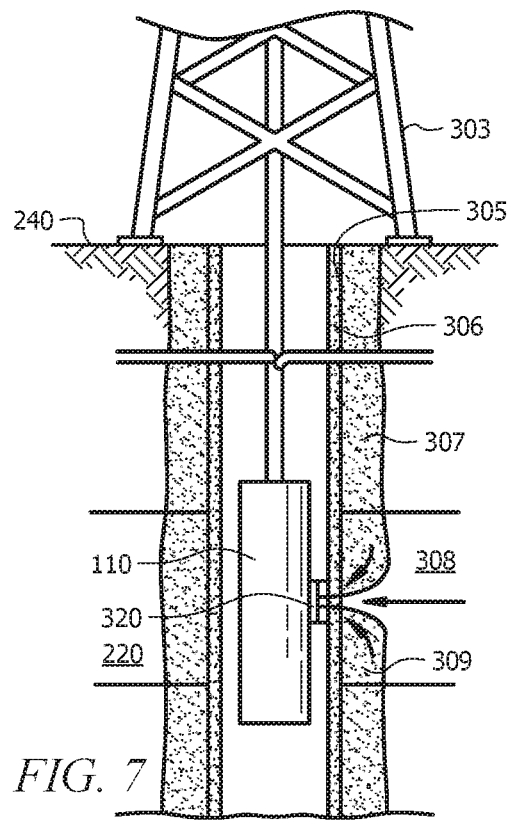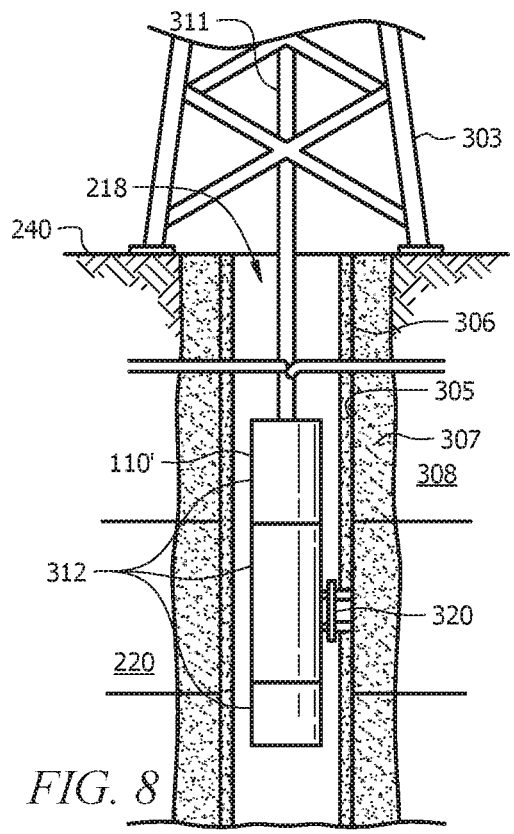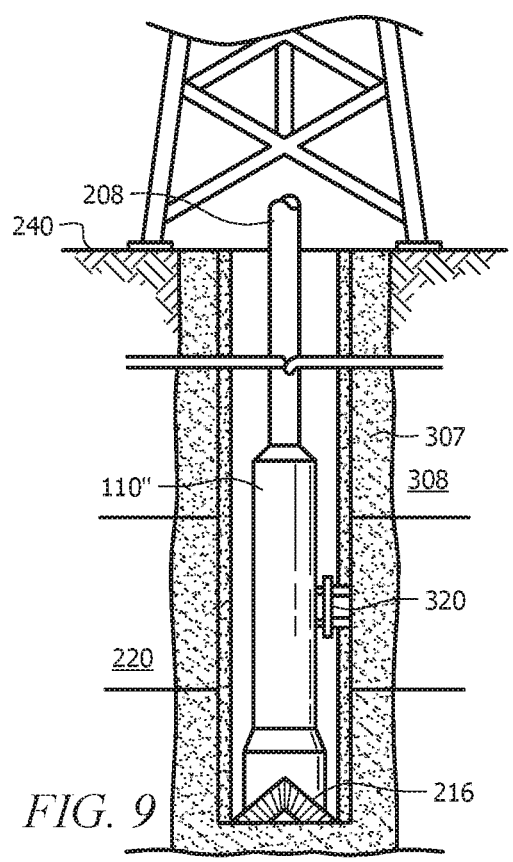

---

METHODS TO CHARACTERIZE SUBTERRANEAN FLUID COMPOSITION AND ADJUST OPERATING CONDITIONS USING MEMS TECHNOLOGY

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to methods of servicing a wellbore. More specifically, it relates to wellbore servicing methods including determining a concentration of one or more components of a subterranean fluid during a wellbore servicing operation via a microelectromechanical ("MEMS") device.

BACKGROUND

Natural resources such as gas, oil, and water residing in a subterranean formation or zone are usually recovered by drilling a wellbore down to the subterranean formation while circulating a drilling fluid in the wellbore. During drilling or other wellbore servicing operations, the composition of a drilling fluid, also commonly known as "mud", or another wellbore servicing fluid can change from an expected composition thereof, and such a change can be indicative of a variety of downhole events. Furthermore, it is desirable to know the composition of various subterranean fluids, e.g., formation fluids, produced fluids, and the like. Accordingly, it is desirable to provide systems and methods for determining a concentration of one or more components of a subterranean fluid, such that a composition of a drilling fluid or the other wellbore servicing fluid being introduced into the wellbore and/or an operational parameter of the wellbore servicing operation can be adjusted or maintained based on the determining of the concentration of the one or more components.

BRIEF SUMMARY OF THE DRAWINGS

For a more complete understanding of this disclosure, reference is now made to the following brief description, taken in connection with the accompanying drawings and detailed description, wherein like reference numerals represent like parts.

FIG. 6 is a schematic view of a subsurface formation penetrated by a wellbore lined with mudcake, depicting the clean or virgin fluid in the subsurface formation;

FIG. 7 is a schematic view of a downhole tool positioned in the wellbore of FIG. 6 with a component such as a probe extending to the formation, depicting a possible flow of contaminated and virgin fluid into a downhole sampling tool;

FIG. 8 is a schematic view of downhole wireline tool including a focused fluid sampling device, according to embodiments of this disclosure;

FIG. 9 is a schematic view of a downhole drilling tool including a focused fluid sampling device, according to embodiments of this disclosure;

DETAILED DESCRIPTION

Figure 1:
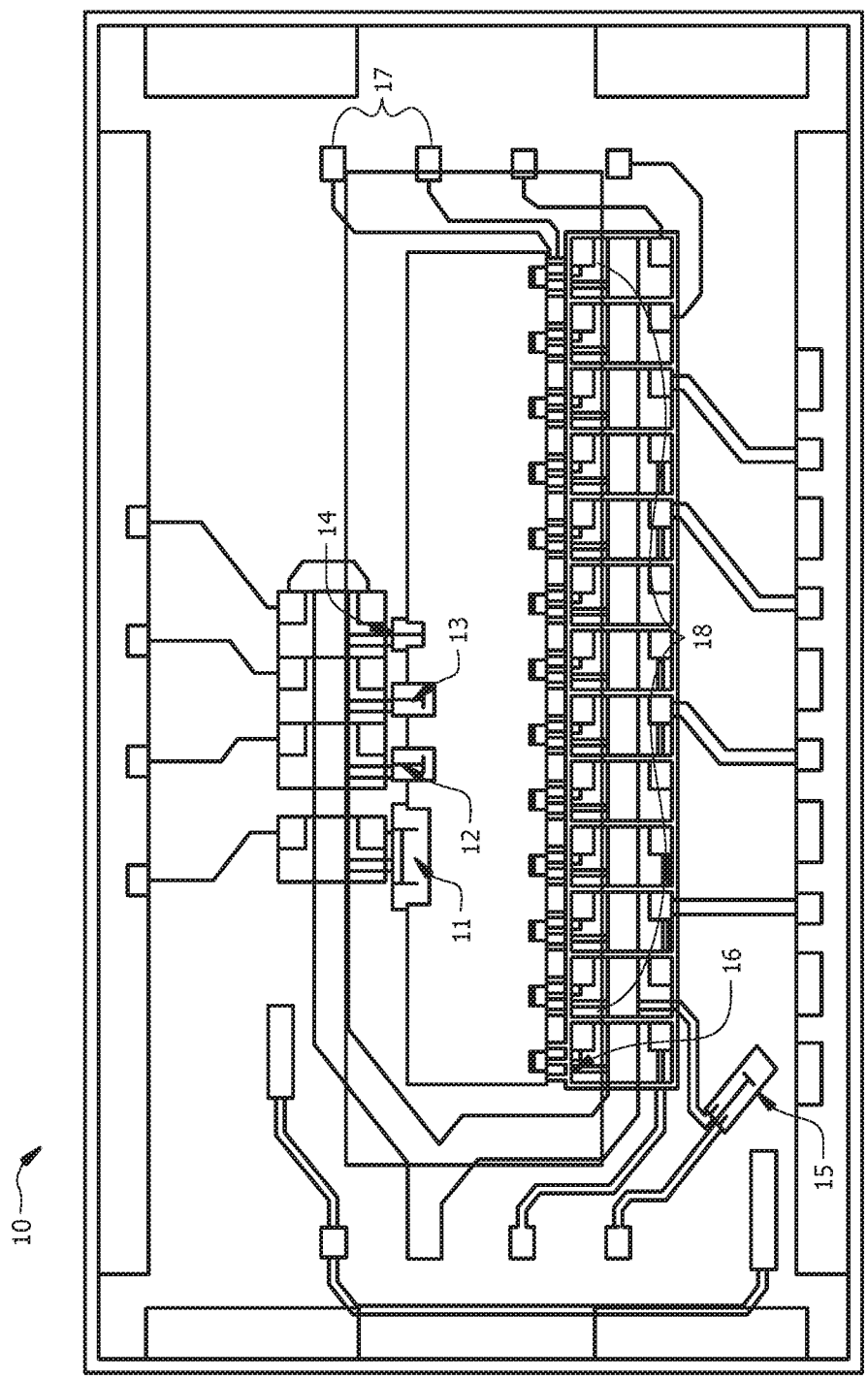
FIG. 1 is a schematic of a sensor or "molecular property spectrometer (MPS)" chip suitable for use in the method of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The terms "focused sampling" and "focused formation sampling" are utilized interchangeably herein and can refer to sampling of formation by manipulating the location of clean and contaminated formation fluid in the region of the formation in which the sampling is performed.

The terms "formation tester", "sampling device", "focused sampling device", "sampling system" and "focused sampling system" 330 (e.g., 330A-330F in FIGS. 10 and 12-16, respectively, described hereinbelow) are utilized interchangeably herein.

The term "formation" as utilized herein includes a subsurface formation, a subterranean formation, and a subsea formation.

As utilized herein, the terms 'virgin fluid', 'acceptable virgin fluid', 'uncontaminated fluid', 'virgin sample', and the like are utilized to indicate a subsurface fluid that is pure, pristine, connate, uncontaminated, unadulterated, or otherwise considered in the fluid sampling and analysis field to be sufficiently or acceptably representative (e.g., to have a purity above a desired level and/or a level of contaminants below a desired level) of a given formation for valid hydrocarbon sampling and/or evaluation. A virgin fluid can be representative of the composition of unadulterated formation fluid under ambient formation conditions. As utilized herein, therefore, the "purity" indicates a degree to which a fluid (e.g., a composition thereof) approaches the virgin fluid (e.g., a composition thereof), and "contamination" and "contaminants" relate to components of a fluid not present in the virgin formation fluid and/or present in the fluid at a level above a level thereof in the virgin formation fluid. That is, as utilized herein, a "pure" fluid has a composition of the virgin formation fluid.

As utilized herein, "flow rate" can refer to volumetric flow rate (e.g., $cm^3/s$).

A descriptor numeral can be utilized generically herein to refer to any embodiment of that component. For example, as detailed hereinbelow with reference to FIG. 5, generic reference to a "MEMS device 40" can indicate any MEMS device 40, such as a MEMS device 40A configured for analyzing a sample 224A of subterranean fluid 224 (e.g., returned wellbore servicing fluid (WSF) 229) uphole from a mud pit inlet line 225, a MEMS device 40B configured for analyzing a sample 224A of subterranean fluid 224 (e.g., returned WSF 229) uphole from a mud pit outlet line 227, a MEMS device 40C configured for analyzing a sample 224A of subterranean fluid 224 (e.g., returned WSF 229) uphole from a feed pipe 226, and/or a MEMS device 40D configured for analyzing a sample 224A of subterranean fluid 224 (e.g., a sample (e.g., a focused or partially focused sample) of formation fluid) downhole, e.g., via a bottom hole assembly (BHA) 248 and/or for analyzing a sample 224A of subterranean fluid 224 (e.g., returned WSF 229) from an annulus 228, e.g., via BHA 248. By way of further example, a downhole tool 110 (also referred to as a sampling downhole tool, a formation tester, or sampling tool) can refer to a downhole tool 110 as depicted and described with reference to FIG. 6 and FIG. 7, a downhole tool 110' as depicted and described with reference to FIG. 8, a downhole tool 110" as depicted and described with reference to FIG. 9, a downhole tool 110A as depicted and described with reference to FIG. 10, a downhole tool 110B as depicted and described with reference to FIG. 12, a downhole tool 110C as depicted and described with reference to FIG. 13, a downhole tool 110D as depicted and described with reference to FIG. 14, a downhole tool 110E as depicted and described with reference to FIG. 15, or a downhole tool 110F as depicted and described with reference to FIG. 16. Similarly, reference to one or more dead volume 345 can be utilized to indicate one or more dead volumes 345A and/or dead volumes 345B as depicted and described herein with reference to FIG. 10, one or more dead volumes 345C as depicted and described with reference to FIG. 14, one or more dead volumes 345D as depicted and described with reference to FIG. 15, and/or one or more dead volumes 345D as depicted and described with reference to FIG. 16. A focused sampling system 330 can refer to a focused sampling system 330A as depicted and described with reference to FIG. 10, a focused sampling system 330B as depicted and described with reference to FIG. 12, a focused sampling system 330C as depicted and described with reference to FIG. 13, a focused sampling system 330D as depicted and described with reference to FIG. 14, a focused sampling system 330E as depicted and described with reference to FIG. 15, and/or a focused sampling system 330F as depicted and described with reference to FIG. 16. A probe 340 can refer to a dual focused sampling probe 340, 340A, or 340B as depicted and described herein with reference to FIG. 6, FIG. 7, or FIG. 8, respectively, and/or a probe 340C as depicted and described herein with reference to FIG. 12.

Disclosed herein is a wellbore servicing method including: determining a concentration of one or more components of a subterranean fluid; and adjusting or maintaining at least one operating (or "operational") parameter of a wellbore servicing operation based on the determining of the concentration of the one or more components. According to this disclosure, the determining of the concentration of the one or more components includes contacting a sample of the subterranean fluid with a microelectromechanical system (MEMS) device to provide a sample response indicative of the concentration of the one or more components. The subterranean fluid can include a fluid obtained from a subterranean formation during the wellbore servicing operation. Without limitation, the operating parameter can include a composition and/or flow rate of a wellbore servicing fluid (WSF) or a component thereof introduced into the wellbore, for example, a shale inhibitor, a viscosifier, a thinner, a fluid loss control agent, a lubricant, a base oil, water, brine, an emulsifier, a surfactants, another liquid material that may be lost to the formation during a wellbore servicing (e.g., drilling) process, or a combination thereof. In aspects, the wellbore servicing method of this disclosure enables the composition of a subterranean fluid (e.g., a formation fluid, a produced fluid, a reservoir fluid, a hydrocarbon fluid, etc.) to be determined in real time, whereby adjustments to the wellbore servicing operation (e.g., the drilling operation, the completions operation, the production operation, etc.) can be taken to control and/or optimize performance of the wellbore servicing operation (e.g., the drilling operation, the completions operation, the production operation, etc.). In aspects, the method enables at least partial automation of the adjusting or maintaining of the operational parameter of the wellbore servicing operation based on the determining of the concentration of the one or more components of the subterranean fluid. The MEMS device can provide analytical quality data regarding the chemical content/composition of the subterranean fluid.

Figure 2:
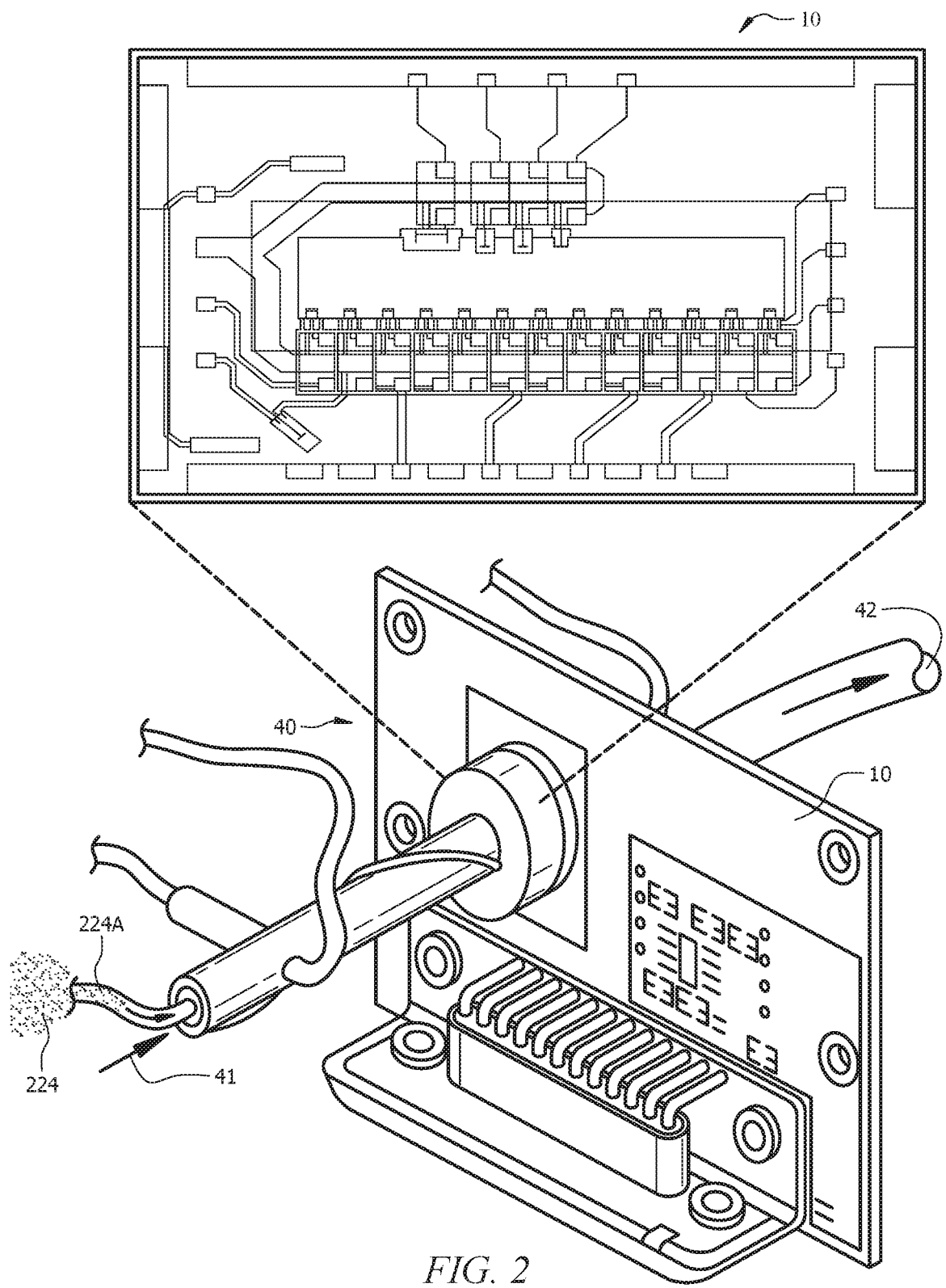
FIG. 2 is a schematic of a MEMS device including a chip of FIG. 1.

The MEMS device can include a sensor having microcantilever-based self-sensing array (SSA) technology. Such a sensor may also be referred to herein as a "molecular property spectrometer chip", an "MPS chip", an "MEMS chip", or simply a "chip". FIG. 1 is a schematic of a sensor or MPS chip 10 suitable for use in the method of this disclosure. Sensor or MPS chip 10 of FIG. 1 includes a surface stress sensor 11, a calorimeter 12 (e.g., a polymer coated calorimeter 12), a thermometer calorimeter 13, an anemometer 14, a thermistor 15, a thermobalance 16, an impedance sensor 17, and polymer coated thermobalances 18. One or a plurality of MPS chips 10 can be incorporated into the MEMS device 40. As depicted in FIG. 2, which is a schematic of a MEMS device 40 including an MPS chip 10, a sample intake line 41 can be utilized to introduce a sample 224A of the subterranean fluid 224 (e.g., wellbore servicing fluid 229 including fluid influx from the formation, described with reference to FIG. 5 hereinbelow, or a formation fluid, as described with reference to FIGS. 6-17 hereinbelow) to MEMS device 40, whereby the sample 224A of the subterranean fluid 224 can be contacted with the MPS chip 10. A sample outlet line 42 can be utilized to remove the sample 224A of the subterranean fluid 224 from the MEMS device 40.

The MEMS device 40 can include a plurality of MPS chips or sensors 10 within a housing. In aspects, the housing includes a wellbore monitoring tool, such as, without limitation, a BARALOGIX® unit, available from Halliburton Energy Services, Houston, Tex. A plurality of chips 10 can be utilized to provide redundancy and/or enable a desired frequency of measurement of the concentration of the one or more components of the subterranean fluid 224. Utilizing a redundancy of chips 10 can allow for one or more chips 10 being cleaned or purged, while another one or more chips 10 can be online. Cleaning/purging of the chips 10 will depend on the nature of the interaction of the one or more components (e.g., the analyte) with the chip 10 (e.g., with coating 46 described hereinbelow with reference to FIG. 3). In aspects, flushing with flush fluid (e.g., water, hydrocarbon, formation fluid, etc.), heating (e.g., via piezoresistive heater(s) 48 described hereinbelow with reference to FIG. 3) to flash the analyte off the chip 10, or the like can be utilized to clean spent chips 10 prior to reuse.

Figure 3:
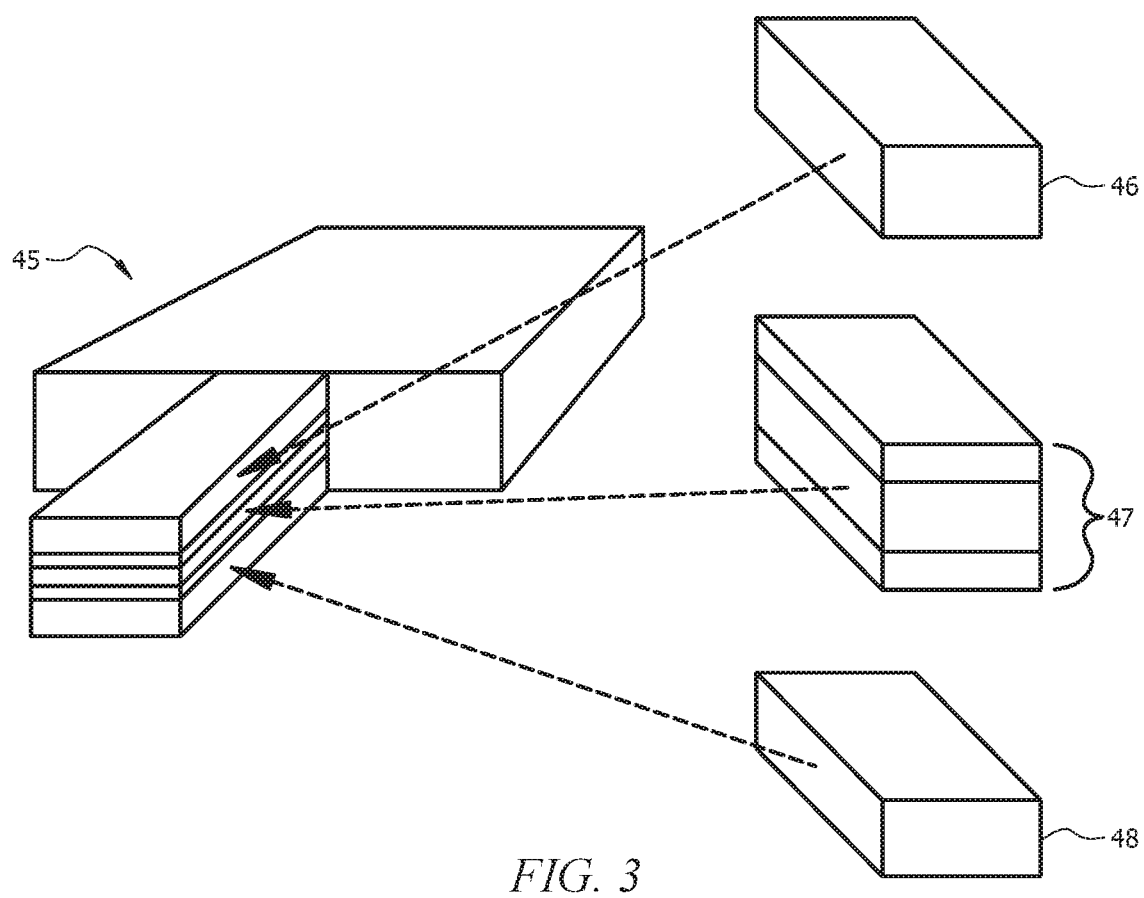
FIG. 3 is a schematic of a cantilever element of a chip of FIG. 1.
Figure 4A:
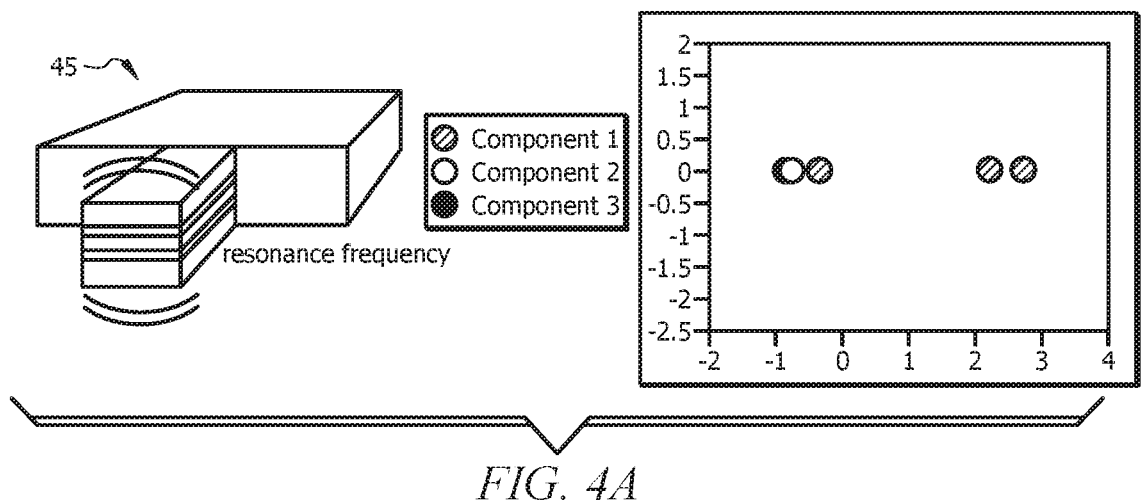
FIG. 4A, FIG. 4B, and FIG. 4C are pictorial representations depicting how resonance frequency (FIG. 4A), resonance frequency and heat (FIG. 4B), and resonance frequency and heat and impedance (FIG. 4C) can be utilized to distinguish one or more components of a subterranean fluid.
Figure 4B:
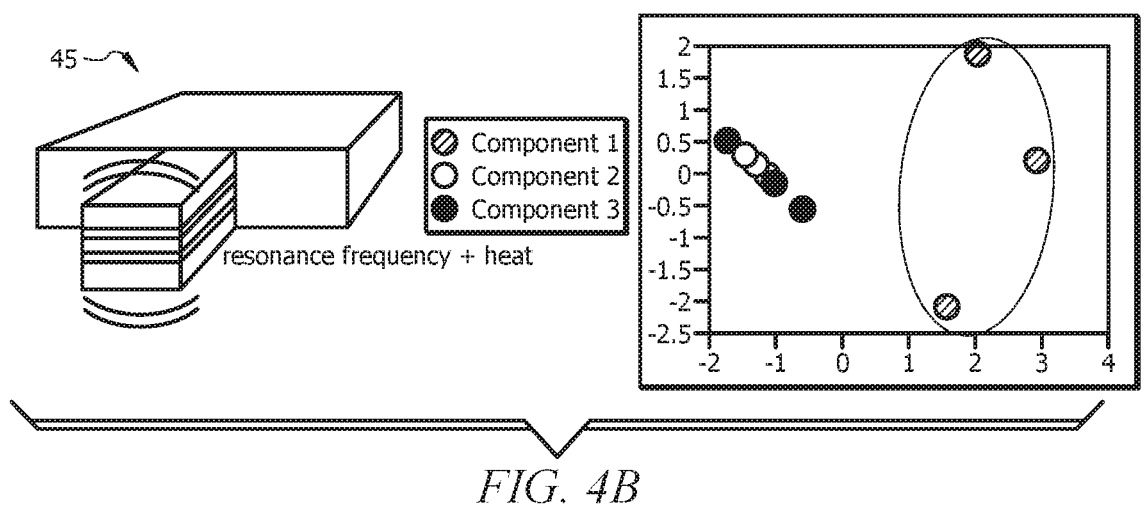
Figure 4C:
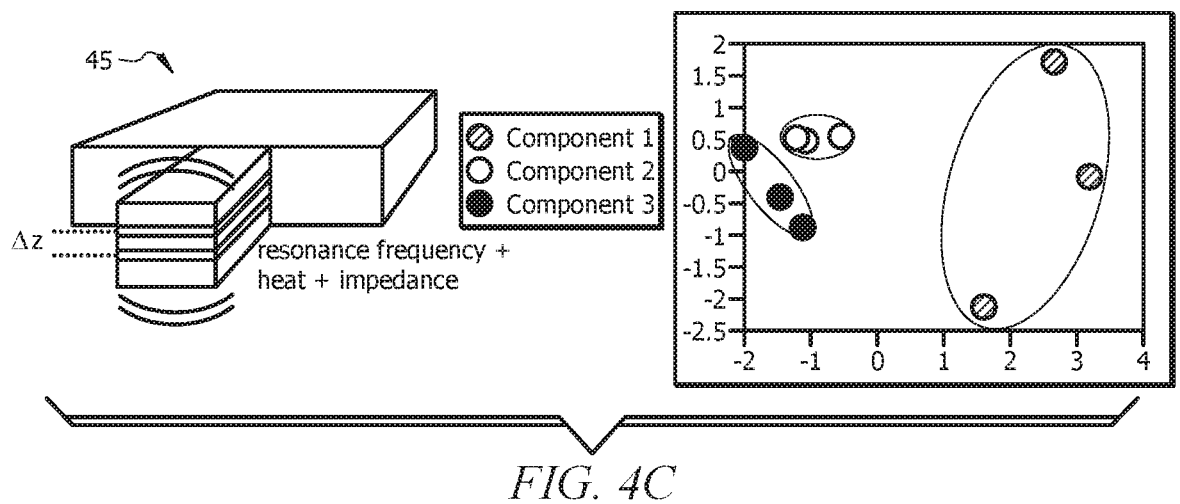

The MEMS device 40 can include an array of cantilever elements (e.g., microcantilevers) with integrated piezoelectric sensing elements that provide electrical actuation and sensing of resonance frequency. For example, FIG. 3 is a schematic of a cantilever element 45. Cantilever element 45 includes coating 46, metal/piezoelectric sandwich 47, and silicon with piezoresistive heater 48. Coating 46 (e.g., a polymer coating 46) can be operable for analyte absorption. Metal/piezoelectric sandwich 47 can provide drive/sense for frequency detection, impedance sensor, and temperature sensor. Piezoresistive heater 48 can provide for heat control (e.g., heat pulses). Resonance frequency, heat, and/or impedance can be utilized to determine the concentration of the one or more components of the subterranean fluid 224. For example, FIG. 4A, FIG. 4B, and FIG. 4C are pictorial representations depicting the characteristic resonance that various configurations of cantilever element 45 can provide (resonance frequency (FIG. 4A), resonance frequency and heat (FIG. 4B), and resonance frequency and heat and impedance (FIG. 4C)). The resonances can be utilized to distinguish one or more components (e.g., Component 1, Component 2, Component 3 depicted in FIGS. 4A-4C) of the subterranean fluid 224.

The array of microcantilevers 45 can include, for each of the one or more components, one or more microcantilevers 45 including a coating 46 sensitive to an analyte specific to the each of the one or more components (e.g., specific to the component itself or otherwise indicative of the component). As depicted in FIG. 3, the coating 46 of at least a portion of the array of microcantilevers 45 can includes a polymer. The MEMS device 40 can include a plurality of complementary chemical cantilevers 45 on each of the one or the plurality of MPS chips or sensors 10.

In embodiments, the MEMS device 40 includes a Molecular Property Spectrometer™ (MPS) chip 10, such as available from Nevada Nanotech Systems of Reno, Nev. Such an MPS chip 10 can, in aspects, rapidly (e.g., within a second) create a large, rich dataset of chemical information. Software can be utilized to identify the types of molecules (e.g., one or more components) present in the sample 224A of the subterranean fluid 224.

Because the MEMS device 40 is a microelectromechanical system or MEMS device 40, it can have low power consumption, be minute in size (e.g., micrometer or nanometer scale), have a light weight, and be robust for wellbore servicing applications. In aspects, in a span of milliseconds, the sensors 10 can heat to hundreds of degrees Celsius, make a variety of high-precision thermal measurements, and cool down (e.g., to ambient temperature). In aspects, various components of the MEMS device 40 can operate to detect picogram-scale masses and/or measure temperature with 0.01-degree resolution. In aspects, the MEMS device 40 can operate at temperatures in a range of from about −40° C. to 75° C. or higher and non-condensing humidity levels. In aspects, cooling can be incorporated to cool the electronics.

An MPS chip 10 can incorporate an array of microcantilevers 45 with integrated piezoelectric sensing elements 47 that provide electrical actuation and sensing of resonance frequency. Monitoring resonance is a highly sensitive way to measure very small masses of adsorbed analyte. An array of microcantilevers or sensors 45 can be electrically monitored in a low-cost, robust fashion via the MPS chip 10 due to the piezoelectric configuration provided by the MPS chip 10.

One or more of the microcantilevers 45 can include a built-in resistive heater 48 whereby an assortment of thermal analyses (e.g. Differential Scanning calorimetry or DSC) can be conducted. The resistive heater(s) 48 can allow for the cleaning of each microcantilever 45/MPS chip 10 after processing a sample 224A of the subterranean fluid 224. The resistors 48 can also enable temperature and flow compensation in order to minimize noise and drift of the piezoelectric sensors 47 and further enhance sensitivity.

The selected polymer coatings 46 can have unique chemical and surface interactions with the test sample 224A of the subterranean fluid 224. These unique chemical and surface interactions can be manifested in the resonant frequency of the each cantilever element 45 in the MPS chip 10. By using many different coatings 46, the resonance frequency response of each cantilever element 46 can be designed to provide a unique signature for the chemical properties of the sample 224A. Any suitable coating 46 that interacts with an analyte (e.g., each of the one or more components of the subterranean fluid 224) to change the resonance frequency can be utilized. The type of interactions can include sorption (e.g., the analyte (e.g., the component of the subterranean fluid 224) adsorbs or absorbs on the coating 46), dissolution/solvation (the analyte dissolves or solvates the coating 46), precipitation (the analyte precipitates on the coating 46) and/or other interactions. The chemistry and concentration of the sample 224A of the subterranean fluid 224 may be determined using this technology. Additionally, the MEMS device 40 can provide a heat source (e.g., piezoelectric heater 48) that allows the signature to be thermally responsive. In some cases, impedance can be included (e.g., via metal/piezoelectric sandwich 47) in the MEMS device 40 to better differentiate chemical species and concentration.

To facilitate a better understanding of the present invention, the following examples of certain embodiments are given. In no way should the following examples be read to limit, or define, the scope of the invention. One or more embodiments of the present disclosure may be applicable to any type of drilling operation including, but not limited to, exploration, services or production operation for any type of well site or reservoir environment including subsurface and sub sea environments.

Although the following disclosure concentrates on subterranean fluids encountered during drilling operations (for instance, formation or "reservoir" fluids, such as hydrocarbons, and WSFs, such as drilling fluids or "muds", having an influx of such formation fluids, etc.), the methods and tools can be extended for use in other contexts as well. For example, subterranean fluids encountered in a variety of subterranean operations, including stimulation treatments, conformance treatments, lost circulation treatments, hydraulic fracturing treatments, acidizing treatments, remediation treatments, scale removal treatments, scale inhibition treatments, production operations, and the like. Use of these terms herein does not imply any particular action by the fluid or any particular component thereof.

As used herein, the term "flow path" refers to a route through which any fluid is capable of being transported between at least two points. In one or more embodiments, the flow path need not be continuous or otherwise contiguous between the two points. Exemplary flow paths include, but are not limited to, a flow line, a pipeline, production tubing, drill string, work string, casing, a wellbore, an annulus defined between a wellbore and any tubular arranged within the wellbore, a mud pit, a subterranean formation, any other suitable flow path, combinations thereof, or the like. The term "flow path" does not necessarily imply that a fluid is flowing therein; rather, a fluid is capable of being transported or otherwise flowable therethrough.

According to one or more aspects of the present disclosure, an information handling system or computer equipment may be employed. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Description of the wellbore servicing system of this disclosure will now be made with reference to FIG. 5, which is a schematic diagram of a wellbore servicing system 200, according to one or more aspects of this disclosure. In aspects, the subterranean fluid includes a formation fluid, a production fluid, a hydrocarbon, a reservoir fluid, or the like. In embodiments, the subterranean fluid 224 includes a WSF 229 into which such a formation fluid has flowed. In such aspects, the subterranean fluid 224 can include returned WSF 229, wherein the returned wellbore servicing fluid includes a wellbore servicing fluid returned to the surface after introduction into the wellbore and passage along a flow path within the wellbore. In such aspects, the one or more components can include, for example, a hydrocarbon, a gas, or a combination thereof, that has flowed into the WSF 229 and is returned to the surface with returned wellbore servicing fluid. In aspects, the subterranean fluid includes a gas, such as an acid gas. Such gases that may be encountered in a wellbore servicing operation include, without limitation, hydrogen sulfide ($H_2S$), carbon monoxide (CO), carbon dioxide ($CO_2$), methane ($CH_4$), or a combination thereof.

In aspects, the wellbore servicing fluid 229 includes a fracturing fluid, a cementitious fluid, a remedial fluid, a perforating fluid, a sealant, a drilling fluid, a drill-in fluid, a spacer fluid, a completion fluid, a gravel pack fluid, a diverter fluid, a gelation fluid, a polymeric fluid, an aqueous fluid, an oleaginous fluid, or a combination thereof. The wellbore servicing fluid 229 can be introduced into a wellbore 218 at a volumetric flow rate of greater than or equal to about 3, 10, 20, 30, or 40 barrels per minute (BPM), or in a range of from about 3 to about 40, from about 3 to about 20, from about 10 to about 20, or from about 5 to about 20 BPM.

The one or more components of the subterranean fluid 224 for which the concentration is determined during the wellbore servicing operation can include any component of the subterranean fluid 224 for which knowledge of the concentration therein is desired and for which component or "analyte" a MEMS device is operable to detect (i.e., the MEMS device 40 includes one or more microcantilever elements 45 having a coating 46 sensitive to the component). For example, and without limitation, the one or more components can include a water, a gas, a hydrocarbon, a salt, or a combination thereof. In aspects, the one or more components include a gas, an oil, a hydrocarbon, water, a salt, another formation fluid component, or a combination thereof. A MEMS device 40 can be configured to detect a plurality of components of the subterranean fluid 224, in aspects. A plurality of MEMS devices 40 can be utilized, in embodiments, as described further hereinbelow.

In aspects the determining of the concentration of the one or more components of the subterranean fluid 224 can further include: after contacting the sample 224A with the MEMS device 40 to provide the sample response, providing a treated sample by treating the sample 224A (e.g., or a volume of subterranean fluid 224 from which the sample 224A is taken) to selectively alter a response of the MEMS device 40 thereto; contacting the treated sample with the MEMS device 40 to provide a treated sample response; and utilizing a difference between the treated sample response and the sample response (e.g., with calibration curves) to determine the concentration of the one or more components of the subterranean fluid 224. A variety of treatments can be utilized. Without limitation, treating to provide the treated sample can include treating with a chemical additive that selectively alters the response of the MEMS device 40. The chemical additive can include, for example, an acid, a base, an enzyme, an oxidizer, a reducer, and anti-oxidant, an oxygen scavenger, a free radical source, a free radical trap, a chemical reactant, a surfactant, a precipitant, a demulsifier, a flocculant, a deflocculant, or a combination thereof. In aspects, treating the sample can include, treating with UV light, IR light, visible spectrum light, ultrasonic treatment, heat, microwaves, x-rays, laser light, or a combination thereof.

The sample 224A of the subterranean fluid 224 can include a solids-reduced sample 224A of the subterranean fluid 224, wherein the solids-reduced sample 224 of the subterranean fluid 224 includes a reduced amount of solids relative to the subterranean fluid 224 from which the sample 224A is obtained. A solids reduced sample 224A of the subterranean fluid 224 can be obtained via a variety of methods, such as, without limitation, filtering, or centrifuging, the subterranean fluid 224 from which the sample 224A is obtained to provide the solids-reduced sample 224A of the subterranean fluid 224. In aspects, subterranean fluid filtrate (e.g., drilling fluid filtrate) can be collected through standard filtration testing, and the solids-reduced sample of the subterranean fluid 224 can include the subterranean fluid filtrate (e.g., drilling fluid filtrate). This may allow for analysis of the concentration of salt, and/or other small molecule components in water-based fluids. The presence of water can also be assayed, in aspects. Compatibility of the sample 224A and the MEMS device 40 may be enhanced via utilization of a solids-reduced sample 224A.

The method can further include carrying out the determining of the concentration of the one or more components of the subterranean fluid 224 at a certain frequency, for example, at least once every sampling time period. For example, the sampling time period can be in a range of from about 0.01 to about 24 hours, from about 1 minute to about 15 hours, or from about 0.5, 1, 2, 3, 4, 5, 6, 7, 8, 9, or 10 minutes to about 0.1, 0.2, 0.3, 0.4, 0.5, 0.6, 0.7, 0.8, 0.9, 1, 2, 3, 4, 5, 6, 7, 8, 9, 10, 15, or 20 hours. Any desired sampling frequency can be utilized via utilization of an appropriate number and arrangement of chips 10 and/or MEMS devices 40.

The concentration of the one or more components of the subterranean fluid 224 determined via the MEMS device 40 can be utilized to calculate a parameter of the subterranean fluid 224. In such aspects, the adjusting or maintaining of an operational parameter of the wellbore servicing operation based on the determining of the concentration of the one or more components can include adjusting or maintaining a composition of the wellbore servicing fluid 229 to have a desired value of the parameter. For example, the parameter can include an oil to water ratio (OWR) of the wellbore servicing fluid 229, a density of the wellbore servicing fluid 229, an emulsifier content, a salinity (e.g., a water phase salinity (e.g., salt content of the water phase)), a shale inhibitor content, a viscosifier content, a fluid loss additive content, a thinner content, a surfactant content, a pH value (e.g., an alkalinity value (Pm and/or N)), an additive concentration, a lubricity value, a rheological parameter, a desired filtration control, an excess of lime, an Electrical Stability (ES) value, a hardness value (calcium and magnesium), a combination thereof, or the like.

As noted above, FIG. 5 illustrates wellbore servicing system 200, including wellbore monitoring system 210, that may employ one or more of the methods described herein in order to characterize a subterranean fluid composition and provide optimal additive dosing and/or another response, according to one or more embodiments. The exemplary wellbore servicing system 200 includes a drilling platform 202 that supports a derrick 204 having a traveling block 206 for raising and lowering a drill string 208. A kelly 212 supports the drill string 208 as it is lowered through a rotary table 214. A drill bit 216 is attached to the distal end of the drill string 208 and is driven either by a downhole motor and/or via rotation of the drill string 208 from the well surface 240. As the drill bit 216 rotates, it creates a wellbore 218 that penetrates various subterranean formation(s) 220. The example wellbore 218 shown in FIG. 5 includes a vertical wellbore. However, a wellbore servicing system 200 may include any combination of horizontal, vertical, slant, curved, or other wellbore orientations.

A pump 222 (for example, a mud pump) circulates wellbore servicing fluid 229 through a feed pipe 226 and to the kelly 212, which conveys the wellbore servicing fluid 229 downhole (in the direction indicated by arrow A1) through an interior conduit 252 defined in the drill string 208 and through one or more orifices 223 in the drill bit 216. The wellbore servicing fluid 229 (also referred to herein as "returned wellbore servicing fluid") is then circulated back to the surface 240 via an annulus 228 (in a direction indicated by arrow A2) defined between the drill string 208 and the walls of the wellbore 218. The route through which wellbore servicing fluid 229 circulates may be described using one or more fluid flow paths 219. In one or more embodiments, operation of wellbore servicing system 200 can include diverting wellbore servicing fluid 229 to fluid reclamation equipment 232 and optimizing associated fluid reclamation equipment 232. The WSF returned to the surface 240 can be introduced into one or more mud pits 265, from which it can subsequently be pumped back to interior conduit 252 via pump(s) 222 and feed pipe 226.

The wellbore servicing fluid 229 may carry out several functions, such as, without limitation, lubrication of drill bit 216 and the mechanical removal of cuttings and solids. The wellbore servicing fluid 229 may be any wellbore servicing fluid known to those skilled in the art. In one or more embodiments, for example, the wellbore servicing fluid 229 may be or include water, such as a brine or the like, known to those skilled in the art. The wellbore servicing fluid 229 may be or include, but is not limited to, municipal treated or fresh water, sea water, salt water (for example, water containing one or more salts dissolved therein) naturally-occurring brine, a chloride-based, bromide-based, or formate-based brine containing monovalent and/or polyvalent cations, aqueous solutions, non-aqueous solutions, base oils, and any combination thereof. Examples of chloride-based brines include lithium chloride, sodium chloride, calcium chloride, and zinc chloride. Examples of bromide-based brines include sodium bromide, calcium bromide, and zinc bromide. Examples of formate-based brines include sodium formate, potassium formate, and cesium formate.

In aspects, the wellbore servicing fluid 229 can have monovalent and/or polyvalent cations, alkali and alkaline earth metals, or combinations thereof. Additional examples of suitable salts include NaCl, KCl, NaBr, $CaCl_2$, $CaBr_2$, $MgCl_2$, $MgBr_2$, $ZnBr_2$, acetate salts, sodium acetate, potassium acetate, ammonium chloride ($NH_4Cl$), potassium phosphate, calcium nitrate, sodium formate, potassium formate, cesium formate, or combinations thereof. In an aspect, the WSF 229 includes a brine including the salt.

In an aspect, the base fluid of WSF 229 includes an aqueous fluid. Aqueous fluids that may be used in the WSF include any aqueous fluid suitable for use in subterranean applications, provided that the aqueous fluid is compatible with the other components (e.g., shale inhibitor) used in the WSF 229. For example, the aqueous fluid may include water or a brine. In an aspect, the aqueous fluid includes an aqueous brine. In an aspect, the WSF 229 may include any suitable salt(s). In such aspect, the aqueous brine generally includes water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, liquids including water-miscible organic compounds, and combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In an aspect, the salt or salts in the water may be present within the base fluid in an amount sufficient to yield a saturated brine. As will be appreciated by one of skill in the art, and with the help of this disclosure, the type and concentration of salt solutions utilized as a base fluid is dependent on the WSF 229 density (e.g., drilling fluid density, completion fluid density, etc.), which may range, without limitation, from about 8 lb/gallon to about 20 lb/gallon, alternatively from about 10 lb/gallon to about 18 lb/gallon, or alternatively from about 12 lb/gallon to about 16 lb/gallon.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to brines including salts such as NaCl, KCl, NaBr, $CaCl_2$, $CaBr_2$, $MgCl_2$, $MgBr_2$, $ZnBr_2$, acetate salts, sodium acetate, potassium acetate, ammonium chloride ($NH_4Cl$), potassium phosphate, sodium formate, potassium formate, cesium formate, or combinations thereof. In an aspect, the base fluid includes a brine.

In an aspect, the base fluid of the WSF 229 includes an emulsion. In such aspect, the emulsion can be an oil-in-water emulsion including a non-oleaginous (e.g., an aqueous fluid of the type previously described herein) continuous phase and an oleaginous (e.g., an oil-based fluid, such as for example an oleaginous fluid) discontinuous phase. Oleaginous fluids that may be used in the WSF 229 include any oleaginous fluid suitable for use in subterranean applications, provided that the oleaginous fluid is compatible with the other components utilized in the WSF 229. Examples of oleaginous fluids suitable for use in a WSF 229 include, but are not limited to, petroleum oils, natural oils, synthetically-derived oils, oxygenated fluids, or combinations thereof. In an aspect, the oleaginous fluid includes diesel oil, kerosene oil, mineral oil, synthetic oils, aliphatic hydrocarbons, polyolefins (e.g., alpha olefins, linear alpha olefins and/or internal olefins), paraffins, silicone fluids, polydiorganosiloxanes, oxygenated solvents, esters, diesters of carbonic acid, alcohols, alcohol esters, ethers, ethylene glycol, ethylene glycol monoalkyl ether, ethylene glycol dialkyl ether, or combinations thereof, wherein the alkyl groups are methyl, ethyl, propyl, butyl, and the like.

The base fluid may be present within the WSF 229 in any suitable amount. For example, the base fluid may be present within the WSF 229 in an amount of from about 10 wt. % to about 99 wt. %, alternatively from about 20 wt. % to about 95 wt. %, or alternatively from about 40 wt. % to about 90 wt. %, based on the total weight of the WSF 229. Alternatively, the base fluid may include the balance of the WSF 229 after considering the amount of the other components used. As will be appreciated by one of skill in the art, and with the help of this disclosure, the amount of base fluid (e.g., aqueous base fluid) in the WSF 229 depends on the desired density of the WSF 229.

In aspects, the WSF 229 includes solids. For example, WSF 229 can be a drilling fluid, the density of which can be provided using a solid material such as, without limitation, barite, hematite, calcium carbonate, or the like. In aspects, the WSF 229 can have up to about 20, 30, or 35 volume percent (vol %) of such solid components. In such aspects, an oil based WSF 229 can include (or primarily include) oil, brine, and weighting materials (e.g., barite), optionally with other components in smaller quantities. In other aspects, the WSF 229 is a water base WSF 229 absent the base oil. In aspects, a composition of a WSF 229 can be determined via a MEMS device, as described in U.S. patent application Ser. No. 16/879,167, filed May 20, 2020, and entitled, "Methods to Characterize Wellbore Fluid Composition and Provide optimal Additive Dosing Using MEMS Technology", the disclosure of which is hereby incorporated herein in its entirety for purposes not contrary to this disclosure.

In one or more embodiments, upon returning to the surface and exiting the wellbore 218, the returned wellbore servicing fluid 229 may be conveyed to one or more servicing fluid reclamation equipment 232 fluidly coupled to the annulus 228. The reclamation equipment 232 may be configured to receive and rehabilitate the returned wellbore servicing fluid 229 in preparation for its reintroduction into the wellbore 218, if desired. The reclamation equipment 232 may include one or more filters or separation devices configured to clean the wellbore servicing fluid 229. The reclamation equipment 232 may include, for example, a shale shaker, a centrifuge, a diatomaceous earth filter, or the like.

In one or more embodiments, wellbore servicing system 200 can include one or more instrument trucks 236, one or more pump trucks 238, and a wellbore servicing fluid control subsystem 231. The wellbore servicing system 200 may perform one or more wellbore servicing operations.

The one or more pump trucks 238 may include any one or more of one or more mobile vehicles, one or more immobile installations, one or more skids, one or more hoses, one or more tubes, one or more fluid tanks, one or more fluid reservoirs, one or more pumps, one or more valves, one or more mixers, or any other one or more types of structures and equipment. The one or more pump trucks 238 shown in FIG. 5 can supply (e.g., "fresh") wellbore servicing fluid 229 or other materials for the wellbore servicing operation. The one or more pump trucks 238 may convey the wellbore servicing fluid 229 downhole through the interior conduit 252 defined in the drill string 208 and through one or more orifices in the drill bit 216.

The one or more instrument trucks 236 may include mobile vehicles, immobile installations, or other structures. The one or more instrument trucks 236 shown in FIG. 5 include a wellbore servicing fluid control subsystem 231 that controls or monitors the wellbore servicing operation applied by the wellbore servicing system 200. One or more communication links 242 may communicatively couple the one or more instrument trucks 236 to the one or more pump trucks 238, or other equipment at a ground surface 240. In one or more embodiments, the one or more communication links 242 may communicatively couple the one or more instrument trucks 236 to one or more controllers 243 disposed at or about the wellbore, one or more sensors (such as surface sensors 258 and downhole sensors 260, which can include one or more MEMS devices 40), other one or more data collection apparatus in the wellbore servicing system 200, remote systems, other well systems, any equipment installed in the wellbore 218, other devices and equipment, or a combination thereof. In one or more embodiments, the one or more communication links communicatively couple the one or more instrument trucks 236 to the wellbore monitoring system 210, which may run one or more simulations and record simulation data. The wellbore servicing system 200 may include a plurality of uncoupled communication links 242 or a network of coupled communication links 242. The communication links 242 may include direct or indirect, wired or wireless communications systems, or combinations thereof.

The wellbore servicing system 200 may also include one or more surface sensors 258 and one or more downhole sensors 260 to measure a pressure, a rate, a temperature, a wellbore servicing fluid composition, and any other parameters of wellbore servicing operations. According to this disclosure, at least one of the surface sensors 258 or the downhole sensors 260 includes a MEMS device 40, as described hereinabove, operable to determine the concentration of the one or more components of the subterranean fluid 224. Surface sensors 258 and downhole sensors 260 may include meters or other equipment that measure properties of one or more fluids in the wellbore 218 at or near the ground surface 240 level or at other locations. The wellbore servicing system 200 may include one or more pump controls 262 or other types of controls for starting, stopping, increasing, decreasing or otherwise controlling pumping as well as controls for selecting or otherwise controlling fluids pumped during the wellbore servicing operation. The wellbore servicing fluid control subsystem 231 may communicate with the one or more of one or more surface sensors 258, one or more downhole sensors 260, the one or more MEMS devices 40, one or more pump controls 262, and other equipment to monitor and control the wellbore servicing operation.

The wellbore monitoring system 210 may include one or more information handling systems located at the wellbore 218 or any one or more other locations. The wellbore monitoring system 210 or any one or more components of the wellbore monitoring system 210 may be located remote from any one or more of the other components shown in FIG. 5. For example, the wellbore monitoring system 210 may be located at a data processing center, a computing facility, or another suitable location. The wellbore servicing system 200 may include additional or different features, and the features of the wellbore servicing system 200 may be arranged as shown in FIG. 5 or in another configuration.

Figure 5:
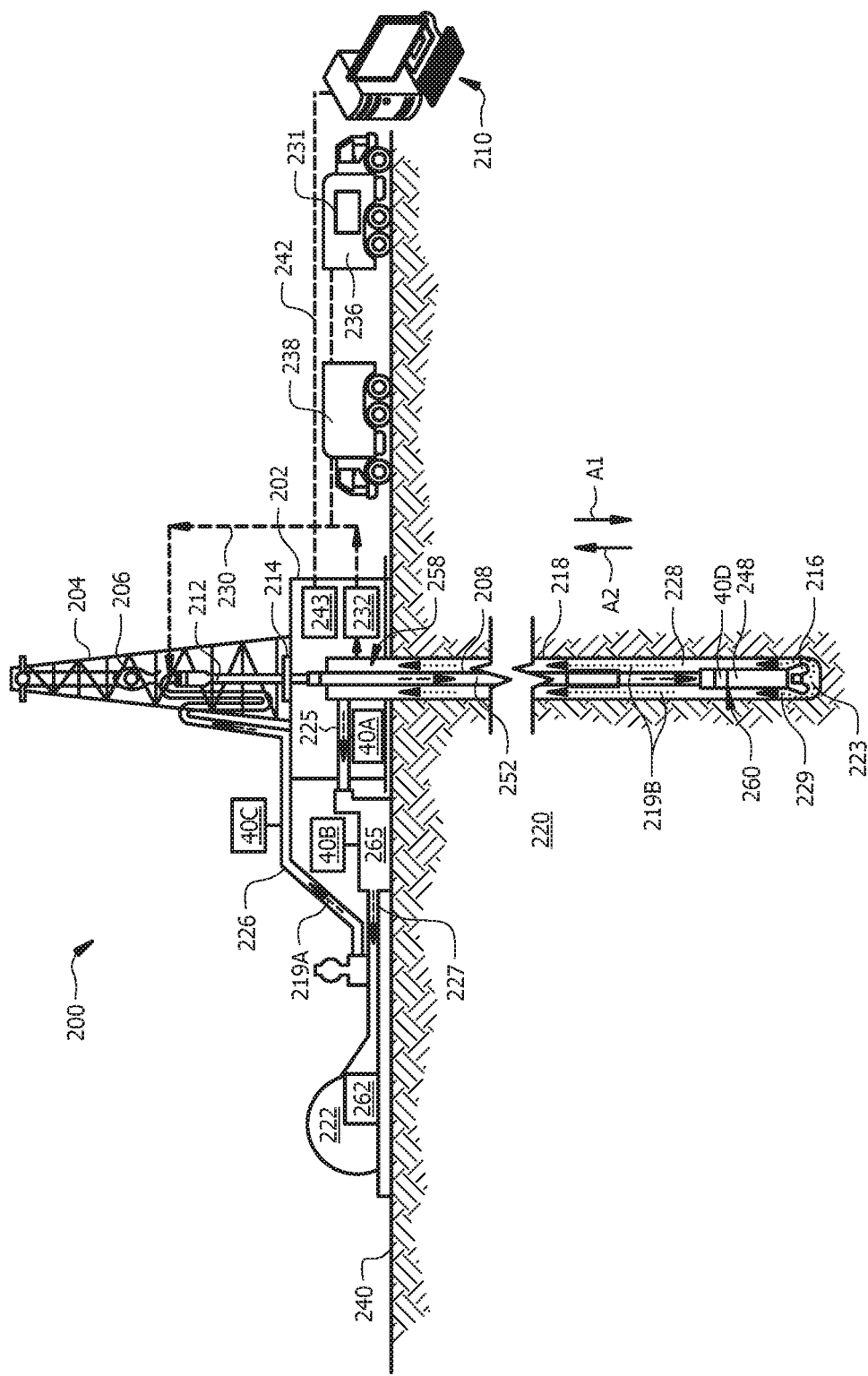
FIG. 5 is a schematic diagram of a wellbore servicing system, according to one or more aspects of this disclosure.

In one or more embodiments, the wellbore servicing fluid control subsystem 231 shown in FIG. 5 controls operation of the wellbore servicing system 200. The wellbore servicing fluid control subsystem 231 may include one or more data processing equipment, one or more communication equipment, or other systems that control the circulation and/or composition of the wellbore servicing fluids 224 through the wellbore 218. The wellbore servicing fluid control subsystem 231 may be communicatively linked or communicatively coupled to the wellbore monitoring system 210, which may calculate, select, or optimize wellbore servicing operation parameters, for example, in response to the determined concentration of the one or more components of the subterranean fluid. The wellbore servicing fluid control subsystem 231 may receive, generate or modify a wellbore servicing operation plan (for example, a pumping schedule, a wellbore servicing fluid composition, an additive dosing, etc.) that specifies parameters of a wellbore servicing operation to be applied to the wellbore 218.

The method of this disclosure includes adjusting or maintaining a composition of the wellbore servicing fluid 229 being introduced into the wellbore 218 and/or another operational parameter of the wellbore servicing operation based on the determining of the concentration of the one or more components. Such adjusting or maintaining of the wellbore servicing fluid 229 being introduced into the wellbore 218 and/or the another operational parameter of the wellbore servicing operation can be manual or automated. For example, the wellbore servicing fluid control subsystem 231 may select or modify (for example, increase or decrease) one or more compositions of the wellbore servicing fluid 229 (e.g., a dosing rate/amount of one or more of one or more components of the wellbore servicing fluid 229), one or more densities of the wellbore servicing fluid 229, one or more viscosities of the wellbore servicing fluid 229, and one or more other control parameters based on data provided by the MEMS device (s) 40. In one or more embodiments, data provided by the one or more MEMS device(s) 40 may be measured and the measurements and/or results calculated therefrom displayed in real time during the wellbore servicing operation, for example, to an engineer or other operator of the wellbore servicing system 200. An appropriate response can be determined and effected either manually or automatically.

In one or more embodiments, the techniques and operations described herein may be implemented by one or more information handling systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

In aspects, the determining of the concentration of the one or more components of the subterranean fluid 224 can be performed at an uphole location. For example, with reference to FIG. 5, a MEMS device 40 can be positioned along an uphole flow path 219A via which the returned (or "used") WSF 229 flows from annulus 228 back to interior conduit 252. For example, such a flow path can include mud pit inlet pipe 225 fluidly connecting annulus 228 with one or more mud pits 265, one or more mud pits 265, mud pit outlet pipe 227 fluidly connecting the one or more mud pits 265 with one mud pump 222, and feed pipe 226 fluidly connecting pump 222 with interior conduit 252. In FIG. 5, a MEMS device 40A is shown, by way of example, on mud pit inlet line 225, a MEMS device 40B is shown on mud pit outlet line 227, and a MEMS device 40C is shown on feed pipe 226. Other uphole locations present in a drilling or other wellbore servicing operation, which will be apparent to those of skill in the art with the help of this disclosure, are contemplated and within the scope of this disclosure.

The sample 224A of subterranean fluid (e.g., returned WSF 229) can be taken from a volume of the subterranean fluid 224 subsequent passage of the volume of the subterranean fluid in the wellbore 218 (e.g., to surface 240 via annulus 228).

In aspects, determining of the concentration of the one or more components of the subterranean fluid 224 can be performed at a downhole location, wherein the sample 224A of subterranean fluid 224 is taken from a volume of the subterranean fluid 224 downhole. For example, with reference to FIG. 5, a MEMS device 40 can be positioned along a downhole flow path 219B via which the WSF 229 flows along interior conduit 252, through drill bit 216, and back up annulus 228. For example, as depicted in FIG. 5, a MEMS device 40D can be positioned within a BHA 248, in aspects. In some such aspects, the sample 224A of subterranean fluid 224 can include WSF 229 taken from a portion of downhole flow path 219B that carries the WSF 229 from nozzles 223 of drill bit 216 to a top of annulus 228. Alternatively, as detailed further hereinbelow with reference to FIGS. 6-17, in other such aspects, the sample 224A of subterranean fluid 224 can include formation fluid (e.g., contaminated formation fluid 9, virgin formation fluid 8, or partially contaminated formation fluid) obtained from the formation 220.

Other uphole and/or downhole MEMS devices 40 can be utilized to measure one or more components of a subterranean fluid encountered in a variety of wellbore servicing operations, as will be apparent to those of skill in the art and with the help of this disclosure. For example, as will be apparent to those of skill in the art upon reading this disclosure, during production, one or more MEMS devices 40 can be utilized to measure one or more components of produced fluid uphole or downhole.

The determining of the concentration of the one or more components can be performed on samples 224A of the subterranean fluid 224 taken at two or more locations along a flow path (e.g., uphole flow path 219A, downhole flow path 219B) of the wellbore servicing fluid 229. In such aspects, two or more MEMS devices 40 can be positioned along the flow paths of wellbore servicing system 200. The uphole location can include a location along uphole flow path 219A of the wellbore servicing fluid 229 downstream of the wellbore 218. For example, one or a plurality of MEMS devices 40 (such as MEMS device 40A, MEMS device 40B, and/or MEMS device 40C) can be utilized to determine a concentration of the one or more components of the returned WSF 229 after removal thereof from interior conduit 252.

Adjusting or maintaining at least one operating parameter of the wellbore servicing operation based on the determining of the concentration of the one or more components of the subterranean fluid 224 can include any appropriate response to the determined concentration of the one or more components. For example and without limitation, adjusting or maintaining at least one operating parameter of the wellbore servicing operation based on the determining of the concentration of the one or more components of the subterranean fluid 224 can include adjusting or maintaining a composition of wellbore servicing fluid 229 being introduced into the wellbore 218. Such adjusting or maintaining can include increasing, decreasing, or maintaining an amount of one or more components in the wellbore servicing fluid 229 being introduced into the wellbore 218. Any adjustment can be manually effected or automated. In aspects, decreasing a concentration of the one or more components can include increasing an amount of one or more other components of the WSF 229, as will be apparent to those of skill in the art with the help of this disclosure.

A plurality of MPS chips 10/MEMS device(s) 40 can be utilized to provide concentration data of the subterranean fluid 224 in real time. Adjusting or maintaining the operational parameter can include adjusting a composition of a WSF (e.g., drilling fluid, completions fluid) 229 being introduced into wellbore 218, for example, to manage the WSF 229 (drilling fluid, completions fluid) chemistry and/or adjusting one or more other operational parameters of the wellbore servicing (e.g., drilling operation, completions, producing operation) for optimal performance thereof.

The method of this disclosure can be utilized to provide a diagnostic test. In such aspects, the determining of the concentration of the one or more components of the subterranean fluid 224 during the wellbore servicing operation can be utilized to diagnose the presence or absence of an event occurring during the wellbore servicing operation. Without limitation, such an event can include fluid inflow (e.g., a gas kick), an event that increases torque and/or drag on the drill bit 216, fluid outflow (or "loss"), expansion/contraction of the wellbore 218 (also referred to as "wellbore ballooning"), wellbore instability, product oxidation, product degradation, product depletion, pack-off, shaker screen blinding, hydrate formation, shale delamination, fluid contamination, shale swelling, pore pressure transmission, differential sticking, or the like. In such aspects, adjusting or maintaining an operational parameter of the wellbore servicing operation based on the determining of the concentration of the one or more components can be utilized to address the presence or absence of the event.

In aspects, a downhole tool can be activated based on the determining of the concentration of the one or more components of the subterranean fluid, as described in U.S. patent application Ser. No. 16/879,172, filed May 20, 2020, and entitled, "Methods to Activate Downhole Tools", the disclosure of which is hereby incorporated herein in its entirety for purposes not contrary to this disclosure.

In aspects, the subterranean fluid includes a returned WSF 229. For example, as described hereinabove, in applications, fluids can flow into annulus 228, and be returned to surface 240 as a component of the returned WSF 229. One or more MEMS devices 40 can be utilized, as described herein, to determine the concentration of one or more components of the returned WSF 229, wherein the one or more components are one or more components of a fluid influx from formation 220. The fluid influx can include, for example, a hydrocarbon, a gas, water, or a combination thereof. In aspects, the one or more components include a gas. The gas can include a gas, such as, without limitation, hydrogen sulfide ($H_2S$), carbon monoxide (CO), carbon dioxide ($CO_2$), methane ($CH_4$), or a combination thereof. In aspects, the gas can include an acid gas, such as, without limitation, hydrogen sulfide ($H_2S$), carbon monoxide (CO), carbon dioxide ($CO_2$), or a combination thereof. By utilizing one or more MEMS devices to determine a concentration of such a gas influx, it may be possible to avoid a "kick". For example, a downhole MEMS device 40 can be utilized to detect a gas influx before the gas reaches the surface 240, potentially providing for an early warning of an impending kick. Accordingly, the system and method as described herein may provide for enhanced safety, in aspects.

The sample 224A of the subterranean fluid 224 can include the subterranean fluid 224 or a portion thereof. For example, in aspects, formation fluid influx into WSF 229 is separated from the returned WSF 229, and the separated formation fluid contacted with the MEMS device 40 for determination of the concentration of one or more components thereof. In such aspects, the method can further include separating sample 224A including formation fluid from the returned WSF 229 prior to analysis of the concentration of the one or more components in the sample 224A.

In embodiments wherein the one or more components for which concentration is determined by the MEMS device(s) 40 include a gas, adjusting or maintaining at least one operating parameter of the wellbore servicing operation can include taking an action to avoid a kick. For example, such operation can include, without limitation, adjusting a weight (e.g., density) of a WSF 229 being introduced into the wellbore 218, reducing a pumping rate of a WSF 229 being introduced into the wellbore 218, ceasing the pumping of the WSF 229 into the wellbore 218, and/or choking and pressurizing at the surface 240 in advance of a kick, or a combination thereof.

Alternatively or additionally, the one or more components can include a hydrocarbon. It may be desirable to monitor for one or more components including a hydrocarbon, for example, to determine if oil is flowing into the wellbore 220. In such embodiments, adjusting or maintaining at least one operating parameter of the wellbore servicing operation can include taking one or more actions to deal with oil influx or influx of other formation fluids into wellbore 220. For example, adjusting or maintaining the at least one operating parameter can include adjusting an operating parameter relating to a treatment (e.g., increasing a density of WSF 229, treatment with a filtration agent, or the like) and/or discharge of the returned wellbore servicing fluid 229 (which contains entrained or associated oil), adjusting a composition of the WSF 229 being introduced into the wellbore 218, or a combination thereof.

In aspects, the subterranean fluid for which the concentration of one or more components is determined via the MEMS device 40 includes a formation fluid. In aspects, the sample 224A of the subterranean fluid 224 includes a sample of a contaminated formation fluid, an uncontaminated or virgin formation fluid, or a partially cleaned formation fluid. The formation fluid sample 224A can be obtained via any methods known to those of skill in the art. For example, a downhole tool of BHA 248 or a wireline tool can be utilized to take a formation sample utilized as subterranean fluid sample 224A. In aspects the formation sample is a partially focused sample of the formation fluid or a focused sample of the formation fluid. A focused or partially focused formation sample can include, consist, or consist essentially of uncontaminated or "virgin" formation fluid. The formation sample can be obtained and analyzed downhole via a downhole MEMS device 40 (such as downhole MEMS device 40D), or a formation sample recovered downhole can be returned uphole and analyzed via an uphole MEMS device 40 to determine the concentration of the one or more components of the subterranean fluid 224. In aspects, a MEMS device 40 is utilized to determine when a focused sample can be taken (e.g., when a formation fluid sample is sufficiently clean and can be stored in one or more sample chambers, as described hereinbelow and/or analyzed in the same or another MEMS device 40 for determination of the concentration of the one or more components of the focused sample).

In aspects, sample 224A of subterranean fluid 224 is a focused sample of formation fluid. Such a focused sample of formation fluid can be obtained by any methods known to those of skill in the art. For example, a focused sample can be obtained as described, in U.S. patent application Ser. No. 16/670,886, filed Oct. 31, 2019, and entitled, "Focused Formation Sampling Method and Apparatus", the disclosure of which is hereby incorporated herein in its entirety for purposes not contrary to this disclosure. Description of such a method of obtaining a focused sample for analysis in a MEMS device 40 will now be made with reference to FIG. 6 to FIG. 17. The sampling system and method described below will be referred to as a "focused sampling system and method", as they provide a technique to achieve an at least partially focused sample and obtain advantages of full focused sampling, but with a single pumpout system. In alternative aspects, conventional focused sampling utilizing dual pump systems can be utilized to obtain the sample 224A of the subterranean fluid 224.

Formation evaluation typically requires that fluid from the formation be drawn into a downhole drilling tool and/or a wireline tool for testing and/or sampling. Various devices, such as probes, are typically extended from the downhole tool to establish fluid communication with the formation surrounding the wellbore and to draw fluid into the downhole tool. A typical probe is a circular or prolate element that extends from the downhole tool and is thus positioned against a sidewall of the wellbore. A rubber packer at the end of the probe can be used to create a seal with the sidewall of the wellbore. In applications, a dual packer can be used to form a seal with the sidewall of the wellbore. With a dual packer, two elastomeric rings expand radially above and below the downhole tool to isolate a portion of the wellbore therebetween. The rings form a seal with the sidewall of the wellbore and permit fluid to be drawn into the isolated portion of the wellbore and into one or more inlets in the downhole tool. The mudcake lining the wellbore is often useful in assisting the probe and/or dual packers in making the seal with the sidewall of the wellbore. Once the seal is made, fluid from the formation can be drawn into the downhole tool through one or more inlets by lowering the pressure in the downhole tool relative to ambient formation pressure.

The collection and sampling of underground fluids contained in subsurface formations is well known. In the petroleum exploration and recovery industries, for example, samples of formation fluids are collected and analyzed for various purposes, such as to determine the existence, composition and/or producibility of subsurface hydrocarbon fluid reservoirs. This component of the exploration and recovery process can be crucial for developing drilling strategies, and can significantly impact financial expenditures. To conduct valid fluid analysis, the fluid samples obtained from the subsurface formation should be of sufficient purity, or be virgin fluid, to adequately represent the fluid contained in the formation and thus enable an accurate formation evaluation to be based thereon.

FIG. 6 depicts a subsurface formation 220 penetrated by a wellbore 218. A layer of mudcake (or filter cake) 306 formed by circulation of a drilling fluid (or drilling mud) lines a sidewall 305 of the wellbore 218. Due to invasion of mud filtrate into the formation 220 during drilling, the wellbore 218 is surrounded by a cylindrical region known and referred to herein as an "invaded" or "dirty" or "contaminated" zone 307. Invaded zone 307 contains contaminated fluid 309 that may or may not be mixed with virgin uncontaminated formation fluid 308. Beyond the sidewall 305 of the wellbore 218 and surrounding contaminated fluid 309, virgin fluid 308 is located in the formation 220.

As shown in FIG. 6, contaminants (mud filtrate such as oleaginous fluids) tend to be located near the sidewall 305 of wellbore 218 in the invaded zone 307. FIG. 7 shows the typical flow patterns of the formation fluid as it passes from subsurface formation 220 into a downhole tool 110. The downhole tool 110 is positioned adjacent the formation 220 and a component 320 of the downhole tool 110 (such as a probe) is extended from the downhole tool 110 through the mudcake 306 to the sidewall 305 of the wellbore 218. The component 320 is placed in fluid communication with the formation 220 so that formation fluid may be passed into the downhole tool 110. Initially, as shown in FIG. 6, the invaded zone 307 that contains contamination surrounds the sidewall 305 in contact with component (e.g., probe) 320.

As fluid initially passes into the component 320, all or a portion of the fluid drawn into the component 320 includes contaminated fluid 309 from the invaded zone 307, thereby providing fluid that can be unsuitable for sampling (e.g., having a purity that is below a desired purity and/or a level of contaminants above a desired level of contaminants). However, as shown in FIG. 7, after a certain amount of fluid passes through the component 320 into the downhole tool 110, the virgin formation fluid 308 breaks through and begins entering the component 320. That is, a more central portion of the fluid flowing into the component 320 gives way to the virgin fluid 308, while the remaining portion of the fluid is contaminated fluid 309 from the invaded zone 307. The challenge is to adapt the flow of the fluid into the component 320 and/or the configuration of the component 320 (e.g., probe) so that the virgin formation fluid 308 is collected in the downhole tool 110 during the fluid sampling.

As described with reference to FIG. 6 and FIG. 7, formation evaluation is typically performed on fluids drawn into the downhole tool 110. Techniques for performing various measurements, pretests and/or sample collection of fluids that enter the downhole tool 110 exist, and various methods and apparatus have been proposed for obtaining subsurface fluids for sampling and evaluation. However, when the formation fluid passes into the downhole tool 110, various contaminants, such as wellbore fluids and/or drilling mud, can enter the downhole tool 110 with the formation fluids. These contaminants can affect the quality of measurements and/or the quality of fluid samples of the formation fluids taken during the sampling process. Additionally, contamination can result in costly delays in the wellbore operations due to the need for additional time for additional testing and/or sampling. Furthermore, such problems may yield results that are inaccurate and/or unreliable for formation evaluation. Despite advances in formation fluid sampling, there remains a need to develop techniques for fluid sampling that optimize the quality of the sample(s) and/or the efficiency of the sampling process. To increase sample quality, it can be desirable that the formation fluid entering into the downhole tool 110 be sufficiently uncontaminated for valid testing. The formation fluid samples should have little or no contamination.

FIG. 8 depicts an example environment with which embodiments of the present disclosure can be employed. In the embodiment of FIG. 8, a downhole tool 110' is deployed into borehole 218 and suspended therein with a conveyance (such as conventional wireline 311, conductor or conventional tubing, or coiled tubing) below a rig 303. The illustrated downhole tool 110' is provided with various modules and/or components 312 (e.g., sampling and/or testing modules, a power module, a communication module, a pumping module, and the like), including, but not limited to, component 320 in contact with sidewall 305 of wellbore 218 and used to obtain fluid samples from the subsurface formation 220. The downhole tool 110' includes a focused sampling system 330, as described hereinbelow with reference to FIG. 10 and FIGS. 12-16. The focused sampling system includes a component(s) 320 extendable through the mudcake 306 and to sidewall 305 of the wellbore 218 for collecting samples. The samples are drawn into the downhole tool 110' via the focused sampling system 330.

While FIG. 8 depicts a modular wireline downhole tool 110'' for collecting samples according to embodiments of the present disclosure, it will be appreciated by those of skill in the art a focused sampling system 330 of this disclosure can be utilized in any downhole tool 110. For example, FIG. 9 shows an alternate environment in which a downhole tool 110'' including a focused sampling system 330 of this disclosure can be utilized while drilling a wellbore. In the embodiment of FIG. 9, the drill bit 216 and downhole tool 110'' are included as part of a bottom hole assembly (BHA) 248 coupled to a drill string 208. The downhole tool 110'' may be of a variety of drilling tools, such as a Measurement-While-Drilling (MWD), Logging-While Drilling (LWD) or other drilling system. The downhole tools 110' and 110'' of FIG. 8 and FIG. 9, respectively, may have alternate configurations, such as modular, unitary, wireline, coiled tubing, autonomous, drilling and other variations of downhole tools, as will be apparent to those of skill in the art upon reading this disclosure.

Downhole tool 110/110'/110'' includes a focused sampling system 330 (e.g., a focused sampling system 330A-330F, as described hereinbelow with reference to FIGS. 10 and 12-16, respectively). As noted above, a focused sampling system will generically be referred to as focused sampling system "330", and can be any one of focused sampling systems 330A-330F described hereinbelow, or a focused sampling system including a combination of the features detailed herein, such as in focused sampling systems 330A-330F (e.g., a focused sampling system such as focused sampling system 330B of FIG. 12 or focused sampling system 330C of FIG. 13 including one or more dead volumes 345 as described with reference to focused sampling system 330D of FIG. 14, focused sampling system 330E of FIG. 15, a focused sampling system 330E of FIG. 15, and/or a focused sampling system 330F of FIG. 16). The herein disclosed focused sampling systems and methods enable the flow of the fluid into the focused sampling system 330 to be adapted so that sufficiently uncontaminated formation fluid 308 (e.g., formation fluid having a purity above a desired purity and/or a level of contamination below a maximum acceptable contamination level) is collected in the downhole tool 110 during sampling.

Via the focused sampling system and method, one or more samples of formation fluid can be obtained from a formation, such that the one or more samples have a desired purity (e.g., a contamination level below a maximum contamination level). The maximum contamination (or "threshold") level can include a total amount of less than or equal to 15, 14, 13, 12, 11, 10, 9, 8, 7, 6, 5, 4, 3, 2, or 1 weight percent of one or more contaminants. The one or more contaminants include components of a fluid that are not present in the virgin fluid and/or present in the fluid at a level greater than a level thereof in the virgin fluid.

A focused sampling system can include a sample line having a sample line inlet and a sample line outlet; a guard line having a guard line inlet and a guard line outlet; a common line having a common line inlet and a common line outlet, wherein the common line inlet is fluidly connected with the sample line outlet and the guard line outlet, and wherein the common line outlet is fluidly connected with a pump suction side inlet; the pump, wherein a discharge side outlet of the pump is fluidly connected with a discard line and a sampling line, wherein the sampling line is fluidly connected with one or more sample chambers; one or more fluid identification ID sensors positioned on the guard line, the sample line, the common line, or a combination thereof; and a flow restrictor operable to prevent flow of fluid from the guard line to the common line. These components of a focused sampling system will be detailed hereinbelow.

A focused sampling system will now be described with reference to FIG. 10, which is a schematic of a focused sampling system 330A including downhole tool 110A. Focused sampling system 330A includes a sample line 361; a guard line 351; a common line 371; a pump 375; a discard line 372; a sampling line 381; one or more sample chambers 390 (with five, including first sample chamber 390A, second sample chamber 390B, third sample chamber 390C, fourth sample chamber 390D, and fifth sample chamber 390E depicted in the embodiment of FIG. 10); one or more fluid ID sensors S positioned on the guard line, the sample line, the common line, or a combination thereof (with first fluid ID sensor S1 and third fluid ID sensor S3 depicted on sample line 361, second fluid ID sensor S2 depicted on guard line 351, fourth fluid ID sensor S4 depicted on common line 371, and fifth fluid ID sensor S5 depicted on pump outlet line 376); and flow restrictor 355.

Sample line 361 has a sample line inlet 361A and a sample line outlet 361B. Guard line 351 has a guard line inlet 351A and a guard line outlet 351B. As depicted in the embodiment of FIG. 10, a focused sampling system 330 can include one or a plurality of lines that extend from guard line inlets 351A thereof and merge to form a single guard line 351 toward guard line outlet 351B. This configuration of guard line is intended to be included in the term "guard line(s) 351". In embodiments, the guard line(s) 351 is configured for a higher fluid flow rate $Q_G$ than a fluid flow rate $Q_S$ of the sample line 361. Common line 371 has a common line inlet 371A and a common line outlet 371B, and is fluidly connected with the sample line outlet 361B and the guard line outlet 351B, for example at a tee or Y junction. Pump 375 has a suction side inlet 375A and a discharge side outlet 375B. Suction side inlet 375A of pump 375 is fluidly connected with common line outlet 371B and discharge side outlet 375B of pump 375 is fluidly connected with discard line 372 and sampling line 381, for example via a tee or Y junction. In embodiments, focused sampling system 330 includes a single pump 375, whereby fluid is pulled into the tool via a common pump (e.g., single pump 375) and a common suction line (e.g., common line 371). Sampling line 381 is fluidly connected with the one or more sample chambers 390.

Flow restrictor 355 is operable to prevent flow of fluid from guard line 351 to common line 371 in a first (e.g., closed) configuration and allow flow of fluid from the guard line 351 to the common line 371 in a second (e.g., open) configuration. In embodiments, flow restrictor 355 is a shutoff valve. In embodiments, guard line(s) 351 has a flow restrictor thereupon, such as restrictor valve $V_R$, that is operable as a shutoff valve that can be actuated to prevent fluid flow through guard line 361. In some such embodiments, a separate restrictor 355 may not be present. Flow restrictor 355 can be a check valve. Restrictor 355 can be positioned on guard line 351 upstream of guard line outlet 361B. Sample line 361 can include a check valve upstream of sample line outlet 361B, in embodiments.

A focused sampling system 330 can further include a probe defining a sample zone fluidly connected with the sample line inlet of the sample line, a guard zone fluidly connected with the guard line inlet of the guard line, or both a sample zone fluidly connected with the sample line inlet of the sample line and a guard zone fluidly connected with the guard line inlet of the guard line. For example, focused system 330A of the embodiment of FIG. 10 further includes probe 340 defining sample zone 360 fluidly connected with the sample line inlet 361A of the sample line 361, and guard zone 350 fluidly connected with the guard line inlets 351A of the guard line 351. The guard zone 350 and the sample zone 360 are in fluid communication with the subsurface formation 220, during operation of the focused sampling system 330.

The comparative flow rate $Q_G$ in the guard line(s) 351 from guard zone(s) 350 and flow rate $Q_S$ in the sample line 361 from sample zone 360 (see, for example, FIG. 11A and FIG. 11B) can be represented by a ratio of flow rates $Q_G/Q_S$. (The flow rate into the sample line 361 from the sample zone is represented by $Q_S$, and is also referred to herein as the flow rate in the sample zone, and the flow rate into the guard line(s) from the guard zone(s) 350 is represented by $Q_G$, and is also referred to herein as the flow rate in the guard zone(s).) The flow rate $Q_S$ in the sample line 361 from sample zone 360 may be selectively increased and/or the flow rate $Q_G$ in the guard line(s) 351 from guard zone(s) 350 may be decreased to allow more fluid to be drawn into the sample zone 360. Alternatively, the flow rate $Q_S$ in the sample line 361 from sample zone 360 may be selectively decreased and/or the flow rate $Q_G$ in the guard line(s) 351 from guard zone(s) 350 may be increased to allow less fluid to be drawn into the sample line 361 via sample zone 360. When focused sampling system 330 includes a single pump 375, a restrictor valve 355 and/or diameter of sample line 361 and/or guard line(s) 351 can be selected to provide the desired ratio $Q_G/Q_S$ of fluid flow rate in the guard zone(s) 350 to the fluid flow rate in the sample zone 360.

The flow rate may be altered to affect the flow of fluid and optimize the intake of virgin fluid into the downhole tool 110/focused sampling system 330. Various devices may be used to measure and adjust the rates to optimize the fluid flow. Initially, it may be desirable to have increased flow into the guard zone(s) 350 when the amount of contaminated fluid is high, and then adjust the flow rate to increase the flow into the sample zone 360 once the amount of virgin fluid entering the sample zone 360 increases. In this manner, the fluid sampling may be manipulated to increase the efficiency of the sampling process and the quality of the sample with which the one or more sample chambers 390 are filled and/or the quality of a sample analyzed via the one or more sensors S to evaluate formation 220.

The guard zone 350 can be positioned at least partially concentrically (e.g., concentrically) about the sample zone 360. The sample zone 360 and the guard zone 350 can be prolate (e.g., oval) or circular in cross section. For example, FIG. 11A is a schematic end view (from the perspective of wellbore wall in contact with the probe) of a focused sampling probe 340A. In FIG. 11A, focused sampling probe 340A includes an inner concentric ring 343A and an outer concentric ring 343B, that define sample zone 350 (e.g., within inner concentric ring 343A) and guard zone 360 (e.g., between inner concentric ring 343A and outer concentric ring 343B). In FIG. 11A, inner concentric ring 343A and outer concentric ring 343B are oval in cross section shape, thus defining a guard zone 350 having an oval cross section and a sample zone 360 having an oval cross section. One or more sample zone fluid inlets 368B are fluidly connected with sample line inlet 361A of sample line 361 and one or more guard zone fluid inlets 368A are fluidly connected with guard line inlet(s) 351A of sample line 361. A sample zone fluid inlet 368B can be positioned within sample zone 360 such that a distance is maximized between sample zone fluid inlet 368B and one or more guard zone fluid inlets 368A. FIG. 11B is a schematic end view (from the perspective of wellbore wall in contact with the probe) of a focused sampling probe 340B. In FIG. 11B, inner concentric ring 343A and outer concentric ring 343B are circular (i.e., substantially round) in cross section shape, thus defining a guard zone 350 having a circular cross section and a sample zone 360 having a circular cross section. One or more sample zone fluid inlets 368B are fluidly connected with sample line inlet 361A of sample line 361 and one or more guard zone fluid inlets 368A are fluidly connected with guard line inlet(s) 351A of sample line 361. A sample zone fluid inlet 368B can be positioned at a center of sample zone 360 and one or more guard zone fluid inlets 368A are positioned about 10, 20, 30, 40, 50, 60, 70, 80, or 90% of the radial distance between inner concentric ring 343A and outer concentric ring 343B from inner concentric ring 343A. Oval focused sampling probe 340A or FIG. 11A or round focused sampling probe 340B of FIG. 11B can be utilized in the focused sampling system 330A of FIG. 10, the focused sampling system 330D of FIG. 14, the focused sampling system 330E of FIG. 15, or the focused sampling system 330F of FIG. 16. As noted above, when component 320 of the downhole tool 110 includes a probe 340/340A/340B, once the downhole tool 110 is positioned adjacent the formation 220, the probe can be extended from the downhole tool 110 through the mudcake 306 to the sidewall 305 of the wellbore 218, such that the inlets 368 are in contact with the wellbore sidewall 305.

Figure 12:
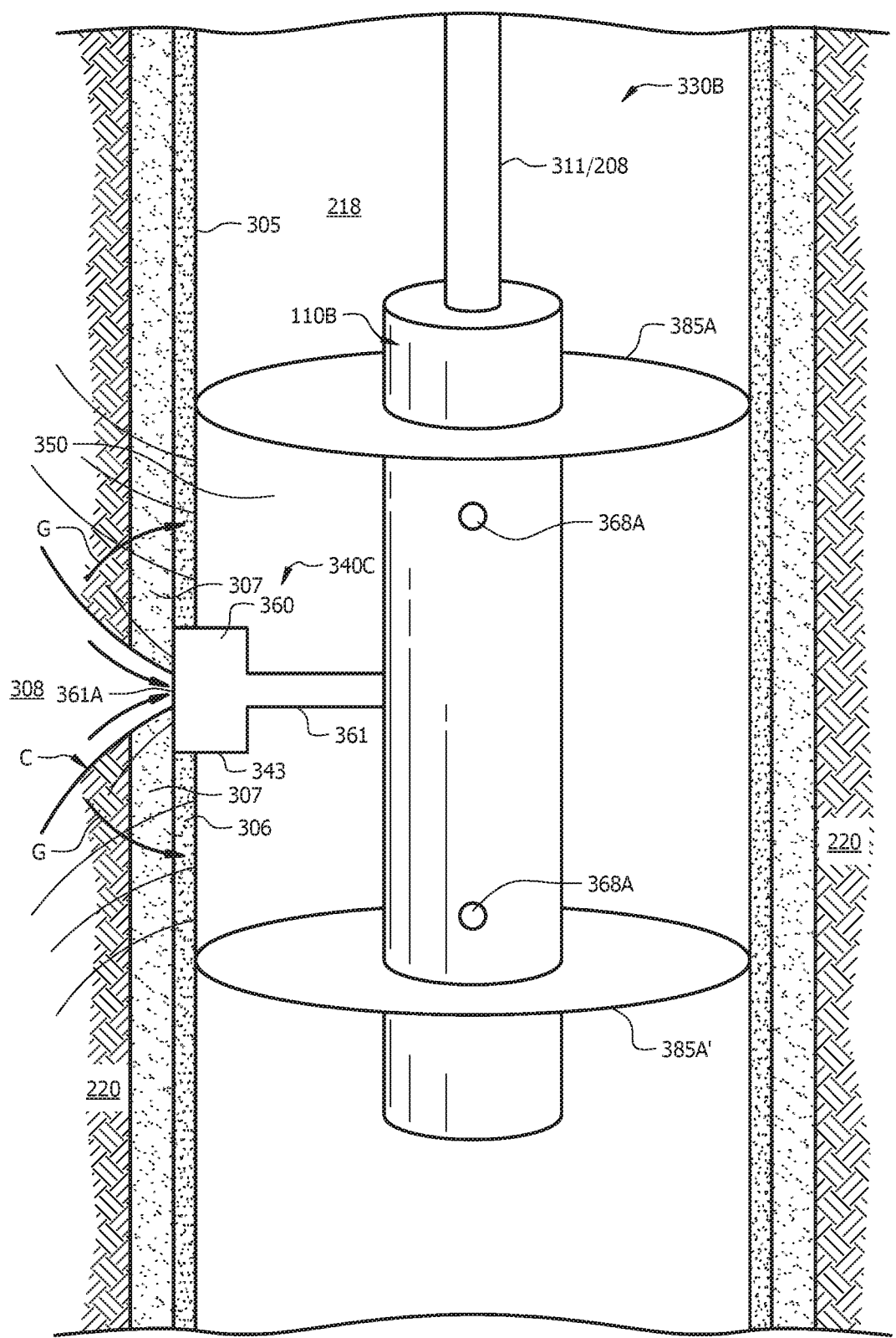
FIG. 12 is a schematic of a focused sampling system.

A focused sampling system 330 can include a combination packer/probe design, wherein the component of the focused sampling system 330 that contacts sidewall 305 of wellbore 218 include a probe and one or more packers or sets of packers. The packers can be any device capable of sealing the wellbore 218 to provide the sample zone 360 and/or the guard zone(s) 350, as described hereinbelow, such as elastomeric packers or any other suitable device. For example, FIG. 12 is a schematic of a focused sampling system 330B including downhole tool 110B. Focused sampling system 330B includes, as component 320 (FIG. 7) that contacts sidewall 305 during operation, a probe 340C and a set of packers within wellbore 218, including upper packer 385A located within wellbore 218 above focused sampling probe 340C and lower packer 385A' located within wellbore 218 below focused sampling probe 340C. When deployed, upper packer 385A, lower packer 385A', and probe 340C extend through mudcake 306 and contact sidewall 305 of wellbore 218, thus preventing flow of fluid within wellbore 218 from above upper packer 385A or below packer 385A' from flowing past upper packer 385A or lower packer 385A', respectively. Probe 340C defines sample zone 360 and upper packer 385A and lower packer 385B define guard zone 350. In this combination packer/probe design, the probe 340C defines the sample zone 360 in fluid communication with the sample line inlet 361A of the sample line 361, while the one or more packers (e.g., a packer set including upper packer 385A and lower packer 385A') define the guard zone 350, wherein the guard zone 350 includes the annulus around downhole tool 110C (e.g., the portion of focused sampling system 330B from which probe 340C extends upon deployment) and probe 340C below upper packer 385A and above lower packer 385A', and wherein the guard zone 350 is in fluid communication with the guard line inlet 351A of the guard line 351. One or more guard zone fluid inlets 368A along the body of downhole tool 110C provide passage for fluid from guard zone 350 into guard line inlet 351A of the guard line 351. The probe 340C can include a ring 343 that defines sample zone 360. Although described as a ring 343, probe 340C can define a sample zone 360 having any cross sectional shape when deployed along sidewall 305 of wellbore 218.

Figure 13:
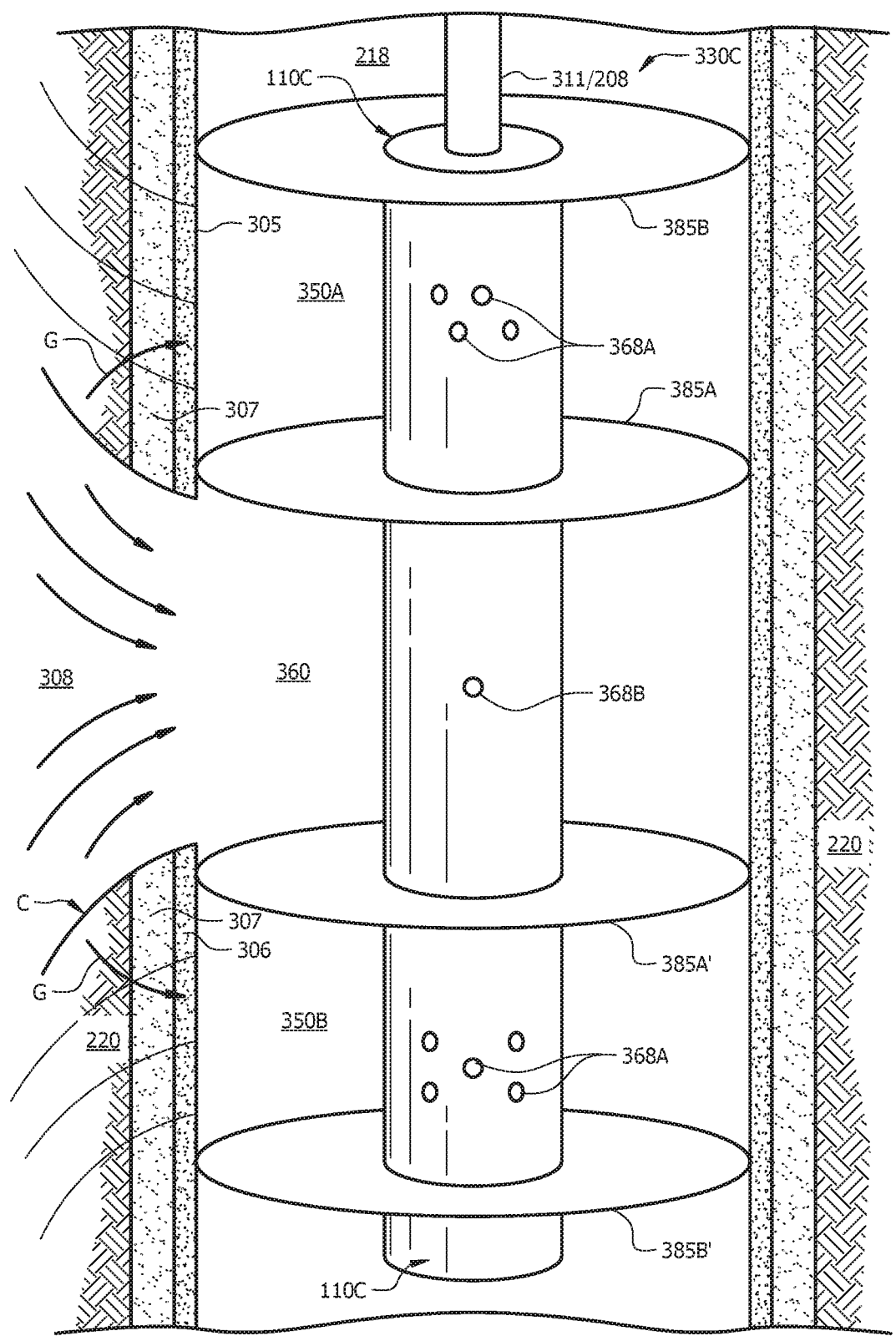
FIG. 13 is a schematic of a focused sampling system.

A focused sampling system 330 can include a multiple (e.g., dual) packer design, wherein the component of the focused sampling system 330 that contacts sidewall 305 of wellbore 218 does not include a focused sampling probe, but includes multiple packers or sets of packers. In such a packer design, one or more first packers can define the sample zone, wherein the sample zone is in fluid communication with the sample line inlet of the sample line, and one or more second packers can define the guard zone(s), wherein the guard zone(s) is in fluid communication with the guard line inlet of the guard line. For example, FIG. 13 is a schematic of a focused sampling system 330C including downhole tool 110C. Focused sampling system 330B includes, as component 320 (FIG. 7) that contacts sidewall 305 during operation, a first set of packers including first upper packer 385A and first lower packer 385A' and a second set of packers including second upper packer 385B and second lower packer 3853. When deployed, first upper packer 385A is located within wellbore 218 above first lower packer 385A', second upper packer is located within wellbore 218 above first upper packer 385A, and second lower packer 3853 is located within wellbore 218 below first lower packer 385A'. When deployed, the packers of the first packer set and the second packer set extend through mudcake 306 and contact sidewall 305 of wellbore 218, thus preventing flow of fluid within wellbore 218 from above or below the packer vertically past the packer. (Although described as "above" and "below", it is to be understood and will be readily apparent to those of skill in the art that a dual probe configuration, such as described with reference to FIG. 10, a probe packer configuration, such as described with reference to FIG. 12 and the dual packer set configuration, such as described with reference to FIG. 13 can be utilized in non-vertical wellbores 218.)

In the dual packer set configuration of FIG. 13, first upper packer 385A and first lower packer 385A' (e.g., of the first packer set) define the sample zone 360. Sample zone 360 is in fluid communication with the sample line inlet 361A of the sample line 361. Second upper packer 385B and second lower packer 3853 (e.g., of the second packer set) define the guard zone 350. In this configuration, guard zone 350 includes upper guard zone 350A, including the annulus around the body of formation tester 110D between second upper packer 385B and first upper packer 385A, and lower guard zone 350B, including the annulus around formation tester 110D between first lower packer 385A' and second lower packer 3853. Guard zone 350 (e.g., upper guard zone 350A and/or lower guard zone 350B) is in fluid communication with the guard line inlet(s) 351A of the guard line(s) 351. One or more guard zone fluid inlets 368A along downhole tool 110D provide passage for fluid from guard zone 350 (e.g., upper guard zone 350A and/or lower guard zone 350B) into guard line inlet(s) 351A of the guard line(s) 351. One or more sample zone fluid inlets 368B along downhole tool 110D provide passage for fluid from sample zone 360 into sample line inlet 361A of sample line 361.

(First) upper packer 385A, (first) lower packer 385A', second upper packer 385B and second lower packer 3853 of FIG. 12 and FIG. 13 can be referred herein to as "focused sampling packers."

As noted hereinabove, a focused sampling system 330 can further include a restrictor valve $V_R$ positioned on or upstream of the sample line, a restrictor valve positioned on or upstream of the guard line, or both. The restrictor valve $V_R$ is operable to allocate flow of fluid from the guard zone(s) 350 into the guard line 351 and/or flow of fluid from the sample zone 360 into the sample line 361, such that a ratio $Q_G/Q_S$ of the flow rate $Q_G$ of fluid into the guard line 351 and the flow rate $Q_S$ of fluid into the sample line 361 is in a desired range. For example, one or more valve restrictors $V_R$ can be utilized to provide a flow ratio $Q_G/Q_S$ in a range of from about 2:1 to about 1:2, from about 2:1 to about 1:1, or from about 1:1 to about 1:2. One or more valve restrictors $V_R$ can be utilized to provide a flow ratio $Q_G/Q_S$ of greater than or equal to about 1:1, 1.5:1, or 2:1. The one or more flow restrictors $V_R$ can provide for the flow of fluid from the guard zone(s) 350 to be greater than the flow of fluid from the sample zone 360. The valve restrictor(s) enable allocation of flow of fluid from guard zone(s) 350 through guard line 351 and flow of fluid from sample zone 360 through sample line 361 at a desired flow rate ratio $Q_G/Q_S$, as discussed further hereinbelow. In embodiments, sample line volume VS is greater than a guard line volume $V_G$, wherein the sample line volume $V_S$ is a volume from the sample line inlet 361A to the sample line outlet 361B, and wherein the guard line volume VG is a volume from the guard line inlet(s) 351A to the guard line outlet 351B. The one or more restrictor valves $V_R$ can be variably controlled restrictor valves that can be manually or automatically (e.g., when deployed downhole) adjusted to provide a desired flow rate of fluid therethrough. Restrictor valve $V_R$ can be any restrictor operable to control the relative pressure differential and hence flow rate ratio between the sample zone 360 and the guard zone(s) 350 (e.g., between inner concentric ring 343A and outer concentric ring 343B of the probe 340A or 340B of FIG. 11A and FIG. 11B, respectively). A lower pressure differential and hence lower flow rate can generally be considered favorable for the sample zone 360 (inner concentric ring 343A). The restrictor valve $V_R$ can be a variable or static flow restrictor.

A focused sampling system can further include one or more dead volumes 345 in fluid communication with the sample line 361. The one or more dead volumes 345 can be online or offline dead volumes, meaning fluid in sample line 361 flows through the one or more dead volumes ("online") or does not flow through the one or more dead volumes ("offline") during a pre-sampling time period (discussed further hereinbelow). The one or more dead volumes 345 can include a first dead volume and a second dead volume in series along the sample line 361. The one or more dead volumes 345 provide a total dead volume $V_{TOT}$. In embodiments, the total dead volume $V_{TOT}$ is greater than or equal to a total sample volume of the one or more sample chambers 390.

The ideal size (e.g., total volume or $V_{TOT}$) of the one or more dead volume(s) 345 can be twice as large sample volume (e.g., a total volume of the one or more sample chambers 390) plus the flow line volume between the one or more dead volumes 345 and the one or more sample chambers 390. For example, without limitation, if the sample volume of the one or more sample chambers 390 is 1 liter and the flow line volume between the one or more dead volumes 345 and the one or more sample chambers 390 is 30 mL, the ideal total dead volume $V_{TOT}$ can be equal to or greater than 2.03 L. The total dead volume $V_{TOT}$ provided by the one or more dead volumes 345 can be less than the sample size (e.g., the volume of the one or more sample chambers 390). In such instances, a clean fluid cone C flushed during the combined pumpout (e.g., the clean fluid cone C provided during pumping at step 103 described hereinbelow with reference to FIG. 17) can be used to supply the cleaner fluid to the one or more sample chambers 390. The total dead volume (e.g., $V_{TOT}$) provided by the one or more dead volumes 345 can be sufficiently large to overcome fluid compressibility issues with respect to the sample volume (e.g., the total volume of the one or more sample chambers 390) when filling the one or more sample chambers 390 with overpressure.

Figure 10:
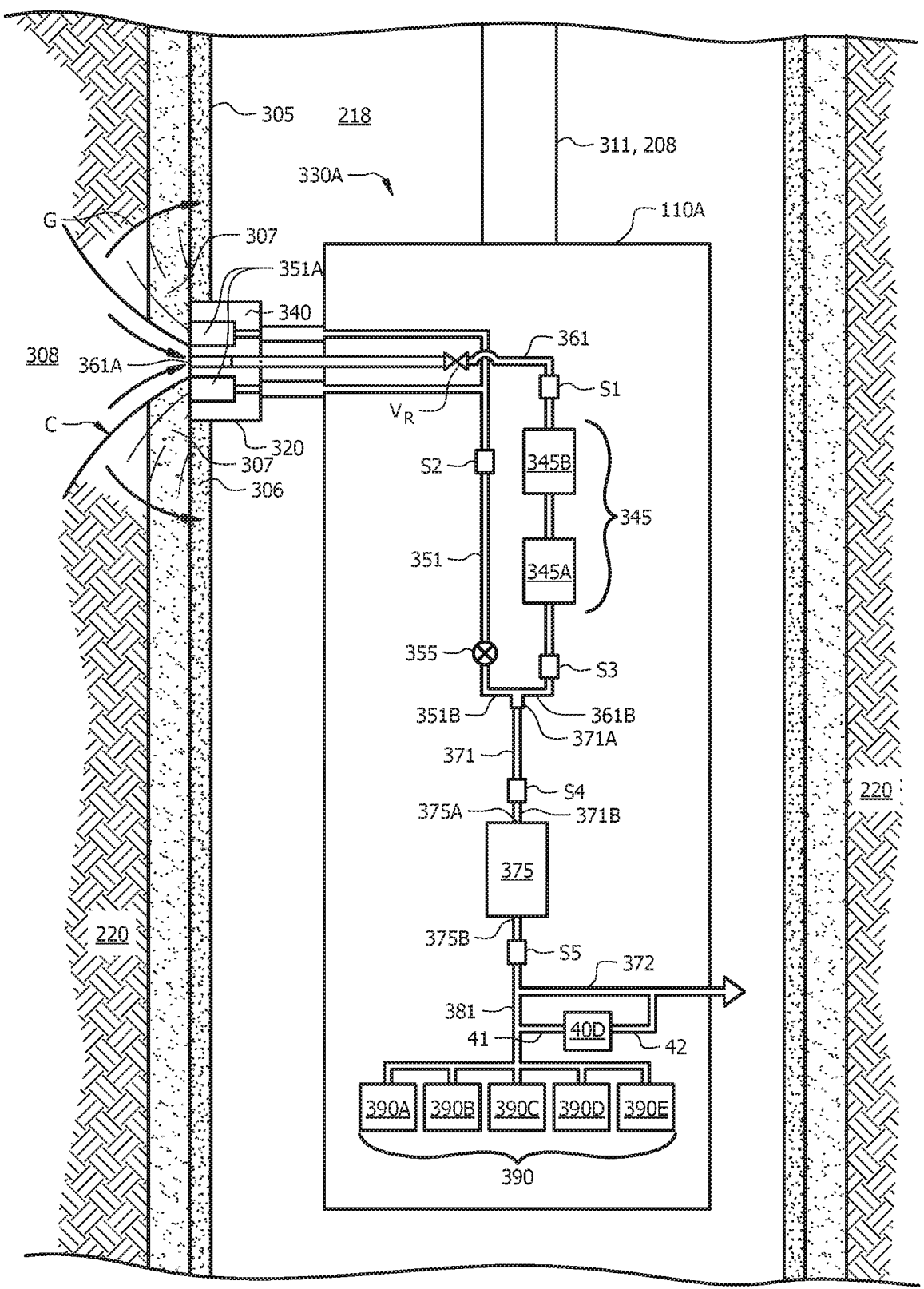
FIG. 10 is a schematic of a focused sampling system.
Figure 11A:
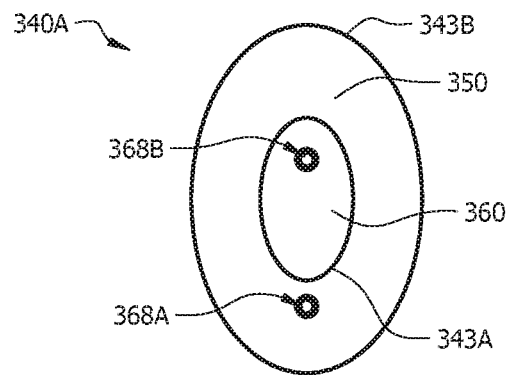
FIG. 11A is a schematic end view of a focused sampling probe.
Figure 11B:
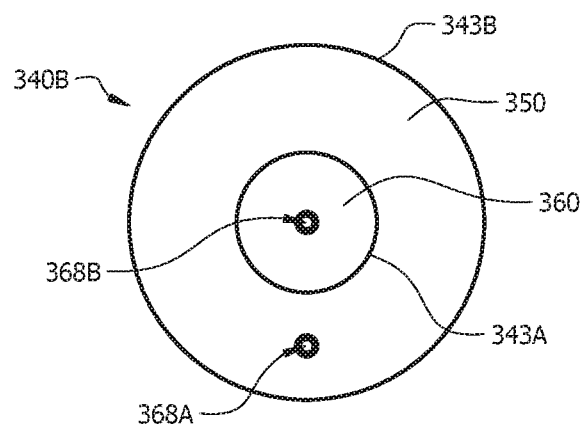
FIG. 11B is a schematic end view of a focused sampling probe.

The total dead volume can be divided between two dead volumes (such as depicted in FIG. 10) with a restriction optionally containing a check valve $V_C$ therebetween. The use of two dead volumes providing $V_{TOT}$ can prevent the direct mixing of the two dead volumes. As fluid flows from the inner portion (e.g., the center) of the formation flow cone C (FIG. 10; described further hereinbelow), as clean fluid cone C collapses after closing of flow restrictor 355 (e.g., a guard line shutoff valve on guard line 351), the fluid may become dirtier as the one or more sample chambers 390 are filled. Therefore, after shutting the flow restrictor 355 on the guard line 351 (e.g., after discontinuing flow of fluid from guard zone 350 into common line 371 at step 105 described with reference to FIG. 17 hereinbelow), rather than mix the fluid drawn into sample line 361 from sample zone 360 with a primary dead volume (e.g., a first dead volume 345A, described hereinbelow with reference to FIG. 10), the incoming fluid can be mixed with a secondary dead volume (e.g., second dead volume 345B) upstream of the primary dead volume. In this manner, the fluid within the secondary dead volume 345B then displaces the fluid in the first dead volume 345A. A gradient can exist across the dead volumes 345, with the dirtiest (e.g., most contaminated) fluid at the inlet of the dead volume and the cleanest (e.g., least contaminated) fluid at the outlet of the dead volume in each of the one or more dead volumes 345. Accordingly, by utilizing two (or more) dead volumes 345, the cleanest fluid can be introduced into the one or more sample chambers 390. The secondary dead volume (e.g., second dead volume 345B of FIG. 10) can be divided into multiple dead volumes in order to optimize the gradient across the sample line 361 after the flow restrictor or "guard shutoff valve" 355 has been actuated (e.g., at step 105 described herein with reference to FIG. 17). Also the volume of the first dead volume (e.g., volume VA of first dead volume 345A of FIG. 10) can be increased in size, however, the greater this volume VA, the longer it can take to flush before sampling (e.g., the flushing of step 106 described hereinbelow with reference to FIG. 17). The use of more than one dead volume 345 on the sample line 361 upstream of pump 375 can be utilized to optimize space within downhole tool 110 and/or to improve flushing noted above and further detailed hereinbelow.

As depicted in FIG. 10, focused sampling system 330A includes a first dead volume 345A and a second dead volume 345B on sample line 361 between the sample line inlet 361A and the sample line outlet 361B. First dead volume 345A and second dead volume 345B can be in series. A check valve $V_C$ can be positioned between first dead volume 345A and second dead volume 345B. First dead volume 345A and second dead volume 345B can be provided by enlarged diameter sections of sample line 361 or chambers fluidly connected along sample line 361. Various online and offline configurations can be utilized for the one or more dead volumes 345, and such will be readily apparent to those of skill in the art with the help of this disclosure. For example, without limitation, the one or more dead volumes 345 can be provided by coiled tubing along sample line 361, expanded diameter sections of sample line 361, chambers fluidly connected with sample line 361, cylinders including hydraulically actuated pistons, or the like. A few such embodiments will now be described with reference to FIG. 14, FIG. 15, and FIG. 16.

Figure 14:
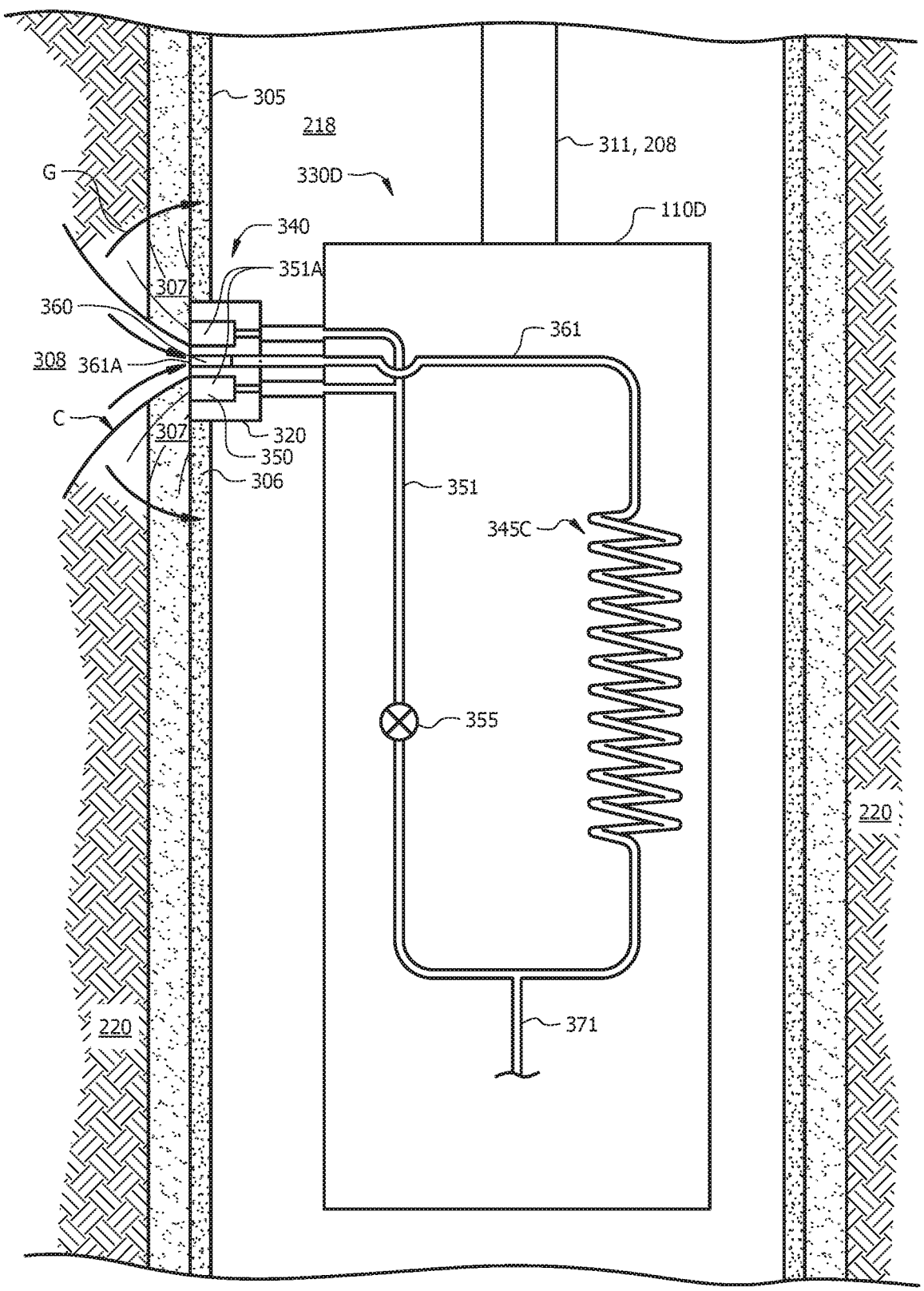
FIG. 14 is an abbreviated schematic of a focused sampling system including an alternative dead volume.

The dead volume 345 can include an extended tubing section, such as but not limited to coiled tubing. FIG. 14 is an abbreviated schematic of a focused sampling system 330D including a downhole tool 110D, including such an alternative dead volume. In FIG. 14, a dead volume 345C includes coiled tubing. The coiled tubing dead volume 345C of FIG. 14 is depicted as an online dead volume. However, a coiled tubing dead volume, such as 345C, can be an offline coiled tubing dead volume. Coiled tubing dead volume 345C is positioned along sample line 361. Although depicted substantially as illustrated and described with reference to FIG. 10 (e.g., a dual probe configuration in which probe 340 provides the sample zone 350 and the guard zone 360), the remainder of focused sampling system 330D can include any arrangement of components as described herein. For example, a coiled tubing dead volume 345C can be employed with a focused sampling system having a probe packer configuration (e.g., with a probe defining sample zone 360 and one or more packers defining guard zone 350), as depicted and described hereinabove with reference to focused sampling system 330B of FIG. 12. Alternatively, a coiled tubing dead volume 345C can be employed with a dual packer configuration (e.g., with a first set of packers defining sample zone 360 and a second set of packers defining guard zones 350A and 350B), as depicted and described herein with reference to the FIG. 13.

Figure 15:
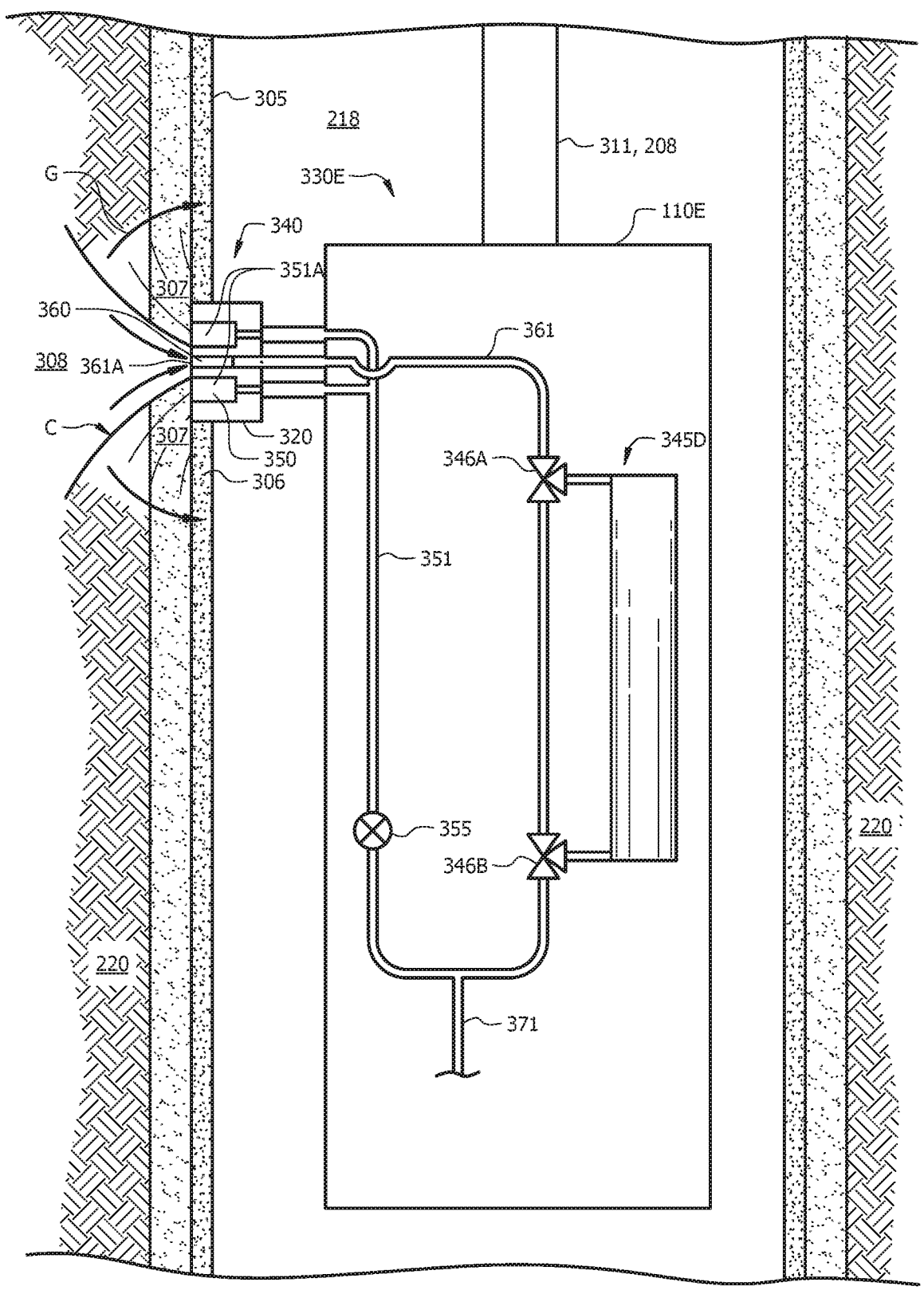
FIG. 15 is an abbreviated schematic of a focused sampling system including an alternative dead volume.

The one or more dead volumes 345 can include an offline dead volume on a side arm with respect to the sample line 361 through the pumpout (e.g., during formation of the clean cone C during step 103 described hereinbelow with reference to FIG. 17) and the flow of fluid in the sample line 361 can be diverted to the dead volume 345 at a later time after pumpout initiation when the flow cone C around sample zone 360 is cleaner than at the beginning of the pumpout. Such a configuration can avoid a slow flushing (e.g., a protracted flushing time, as described with reference to step 106 of FIG. 17 hereinbelow) of the dead volume 345 by filling the dead volume 345 with clean(er) fluid initially. FIG. 15 is an abbreviated schematic of a focused sampling system 330E including a downhole tool 110E including such an alternative dead volume. In FIG. 15, a dead volume 345D includes a "side" chamber fluidly connected with sample line 361. Dead volume 345D can be divided into two side chambers in series (similar to first dead volume 345A and second dead volume 345B of FIG. 10). A first switch valve 346A and/or second switch valve 346B can be operable to direct flow of fluid in sample line 361 into or around (bypassing) dead volume 345D. The side chamber dead volume 345D of FIG. 15 is depicted as an online dead volume. However, a side chamber dead volume, such as 345D, can be utilized as an offline or online side chamber dead volume. Although the remainder of focused sampling system 330E is depicted substantially as illustrated and described with reference to FIG. 10 (e.g., a dual probe configuration in which probe 340 provides the sample zone 360 and the guard zone 350), the remainder of focused sampling system 330E can include any arrangement of components as described herein. For example, a side chamber dead volume 345D can be employed with a focused sampling system having a probe packer configuration (e.g., with a probe defining sample zone 350 and one or more packers defining guard zone 360), as depicted and described herein with reference to focused sampling system 330B of FIG. 12. Alternatively, a side chamber dead volume 345D can be employed with a dual packer configuration (e.g., with a first set of packers and a second set of packers defining sample zone 360 and guard zones 350A and 350B), as depicted and described herein with reference to FIG. 13.

Figure 16:
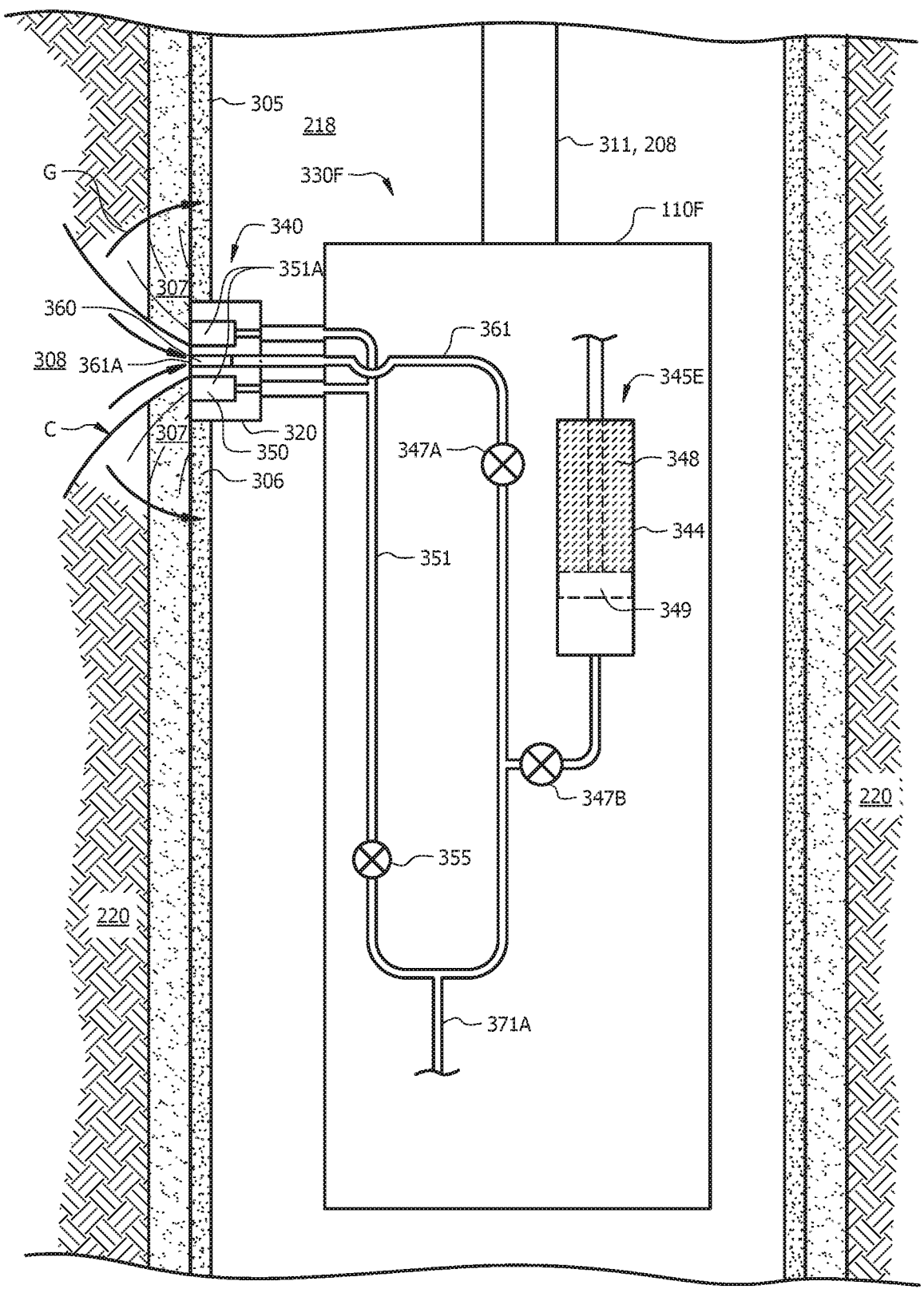
FIG. 16 is an abbreviated schematic of a focused sampling system including an alternative dead volume.

The dead volume(s) 345 can include a cylinder with a piston actuated when filling the one or more sample chambers 390. FIG. 16 is an abbreviated schematic of a focused sampling system 330F including a downhole tool 110F including such an alternative dead volume. In FIG. 16, a dead volume 345E includes a cylinder 344 including piston 349, hydraulically actuatable by a hydraulic fluid 348 (and a pump, not shown in FIG. 16), that is fluidly connected with sample line 361. A first valve 347A and/or second valve 347B can be operable to direct flow of fluid in sample line 361 into dead volume 345E or prevent fluid flow thereto. The dead volume 345E of FIG. 16 is operable as an offline dead volume. However, a hydraulic piston dead volume, such as 345E, can be utilized as an online dead volume. Although the remainder of focused sampling system 330F is depicted substantially as illustrated and described with reference to FIG. 10 (e.g., a dual probe configuration in which probe 340 provides the sample zone 350 and the guard zone 360), the remainder of focused sampling system 330F can include any arrangement of components as described herein. For example, a hydraulic piston dead volume 345E can be employed with a focused sampling system having a probe packer configuration (e.g., with a probe defining sample zone 350 and one or more packers defining guard zone 360), as depicted and described herein with reference to focused sampling system 330B of FIG. 12. Alternatively, a hydraulic piston dead volume 345E is employed with a dual packer configuration (e.g., with packers defining sample zone 360 and guard zones 350A and 350B), as depicted and described herein with reference to FIG. 13.

As noted hereinabove, a focused sampling system 330 can include one or more MEMS devices 40 and/or one or more sample chambers 390. For example, focused sampling system 330A of FIG. 10 includes MEMS device 40D and first sample chamber 390A, second sample chamber 390B, third sample chamber 390C, fourth sample chamber 390D, and fifth sample chamber 390E. Valves (not shown in FIG. 10) can be utilized to direct the flow of fluid from pump outlet line 376 into discard line 372 during a pre-sampling time period, including during a flushing time period, and to direct the flow of fluid from pump outlet line 376 into the MEMS device 40 and/or the one or more sample chambers 390 during a sampling time period. The pre-sampling time period, the flushing time period, and the sampling time period are described further hereinbelow with reference to FIG. 17. In aspects, no downhole MEMS device 40D is present in downhole tool 110A, and one or more focused formation fluid samples 390 are collected as described herein, returned to surface 240, and analyzed via a MEMS device 40 uphole. Alternatively, downhole tool 110A includes a downhole MEMS device 40D and no sample chambers 390, and one or more focused formation samples are analyzed downhole by introduction of focused formation fluid directly into downhole MEMS device 40D. In alternative aspects, downhole tool 110A includes both a downhole MEMS device 40 and one or more sample chambers 390. In such aspects, focused formation fluid samples can be analyzed in downhole MEMS device 40D and one or more samples of the focused formation fluid collected in one or more sample chambers 390 for additional or alternative analyses uphole.

Although depicted as downstream of pump 375, the one or more MEMS devices 40 and/or sample chambers 390 may be positioned at various positions within a focused sampling system 330. For example, one or more MEMS devices 40D and/or one or more sample chambers 390 can be positioned on a sampling line 381 fluidly connected with common line 371 upstream of pump 375. Sample inlet line 41 can be configured to introduce focused formation sample fluid from sampling line 381 into MEMS device 40D and sample outlet line 42 can fluidly connect MEMS device 40D with discard line 372, with the one or more sample chambers 390, and/or outside of (e.g., external to) downhole tool 110A.

Each of the one or more MEMS devices 40D can be a MEMS device 40 as described hereinabove. Each of the one or more sample chambers 390 can be a sample chamber such as known to those of skill in the art. Each of the one or more sample chambers 390 can be a sample chamber such as known to those of skill in the art. For example, the sample chambers 390 can include a bottle, and/or can contain a piston therein and be pressurized during sample filling. It will be appreciated that a variety of one or more sample chambers 390 may be used. The one or more sample chambers 390 can be interconnected with flowlines that extend to other of the one or more sample chambers 390, other portions of the downhole tool 110, the borehole 218 and/or other charging chambers. Preferably, the one or more sample chambers 390 are positioned to collect clean fluid. Moreover, it is desirable to position the one or more sample chambers 390 for efficient and high quality receipt of clean formation fluid. Fluid from the sample line 361, the guard line 351, the common line 371, the sampling line 381, or a combination thereof may be collected in one or more sample chambers 390 and/or dumped into the borehole 218. Furthermore, there is no requirement that a sample chamber 390 be included in a focused sampling system 330 of this disclosure. For example, such a focused sampling system absent any sample chambers 390 can be operable to determine properties of the clean sample line 361 fluid (which can be utilized for formation evaluation) without actually taking a sample thereof into a sample chamber 390.

As noted hereinabove, a focused sampling system 330 can include one or more fluid ID sensors S positioned on the guard line 351, the sample line 361, the common line 371, or a combination thereof. For example, in FIG. 10, focused sampling system 330A includes first fluid ID sensor S1 and third fluid ID sensor S3 located toward sample line inlet 361A and sample line outlet 361B of sample line 361, respectively, second fluid ID sensor S2 on guard line 351, fourth fluid ID sensor S4 on common line 371, and fifth fluid ID sensor S5 on pump outlet line 376. One or more fluid ID sensors S can be located on any combination of the guard line 351, the common line 371 upstream of pump 375, the pump outlet line 376 downstream of pump 375, the sampling line 381, or a combination thereof.

The one or more fluid ID sensors S can include pressure gauges, fluid analyzers, or the like. For example, pressure gauges may be connected to sample line 361 and guard line 351 to measure parameters therebetween, such as differential pressure. Such sensors may be located at other positions along any of the flowlines of the focused sampling system, as desired.

The one or more fluid ID sensors S (sometimes referred to herein as fluid monitoring devices) can be used to determine downhole parameters, such as, without limitation, content, contamination levels, chemical content (e.g., percentage of a certain chemical/substance), hydro mechanical (viscosity, density, percentage of certain phases, or the like), electromagnetic (e.g., electrical resistivity), thermal (e.g., temperature), dynamic (e.g., volume or mass flow), optical (absorption or emission), radiological, pressure, temperature, salinity, pH, radioactivity (gamma, neutron and/or spectral energy), carbon content, clay composition and content, oxygen content, and/or other data about the fluid and/or associated downhole conditions. One or more fluid ID sensors S can be utilized to collect optical measurements, such as optical density. Sensor data from the one or more fluid ID sensors S may be collected, transmitted to the surface 240 (e.g., surface of the earth or a platform) and/or processed downhole. Pressure gauges may be used, for example, to compare pressure levels in the sample line 361 and guard line(s) 361, for fault detection, or for other analytical and/or diagnostic purposes. Measurement data may be collected, transmitted to the surface 240 and/or processed downhole. This data, alone or in combination with additional data from the one or more fluid ID sensors S can be used to determine downhole conditions and/or make decisions (e.g., determine when to initiate sampling via steps 105, 106, and/or 107 described with reference to FIG. 17 hereinbelow). The one or more fluid ID sensors S can be operable to determine, without limitation, density, viscosity, bubble point, compressibility, capacitance, resistivity, acoustic, optical, mass spectroscopy, chromatography, NMR, nuclear, or a combination thereof. In aspects, one or more of the fluid sensors S1-S5 includes a MEMS device 40. In such aspects, a MEMS device 40 can be utilized to determine when fluid in sample line 361 is sufficiently clean for taking the sample of formation fluid (e.g., for introducing sample fluid into one or more sample chambers 390 and/or introducing the clean formation fluid as sample 224A for analysis in a MEMS device 40). In such aspects, the MEMS device 40 utilized to determine when to take the sample can be the same as or different from a MEMS device 40 utilized to determine the one or more components of the sample 224A of the clean formation fluid obtained via the focused sampling.

While described as one or more fluid ID sensors S, other fluid monitoring devices, such as gauges, meters, sensors and/or other measurement or equipment can be incorporated into a focused sampling system 330. Such equipment can be utilized to determine various properties of the fluid, such as temperature, pressure, composition, contamination and/or other parameters known to those of skill in the art. A controller can be included in focused sampling system 330 to take information from the one or more fluid ID sensors S and send signals in response thereto to alter the flow of fluid into the sample line 361 via sample zone 360, into the guard line(s) 351 via the guard zone(s) 350, into the discard line 372, and/or into the sampling line 381 of focused sampling system 330. Such a controller can be located in other parts of the downhole tool 110 and/or a surface system located at surface 240 for operating various components of the focused sampling system 330.

The one or more sample chambers 390 and/or one or more sensors S, such as a fluid analyzer, can be positioned near a probe 340/340A and/or upstream of the pump 375. It can be beneficial to sense fluid properties from a point closer to the subsurface formation 220, or the source of the fluid. Accordingly, it can be beneficial to test and/or sample upstream of the pump 375. Pump 375 typically agitates the fluid passing therethrough. Such agitation can spread the contamination to fluid passing through the pump and/or increase the amount of time before a clean sample may be obtained. By testing and/or sampling upstream of the pump 375, such agitation and spread of contamination may be reduced and/or avoided.

A focused sampling system 330 (e.g., 330A/330B/330C/330D/330E/330F) can include: a sample line 361 having a sample line inlet 361A and a sample line outlet 361B and containing fluid from a sample zone 360 of a subsurface formation 220 passing through the sample line 361 at a sample line fluid flow $Q_S$ allocated from the subsurface formation 220 into the sample line 361; a guard line 351 having a guard line inlet 351A and a guard line outlet 351B and containing fluid from a guard zone 350 of the subsurface formation 220 passing through the guard line 351 at a guard line fluid flow $Q_G$ allocated from the subsurface formation 220 into the guard line 351; a common line 371 having a common line inlet 371A and a common line outlet 371B, wherein the common line inlet 371A is fluidly connected with the sample line outlet 361B and the guard line outlet 351B and has a common line fluid flow $Q_C$ including the guard line fluid flow $Q_G$ allocated from the guard zone 350 into the guard line 351 and the sample line fluid flow $Q_S$ allocated from the sample zone 360 to the sample line 361, and wherein the common line outlet 371B is fluidly connected with a pump suction side inlet 375A of a pump 375; the pump 375, wherein a discharge side outlet 375B of the pump 375 is fluidly connected with a discard line 372 and a sampling line 381, and wherein the sampling line 381 is fluidly connected with one or more sample chambers 390; one or more fluid ID sensors S positioned on the guard line 361, the sample line 361, the common line 371, or a combination thereof; and a flow restrictor 355 operable to prevent flow of fluid from the guard line 351 to the common line 371 in a first configuration and allow flow of fluid from the guard line 351 to the common line 371 in a second configuration When the focused sampling system 330 is in a pre-sampling mode, during which a purity of the fluid in the sample line 361, as determined by the one or more fluid ID sensors S, is below the desired purity, the flow restrictor 355 is in the second configuration and thus allowing flow of fluid from the guard line 351 to the common line 371, and the focused sampling system 330 is configured such that pump 375 pumps fluid from the common line 371 to the discard line 372. When the focused sampling system 330 is in a sampling mode, initiated when a purity of the fluid in the sample line 361, as determined by the one or more fluid ID sensors S, is at or above the desired purity, the flow restrictor 355 is in the first configuration and thus preventing flow of fluid from the guard line 351 to the common line 371, and the focused sampling system 330 is configured such that the pump 375 pumps fluid from the common line 371 to the one or more sample chambers 390. Accordingly, via the focused sampling system 330 and method 100, during a sampling (time) period, subsequent the pre-sampling (time) period, fluid is not drawn into the guard line(s) 351 via the guard zone(s) 350.

The focused sampling system 330 can further include a variety of additional devices, such as, without limitation, restrictors, diverters, processors and other devices for manipulating flow and/or performing various formation evaluation operations. Such additional devices will be apparent to those of skill in the art with the help of this disclosure and are not detailed herein.

It should be understood that a focused sampling system 330 can be implemented on any downhole tool 110 performing formation evaluation services regardless of the conveyance means of such downhole tool, without departing from the scope of the present disclosure. Thus, the downhole tool 110 including the focused sampling system 330 can be used for obtaining clean reservoir fluid (e.g., liquid and/or gas) during sampling applications using, for example, downhole tools 110 on drill pipe (i.e., formation evaluation and/or reservoir sampling capabilities incorporated on a drill string), as well as, without limitation, wireline systems.

Figure 17:
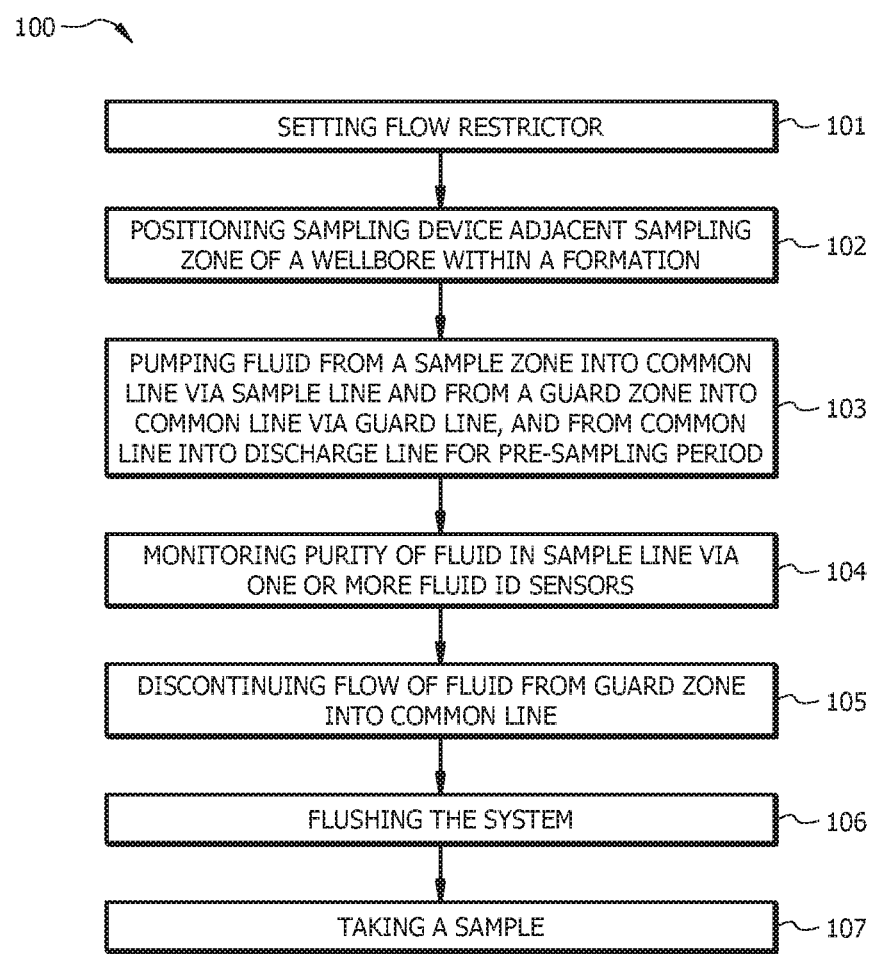
FIG. 17 is a flow chart of a method of focused sampling.

A method of focused sampling via the focused sampling system 330 will now be provided with reference to FIG. 17, which is a flow chart of a method 100 of focused sampling, according to embodiments of this disclosure.

Focused sampling method 100 includes: positioning a focused sampling system 330 as described hereinabove adjacent the sidewall 305 of wellbore 218 within a formation 220 at step 102; pumping fluid from the sample zone 360 of the formation 220 into the common line 371 via the sample line 361 and from the guard zone 350 of the formation 220 into the common line 371 via the guard line 351, and from the common line 371 into the discard line 372 for a pre-sampling period in which the flow restrictor 355 is in the second configuration, allowing flow of fluid from the guard line 351 to the common line 371 at step 103; monitoring a purity of the fluid in the sample line 361 via the one or more fluid ID sensors S at step 104; upon detecting that the purity of the fluid in the sample line 361 is at or above a desired purity: discontinuing flow of fluid from the guard zone 350 into the common line 371 by configuring the flow restrictor 355 in a first configuration in which flow of fluid from guard line 351 to common line 371 is prevented at step 105; and taking a sample by pumping fluid from the common line 371 into the MEMS device 40 and/or into one or more sample chambers 390 at step 107.

The method includes positioning a focused sampling device or system 330 (e.g., focused sampling system 330A-30F) as described hereinabove within a wellbore 218 within a formation 220 at step 102. As detailed hereinabove, the focused sampling device 330 includes: a sample line 361 having a sample line inlet 361A and a sample line outlet 361B; a guard line 351 having a guard line inlet 351A and a guard line outlet 351B; a common line 371 having a common line inlet 371A and a common line outlet 371B, wherein the common line inlet 371A is fluidly connected with the sample line outlet 361B and the guard line outlet 351B, and wherein the common line outlet 371B is fluidly connected with a pump suction side inlet 375A of a pump 375; the pump 375, wherein a discharge side outlet 375B of the pump 375 is fluidly connected with a discard line 372 and a sampling line 381, wherein the sampling line 381 is fluidly connected with one or more sample chambers 390; one or more fluid ID sensors S positioned on the guard line 351, the sample line 361, the common line 371, or a combination thereof; and a flow restrictor 355 configured to prevent flow of fluid from the guard line 351 to the common line 371 in a first configuration and allow flow of fluid from the guard line 351 to the common line 371 in a second configuration. Positioning the focused sampling system 330 in the borehole 218 penetrating the subterranean formation 220 can be performed using at least one of a drill string 208 (FIG. 9) and a wireline 311 (FIG. 8).

The focused sampling system 330 can be a part of a downhole tool 110' of a wireline assembly or a bottom hole assembly (BHA) 248 of a drilling tool 110", as depicted and described hereinabove with reference to FIG. 8 and FIG. 9, respectively. That is, downhole tools 110A-110F of FIG. 10 and FIG. 12 to FIG. 16, respectively, can include a wireline downhole tool 110', as depicted in FIG. 8, or a drilling tool 110", as depicted in FIG. 9. Those of ordinary skill in the art given the benefit of this disclosure will appreciate that the focused sampling system and method of this disclosure can be utilized in downhole applications other than conventional rotary drilling, and are not limited to land-based rigs. Examples of other downhole applications may involve the use of wireline tools (see, e.g., FIG. 7 or FIG. 8), casing drilling, coiled tubing, and other downhole tools.

As further depicted in FIG. 17, the focused sampling method 100 can further include, prior to positioning the focused sampling device 330 adjacent the sample zone 360 of the wellbore 218 within the formation 220, setting the flow restrictor 355 or another flow restrictor, such as a restrictor valve $V_R$ on sample line 361 and/or guard line(s) 351) of the focused sampling device 330 to provide a desired flow volume ratio $Q_G/Q_S$ between the guard line 351 and the sample line 361 at step 101. For example, restrictor valve $V_R$ and/or a flow restrictor 355, as described hereinabove, can be set to a desired value prior to positioning the focused sampling system 330 within wellbore 218. This can allow for allocating the flow of fluid from the guard zone 350 through guard line 351 and flow of fluid from the sample zone 360 through sample line 361. The desired flow volume ratio $Q_G/Q_S$ can be set to a value as described hereinabove. Alternatively, the desired flow ratio can be allocated subsequent positioning of the focused sampling system 330 downhole, for example, via an automatic or manual controller located at the surface 240 and in signal communication with the focused sampling system 330. The flow restriction provided by restrictor valve(s) $V_R$ and/or flow restrictors 355 can be set at step 101 based, for example, on an expected fluid mobility. For example, the ratio $Q_G/Q_S$ of the flow rate $Q_G$ of fluid from formation 220 into guard zone(s) 350 to the flow rate $Q_S$ of fluid from formation 220 into sample zone 360 can be set to about 2 or greater for highly mobile formation fluid. Restrictor valve(s) $V_R$ can be variably controlled to optimize cleanup (e.g., formation of clean formation fluid cone C) based on the permeability of formation 220 and/or a cleanup response. The greater the permeability, the greater the restriction of fluid flow to sample line 361 via sample zone 360 provided by a restrictor valve $V_R$ on sample line 361 (and/or a flow restrictor 355 on sample line 361) may be. Alternatively, the cleanup rate as measured by one or more fluid sensors S can be utilized to optimize the flow rate ratio $Q_G/Q_S$ by means such as, but not limited, to simplex optimization.

Once the downhole tool 110 including the focused sampling system 330 is positioned downhole within wellbore 218, probe 340/340A as described with reference to FIG. 10 and FIG. 11, and/or packers (e.g., upper or first upper packer 385A and lower or first lower packer 385A' as described with reference to FIG. 11 and FIG. 12 and/or second upper packer 385B and second lower packer 385B as described hereinabove with reference to FIG. 12) can be positioned (e.g., extended or inflated) against sidewall 305 of wellbore 218 to provide sample zone 360 and guard zone(s) 350 as described hereinabove with reference to FIG. 10, FIG. 12 and FIG. 13. For example, a probe 340 as described herein can be extended from downhole tool 110 including focused sampling system 330 for engagement of the probe 340 with wellbore sidewall 305. The packer(s) are operable for sealing with the wellbore sidewall 305. The packer(s) contact the wellbore sidewall 305 and form a seal with the mudcake 306 lining the wellbore 218. As described with reference to FIG. 6 and FIG. 7, the mudcake 306 seeps into the wellbore wall 305 and creates an invaded zone 307 about the wellbore 218. The invaded zone 307 contains mud and other wellbore fluids that contaminate the surrounding formation(s) 2, including the formation 220 and a portion of the virgin formation fluid 308 contained therein.

Subsequent positioning of the focused sampling device 330 at step 102, the method includes, at step 103, pumping fluid from the sample zone 360 of the formation 220 into the common line 371 via the sample line 361 and from the guard zone 350 of the formation 220 into the common line 371 via the guard line 351, and from the common line 371 into the discard line 372 for a pre-sampling period in which the flow restrictor 355 is in the second configuration, allowing flow of fluid from the guard line 351 to the common line 371. As depicted in FIG. 6, prior to the pumping of fluid at step 103 (which step 103 can also referred to herein as "pumpout"), the invaded or contaminated zone 307 extends vertically beyond sidewall 305 a distance into formation 220. With reference to FIG. 7 and FIG. 10, during pumping at step 103, a central flow cone C of clean formation fluid 308 is created in formation 220, while a mud filtrate gradient from virgin fluid 308 to contaminated fluid 309 extends from the boundaries of flow cone C to sidewall 305 of wellbore 218, as indicated by gradient arrow G. The pumpout of step 103 positions the sample zone 360 within the clean flow cone C, such that uncontaminated formation fluid is eventually drawn in through sample line 361, while contaminated fluid is drawn into guard line 351 via the guard zone(s) 350 positioned in the contaminated zone 307. Clean formation fluid from the center flow cone C can subsequently be utilized to displace fluid in sample line 361 and capture a sample (e.g., in the one or more sample chambers 390) before the flow cone C collapses. The ratio of the guard flow rate $Q_G$ to the sample zone flow rate $Q_S$ can be allocated such that the flow of fluid from the guard zone 350 is greater than the flow of fluid from the sample zone 360. Step 103 can thus also be considered a step of creating a clean fluid flow cone C in the formation 220, wherein the clean fluid flow cone C is included of formation fluid in the center of the flow cone C and a gradient to filtrate (e.g., along gradient arrow G) occurs from the center of flow cone C to the sidewall 305 of wellbore 218). The gradient can be optimized by the use of a restrictor valve $V_R$ (or other flow restrictor, such as flow restrictor 355 on guard line 351) located on at least one of the sample line 361 and the guard line(s) 351. The method can further include optimizing the ratio $Q_G/Q_S$ of the flow rate $Q_G$ of fluid from formation 220 into guard zone 350 to the flow rate $Q_S$ of fluid from formation 220 into sample zone 360 by selection of the flow restrictor setting at step 101 and/or adjustments of the flow restriction during pumping at step 103 based on at least one fluid mobility fluid sensor measurement.

The method 100 further includes, at step 104, monitoring a purity of the fluid in the sample line via the one or more fluid ID sensors S while continuing pumping as described at step 103. The monitoring at step 104 is utilized to determine when central cone C of clean formation fluid has been created within formation 220. The monitoring can be effected via a fluid ID sensor S (such as fluid ID sensor S1 and/or fluid ID sensor S3) on the sample line 361 in conjunction with a fluid ID sensor S (such as fluid ID sensor S2) on the guard line 351, a fluid ID sensor S (such as fluid ID sensor S4) on the common line 371, or both a fluid ID sensor S (such as fluid ID sensor S2) on the guard line 351 and a fluid ID sensor S (such as fluid ID sensor S4) on the common line 371. Monitoring the purity of the fluid in the sample line 361 via the one or more fluid ID sensors S further includes comparing measurements obtained from a fluid ID sensor S (such as fluid ID sensor S1 and/or fluid ID sensor S3) on the sample line 361 with measurements obtained from a fluid ID sensor S (such as fluid ID sensor S2) on the guard line 351 and/or a fluid ID sensor S (such as fluid ID sensor S4) on the common line 371. Accordingly, monitoring at step 104 is utilized to decide when to acquire the sample(s) (e.g., in the one or more sample chambers 390) and/or perform analysis on the clean formation fluid based in part on at least one measurement of the one or more fluid ID sensors S. Monitoring at step 104 can include obtaining one or more fluid measurements from one or more fluid ID sensors on sample line 361 with or without comparison to fluid measurements obtained from one or more fluid ID sensors S on guard line 351 and/or common line 371 to calculate a drilling fluid filtrate contamination in the fluid in sample line 361.

As detailed further hereinbelow, once monitoring at step 104 determines that the fluid in sample line 361 has a desired contamination value (e.g., a desired purity), a sequence can be initiated to close the guard line 351 via flow restrictor 355 at step 105, (optionally) flush the common line 371 (and optionally dead volumes 345) at step 106, and take a sample at step 107. Taking the sample can include diverting the sample fluid in sample line 381 to MEMS device 40D and/or filling one or more sample chambers 390. That is, the formation sample can be introduced into a MEMS device 40D located within the downhole tool 110, and/or a clean sample can be collected in one or more sample chambers 390 that can be returned to surface 240 and subsequently introduced into an uphole MEMS device 40.

Step 105 includes, upon detecting that the purity of the fluid in the sample line 361 is at or above a desired purity (or the contamination is at or below a maximum contamination level) at step 104, discontinuing flow of fluid from the guard zone 350 into the common line 371 by configuring the flow restrictor 355 in the first (e.g., closed/restricted) configuration, such that the flow of fluid in common line 371 subsequently includes solely the flow of fluid from sample line 361.

The method can further include flushing the focused sampling system 330 by passing a flush volume of fluid from the sample zone 360 of the formation 220 to the discard line 372 via the sample line 361 and the common line 371 at step 106. This flushing step 106 can be utilized to ensure that the system has been sufficiently cleaned (e.g., that any contaminated fluid downstream of a fluid ID sensor S that has indicated the presence of clean fluid has been flushed out of the focused sampling system 330). The flush volume can be at least three, two, or one times a volume of fluid contained by the focused sampling device 330 between the sample line inlet 361A and the sample line outlet 361B.

The method 100 further includes, at step 107 subsequent to the discontinuing of the flow of fluid from the guard zone 350 into the common line 371 at step 105 and/or subsequent to the optional flushing of the focused sampling system 330 at step 106, taking a sample. Taking a sample can include introducing the formation sample into a downhole MEMS device 40D and/or filling the one or more sample chambers 390 by pumping fluid from the common line 371 into the MEMS device 40 and/or into the one or more sample chambers 390. The one or more samples can be acquired (e.g., introduced into the MEMS device 40 and/or the one or more sample chambers 390) based on timing with respect to the actuation of the flow restrictor 355 (e.g., guard line shutoff valve) on guard line 351 at step 105 of discontinuing of the flow of fluid from the guard zone 350 into the common line 371. The timing of introduction of clean formation fluid into the MEMS device 40 and/or the one or more sample chambers 390 can be determined at least in part with respect to a pump flow rate of pump 375. That is, based on the pump flow rate of pump 375, a flushing time period of step 106 and/or a sampling time period of step 107 can be determined.

For offline dead volumes 345, the sequence can be altered such that, upon detecting that the purity of the fluid in the sample line 361 is at or above a desired purity (or the contamination is at or below a maximum contamination level) at step 104, fluid flow can be diverted from the sample line 361 to the (previously offline, now online) dead volume(s) 345 whereby the dead volume(s) 345 is (are) flushed. Flushing the dead volume(s) 345 can be effected via flow through (e.g., via switch valves 346A and 346B for dead volume(s) 345D such as depicted in FIG. 15) or sufficient stroking of a piston (e.g., piston 349 of FIG. 16 and operation of valves 347A and 347B). After flushing of the dead volume(s) 345, step 105 of discontinuing the flow of fluid from the guard line(s) 361 into common line 371 can be effected (e.g., by closing the guard line 351 via flow restrictor 355) and fluid diverted from the dead volume(s) 345 via the sample line 361 to common line 371. Common line 371 can then be flushed at step 106 prior to taking one or more samples in the MEMS device 40D and/or the one or more sample chambers 390. Accordingly, in offline dead volume embodiments, flushing of the system at step 106 can be performed partially before and partially after step 105.

As noted hereinabove, a volume of at least one, two or three times a volume of a component (e.g., a volume of a dead volume 345, a total volume $V_{TOT}$ of the one or more dead volumes 345, a volume of common line 371) can be utilized to flush the component. For example, if a dead volume being flushed is 2 liters, flushing the dead volume 345 can include passing a flush volume of at least 2, 4, or 6 liters through the dead volume 345 to flush the dead volume 345 prior to sampling (e.g., taking a measurement with the one or more fluid ID sensors for formation evaluation and/or introducing sample fluid into the one or more sample chambers 390). If the common line 371 has a volume of 30 mL, flushing the common line 371 can include passing a flush volume of at least 30, 60, or 90 mL through the common line 371 to flush the common line 371.

A focused sampling method can further include discontinuing drilling prior to positioning the focused sampling device 330 within the wellbore 218 at step 102; retrieving the one or more sample chambers 390 from the wellbore subsequent the taking of the samples (e.g., the filling of the one or more chambers 390) at step 107; continuing drilling within the formation subsequent the taking of the sample(s) at step 107; or any combination or repetition of one or more thereof. For example, focused sampling system 330 can be a component of a drilling tool 110" including a LWD or MWD drilling tool (e.g., as depicted in FIG. 9). In such applications, the focused sampling method can include discontinuing drilling prior to positioning the focused sampling device 330 within the wellbore 218 at step 102; continuing drilling within the formation 220 subsequent the taking of the sample(s) at step 107; or a combination or repetition of one or more thereof. In alternative applications, focused sampling system 330 is a component of a wireline tool 110' (as depicted, for example, in FIG. 8), and a focused sampling method further includes retrieving the one or more sample chambers 390 from the wellbore 218 subsequent the taking of the sample(s) (i.e., the filling of the one or more chambers 390) at step 107 by retrieving the wireline tool 110' from the wellbore 218. Such a method can further include inserting a drill string 208 into wellbore 218, and continuing drilling within the formation 220 subsequent the filling of the one or more chambers 390 at step 107 and the removal thereof from wellbore 218. The one or more samples in the one or more chambers 390 can be introduced into a MEMS device 40 and/or otherwise analyzed once the one or more sample chambers 390 have been returned uphole. Various combinations and arrangement of steps described herein will be apparent to those of skill in the art upon reading this disclosure and are intended to be included herein.

As noted hereinabove, the focused sampling device 330 can further include one or more dead volumes 345 fluidly connected with the sample line 361. In such instances, taking the sample(s) at step 107 can include pumping fluid from the one or more dead volumes 345 into the common line 371 and from the common line 371 into the MEMS device 40D and/or into the one or more sample chambers 390.

In embodiments including one or more dead volumes 345, wherein the one or more dead volumes 345 can be positioned offline, flushing the focused sampling system at step 106 can further include isolating the one or more dead volumes 345 from the fluid flow path (e.g., from sample line inlet 361A to sample line outlet 361B) prior to flushing the focused sampling system 330 at step 106 and de-isolating (e.g., putting back into the flow path of fluid from sample line inlet 361A to sample line outlet 361B) the one or more dead volumes 345 from the fluid flow prior to taking the sample(s) at step 107. For example, with reference to FIG. 15, switch valve 346A and/or switch valve 346B can be operated to allow the flow of fluid from sample line 361 into dead volume 345D during the pumping at step 103 and/or the monitoring at step 104. Subsequently or concurrently with the discontinuing of the flow of fluid from guard zone 350 into common line 371 at step 105, switch valve 346A and/or switch valve 346B can be positioned to prevent flow of fluid from sample line 361 into dead volume 345D. In this manner, a focused sampling system (e.g., focused sampling system 330E of FIG. 15) can be flushed with a smaller volume of fluid than would be required to flush the focused sampling system without isolating the one or more dead volumes from the flow path during the flushing at step 106.

The one or more dead volumes 345 can be offline during the pumping at step 103, the monitoring at step 104, the discontinuing at step 105, and/or the flushing at step 106, and can be put online (e.g., in the fluid flow path from sample line inlet 361A to sample line outlet 361B) subsequent to or concurrently with the discontinuing at step 105 and/or the flushing at step 106. For example, with reference to FIG. 16, valve 347A can be open and valve 347B closed to prevent the flow of fluid from sample line 361 into dead volume 345E during the pumping at step 103 and the monitoring at step 104. Subsequently or concurrently with the discontinuing the flow of fluid from guard zone 350 into common line 371 at step 105 and/or the flushing at step 106, switch valve 346B can be opened and piston 349 actuated to fill dead volume 345E with fluid from sample line 361, whereafter valve 347B can be closed. Subsequent flushing of the focused sampling system 330F at step 106, switch valve 347A can be closed to prevent flow of fluid from dead volume 345E back toward formation 220, and valve 347A can be opened, whereby taking the sample(s) at 107 can be effected by actuating piston 349 to depress the fluid out of dead volume 345E into the MEMS device 40D and/or into the one or more sample chambers 390. For example, the one or more dead volumes 345E can offline dead volumes, and the method can further include, at step 105, upon detecting that the purity of the fluid in the sample line 361 is at or above the desired purity, diverting flow of fluid from the sample inlet 361A of the sample line 361 to the one or more dead volumes 345E.

Subsequent discontinuing flow of fluid from guard zone(s) 350 into common line 371 (e.g., actuating a restrictor 355 (e.g., a shutoff valve) in the guard line 351) at step 105, clean fluid in central fluid flow cone C is introduced to MEMS device 40D and/or one or more sample chambers 390 before collapse of the flow cone C results in the introduction of filtrate from the invaded zone 307 along gradient arrow G into the MEMS device 40D and/or the one or more sample chambers 390. The one or more dead volumes 345 on sample line 361 upstream of common line 371 can be utilized to extend the time for collecting the one or more samples in the MEMS device 40D and/or the one or more sample chambers 390 prior to filtrate invasion into flow cone C and sample zone 360.

A focused sampling method can include: placing a formation fluid sampling device 330 adjacent a sampling zone in a wellbore 218 penetrating a subterranean formation 220; concurrently pumping, via a common pump 375 disposed within the sampling device 330, a sample flow of formation fluid in a sample flow line 361 from the subterranean formation 220 into the sampling device 330 and a guard flow of formation fluid in a guard flow line 351 from the subterranean formation 220 into the sampling device 330, wherein the guard flow rate $Q_G$ is greater than the sample flow rate $Q_S$ and forms a guard zone 350 around and adjacent the sample zone 360 within the sampling zone; during the concurrently pumping, analyzing the formation fluid in the sample flow line 361 to determine whether an amount of contaminant within the formation fluid in the sample flow line 361 has dropped below a threshold value; and, upon determining that the amount of contaminant within the formation fluid in the sample flow line 361 has dropped below a threshold value, decreasing or discontinuing the guard flow of the formation fluid in the guard flow line 351 and diverting the sample flow of the formation fluid in the sample flow line 361 to a MEMS device 40 and/or one or more sample chambers 390.

A focused sampling method of this disclosure can include: allocating flow of fluid from a guard zone 350 through a guard line 351 and flow of fluid from a sample zone 360 through a sample line 361, wherein the guard zone 350 is positioned at least partially concentrically about the sample zone 360 and wherein the guard zone 350 and the sample zone 360 are in fluid communication with a formation 220; pumping, via a common line 371, a combined flow of fluid from the formation 220 through to a discard line 372 for a pre-sampling time period until the flow allocated into the sample line 361 from the sample zone 360 includes formation fluid 308 having a desired purity (or a contamination level below a maximum contamination level), wherein the combined flow includes the flow of fluid allocated from the guard zone 350 into the guard line 351 and the flow of fluid allocated from the sample zone 360 into the sample line 361; subsequent the pre-sampling time period, discontinuing flow from the guard line 351 into the common line 371, such that the combined flow includes only the flow of fluid from the sample line 361; and introducing the combined flow including the flow of fluid from the sample line 361 into a MEMS device 40 and/or into one or more sample chambers 390.

The focused sampling method can further include, subsequent the discontinuing the flow from the guard line 351 into the common line 371, introducing the combined flow including the flow of fluid from the sample line 361 to the discard line 372 via the combined flow line 371 for a flushing time period prior to the introducing the combined flow including the flow of fluid from the sample line 361 into MEMS device 40 and/or the one or more sample chambers 390. As noted hereinabove, a sample line volume $V_S$ of the sample line 361 can be greater than a guard line volume $V_G$ volume of the guard line 351, wherein the sample line volume $V_S$ is a volume from the sample line inlet 361A to the sample line outlet 361B, and wherein the guard line volume $V_G$ is a volume from the guard line inlet 351A to the guard line outlet 351B.

As described hereinabove, the method can further include one or more dead volumes 345 in fluid communication with the sample line 361. The one or more dead volume 345 can include a first dead volume 345A and a second dead volume 345B in series along the sample line 361 between the sample line inlet 361A and the sample line outlet 361B, wherein the one or more dead volumes provide a total dead volume $V_{TOT}$.

The method can further include, subsequent the discontinuing the flow from the guard line 351 into the common line 371, introducing the combined flow including the flow of fluid from the sample line 361 to the discard line 372 via the combined flow line 371 for a flushing time period prior to the introducing the combined flow including the flow of fluid from the sample line 361 into the MEMS device 40 and/or one or more sample chambers 390, and wherein the flushing time period is a time sufficient to pass a volume of at least three times the total dead volume $V_{TOT}$ to the discard line 372.

As noted hereinabove, allocating can include selecting or adjusting a restrictor valve $V_R$ positioned on or upstream of the sample line 361, a restrictor valve $V_R$ positioned on or upstream of the guard line 361, or both. The restrictor valve $V_R$ can be a variably controlled restrictor valve. Discontinuing the flow from the guard line 351 into the common line 371 can include actuating a flow restrictor 355 (e.g., variable or static) on the guard line 351. The method can further include determining an end of the pre-sampling time by data received from one or more fluid ID sensors S positioned on the guard line 361, the sample line 361, the common line 371, or a combination thereof. The flow of fluid $Q_G$ from the guard zone 350 can be greater than the flow of fluid $Q_S$ from the sample zone 360 during the pumping, via the common line, of the combined flow of fluid from the formation 220 through to the discard line 372 for the pre-sampling time period.

Those of ordinary skill in the art will readily appreciate various benefits that may be realized by the focused sampling described herein. Contamination in (e.g., LWD) sampling is a significant issue. Cleanup to acceptable contamination takes very long times with conventional focused sampling systems. Also because of the potential for active drilling fluid filtrate invasion, baseline contamination levels are generally higher than with a more established mudcake. Focused sampling is a technique used to both speed up the rate of sampling and obtain cleaner samples. Conventional focused sampling often requires two pumps and a relatively complicated plumbing system, but can be utilized to obtain the sample 224A of the subterranean fluid 224, in aspects. A focused sampling system and method can be utilized to provide a technique to achieve an at least partially focused sample and obtain advantages of full focused sampling, but with a single pumpout system. In aspects, a focused sampling system and method provides a degree of focused sampling conventionally effected with dual pumps with a focused sampling system 330 including only a single pump.

During pumpout (e.g., at step 103 of FIG. 17), fluid is pulled through the guard zone(s) 350 and sample zone 360. Fluid can fill the one or more dead volumes 345 through the sample zone 360, whereby the fluid is drawn into focused sampling system 330 via the cleaner cross section of the fluid flow cone C. The more contaminated guard fluid from the dirtier outer portion of and/or outside the fluid flow cone C can be drawn into guard line 351 and thus bypasses sample line 361 and optionally one or more dead volumes 345 and commingles with the fluid in the sample line 361 after the one or more dead volumes 345 (e.g., in common line 371). Accordingly, a cleaner sample fluid is in reserve in the one or more dead volumes 345 for sampling. After the fluid in the sample line 361 is considered sufficiently clean by the one or more fluid ID sensors S at the monitoring of step 104, the restrictor 355 (e.g., shutoff valve) on the guard line 361 can be actuated at step 105. This shuts off flow from the guard zone 350 (e.g., an outer concentric ring 343B of probe 340), but fluid still flows from the sample zone (e.g., an inner concentric ring 343A of probe 340). The cross section of fluid from flow cone C entering the sample line 361 is initially cleaner than the cross section of fluid from the outer cone (e.g., in invaded zone 307 outside clean cone C), however, the clean flow cone C will collapse with time, after discontinuing the flow of fluid from guard zone 350 at step 105. The fluid from sample zone 360 (e.g., within the inner concentric ring 343A of dual probe configuration of FIG. 10 or within ring 343 of probe 340A of FIG. 12) will displace the fluid in the one or more dead volumes 345 being held in reserve for sampling. After a volume equal to or greater than the flow line volume between the one or more dead volumes 345 and the one or more sample chamber(s) 390 has been pumped through discard line 372, the fluid may be diverted into the one or more sample chambers 390. Accordingly, via the herein disclosed focused sampling system and method, a clean fluid can be obtained utilizing a single pump/pumpout system.

Conventional two pump and private line focused sampling double required capital and double downhole tool (e.g., the bottom hole assembly) space over existing non-focused sampling designs. A focused sampling system and method such as described herein with reference to FIGS. 6-17 can utilize a modification to a conventional non-focused sampling device, optionally requiring only slightly more space, such as to achieve the desired dead volume and enable faster attaining of cleaner samples, approaching or equaling the performance of full focused sampling.

The focused sampling system and method can be utilized for manipulating the flow of fluids through a downhole tool 110 to reduce contamination entering and/or passing through the downhole tool 110. The focused sampling system and method utilized to obtain the subterranean fluid sample 224 can, in aspects, be capable, with a single pump, of diverting contaminants away from clean formation fluid, and operable for analyzing the fluid passing through flowlines of the downhole tool, manipulating the flow of fluid through the downhole tool, responding to detected contamination, removing contamination, separating virgin formation fluid from contaminated fluid, selectively collecting virgin fluid apart from contaminated fluid, optimizing the quantity and/or quality of formation fluid extracted from the formation for sampling, adjusting the flow of fluid according to sampling needs and/or contamination levels, controlling the sampling operation manually, automatically, and/or on a real-time basis, analyzing the fluid flows to detect contamination levels, estimating time to clean up contamination prior to taking one or more fluid samples, adjusting flowline ratios, determining contamination levels, and comparing flowline data to known or desired values. The focused sampling system and method can enable, with the use of a single pump, optimization of the testing and/or sampling process. In some cases, such optimization may be in response to real time measurements, operator commands, pre-programmed instructions and/or other inputs.

Also disclosed herein is a method of dosing one or more components to provide a wellbore servicing fluid 229 having a desired composition for introduction into a wellbore 218. The method includes: determining a concentration of the one or more components of the subterranean fluid 224 in one or more samples 224A of the subterranean fluid 224; and adjusting or maintaining the dosing of one or more components of a WSF 229 being introduced into the wellbore 218 based on the determining of the concentration of the one or more components in the one or more samples 224A of the subterranean fluid 224. The determining of the concentration of the one or more components includes, for each of the one or more samples 224A, contacting the sample 224A of the subterranean fluid 224 with a microelectromechanical system (MEMS) device 40 to provide a sample response indicative of the concentration of the one or more components.

In aspects, the subterranean fluid 224 includes returned WSF 229 returned to surface 240 after passage through drill string 208. As described hereinabove, the one or more samples 224A can include an uphole sample 224A of returned WSF 229 taken along a flow path (e.g., uphole flow path 219A) of the wellbore servicing fluid 229 downstream of the wellbore (e.g., above surface 240 and after passage of the wellbore servicing fluid 229 out of the annulus 228/wellbore 218); a downhole sample 224A of the wellbore servicing fluid 229 taken along a flow path (e.g., downhole flow path 219B) of the wellbore servicing fluid 229 below surface 240; or a combination thereof.

Also disclosed herein is a method of servicing a wellbore 218 using MEMS concentration determination method described hereinabove. The wellbore servicing method for servicing a wellbore 218 includes: determining a concentration of one or more components of a subterranean fluid 224 in one or more samples 224A of the subterranean fluid 224; and adjusting or maintaining one or more operating parameters of the wellbore servicing based on the determining of the concentration of the one or more components in the one or more samples 224A of the subterranean fluid 224. As detailed hereinabove, the determining of the concentration of the one or more components includes, for each of the one or more samples 224A, contacting the sample 224A of the subterranean fluid 224 with a microelectromechanical system (MEMS) device 40 to provide a sample response indicative of the concentration of the one or more components.

In aspects, the method further includes fluidly coupling a pump 222 to a source of a wellbore servicing fluid 229 and to the wellbore 218; communicating wellbore servicing fluid 229 into a formation 220 in fluid communication with the wellbore 218 via the pump 222; and adjusting or maintaining a composition, rheology, and/or a flow rate of the wellbore servicing fluid 229 being communicated into the formation 220 based on the determining of the concentration of the one or more components of the subterranean fluid 224. As noted hereinabove, in aspects, the subterranean fluid includes the WSF 229 returned to the surface 240 and/or a formation fluid.

In aspects, an operational parameter of the wellbore servicing operation based on the determining of the concentration of the one or more components of the subterranean fluid 224 includes adjusting or maintaining a composition of the wellbore servicing fluid 229 being communicated into the formation 220. In aspects, adjusting or maintaining the composition of the wellbore servicing fluid 229 being communicated into the formation 220 includes adjusting or maintaining a dosing of one or more components into the wellbore servicing fluid 229 based on the determining of the concentration of the one or more components in the one or more samples 224A of the subterranean fluid 224.

As noted hereinabove, the adjusting or maintaining the operational parameter of the wellbore servicing operation based on the determining of the concentration of the one or more components can be at least partially automated. The determining the concentration of one or more components of the subterranean fluid 224 in the one or more samples 224A of the subterranean fluid can be performed substantially in real time.

The method can further include monitoring a trend in the determined concentration of one or more components of the subterranean fluid 224, and utilizing the monitoring of the trend in the adjusting or maintaining of the operational parameter of the wellbore servicing operation. Trending of the concentration of the one or more components of the subterranean fluid 224 can be utilized to understand and/or predict future events (e.g., a gas kick, etc.). When a MEMS device 40 (e.g., MEMS device 40D) is positioned downhole, monitoring of trends can be utilized to manage the wellbore servicing system (e.g., adjust the composition, flow rate, rheology, etc., of the WSF 229 being introduced into the wellbore 218) and/or adjust another operational parameter of the wellbore servicing system prior to the WSF 229 returning uphole/to surface 240. That is, utilization of a downhole MEMS device (e.g., MEMS device 40D) can provide advance warning and effecting of responsive action prior to the sampled WSF 229 being returned to surface 240.

Also disclosed herein is a system (e.g., wellbore servicing system 200) for servicing a wellbore 218. The system includes: at least one microelectromechanical system (MEMS) device 40 operable for determining a concentration of one or more components of a subterranean fluid 224 via a sample response indicative of the concentration of the one or more components, wherein the sample response is obtained via contact of a sample 224A of the subterranean fluid 224 with the MEMS device 40; and a feedback system (e.g., wellbore servicing fluid control system 231, wellbore monitoring system 210, communication link(s) 242) operable to adjust or maintain one or more operating parameters of the servicing of the wellbore based on the determined concentration of the one or more components.

As noted hereinabove, the at least one MEMS device 40 can be located uphole or downhole. The system (e.g., wellbore servicing system 200) can include a MEMS device 40 (e.g., MEMS device 40A, MEMS device 40B, and/or MEMS device 40C) configured for determining of the concentration of the one or more components of the subterranean fluid 224 (e.g., returned WSF 229) at an uphole location (e.g., on a sample 224A of the subterranean fluid 224 taken from a volume of the WSF 229 subsequent passage of the volume of the WSF 229 in the wellbore 218); a MEMS device 40 (e.g., MEMS device 40D) configured for determining of the concentration of the one or more components at a downhole location on a sample 224A of the subterranean fluid 224 taken from a volume of the subterranean fluid 224 downhole; an uphole MEMS device 40 configured for determining of the concentration of the one or more components at an uphole location on a sample 224A of the subterranean fluid 224 taken from a volume of the subterranean fluid 224 downhole (e.g., when a sample 224A of the subterranean fluid 224 is obtained in a sample chamber 390 via downhole tool 110 and returned to surface 240 for analysis in the MEMS device 40); or a combination thereof.

The system can, in aspects, provide real time determining of the concentration of the one or more components of the subterranean fluid 224. The system can be at least partially automated.

Those of ordinary skill in the art will readily appreciate various benefits that may be realized by the present disclosure. The herein disclosed method provides for determining a concentration of one or more components of a subterranean fluid 224 during a wellbore servicing operation; and adjusting or maintaining an operational parameter of the wellbore servicing operation based on the determining of the concentration of the one or more components, wherein the determining of the concentration of the one or more components includes contacting a sample 224A of the subterranean fluid 224 with a MEMS device 40 to provide a sample response indicative of the concentration of the one or more components. The method can enable real time and/or automated response. For example, in aspects, the method can enable real time and/or at least partly automated dosing of one or more components of a wellbore servicing fluid 229 being introduced into the wellbore 218 and/or real time and/or automated adjustment of another operational parameter of the wellbore servicing operation.

ADDITIONAL DISCLOSURE

The following are non-limiting, specific embodiments in accordance with the present disclosure:

In a first embodiment, a method comprises determining a concentration of one or more components of a subterranean fluid; and adjusting or maintaining at least one operating parameter of a wellbore servicing operation based on the determining of the concentration of the one or more components, wherein the subterranean fluid comprises a fluid obtained from a subterranean formation during the wellbore servicing operation, wherein the determining of the concentration of the one or more components comprises contacting a sample of the subterranean fluid with a microelectromechanical system (MEMS) device to provide a sample response indicative of the concentration of the one or more components.

A second embodiment can include the method of the first embodiment, wherein the MEMS device comprises a sensor having microcantilever-based self-sensing array (SSA) technology.

A third embodiment can include the method of the second embodiment, wherein the sensor comprises an array of microcantilevers with integrated piezoelectric sensing elements that provide electrical actuation and sensing of resonance frequency.

A fourth embodiment can include the method of the third embodiment, wherein the array of microcantilevers include, for each of the one or more components, one or more microcantilevers comprising a coating sensitive to an analyte specific to the each of the one or more components.

A fifth embodiment can include the method of the fourth embodiment, wherein the coating of at least a portion of the array of microcantilevers comprises a polymer.

A sixth embodiment can include the method of any one of the first to fifth embodiments, wherein the subterranean fluid comprises a produced fluid, a formation fluid, a reservoir fluid, or a combination thereof.

A seventh embodiment can include the method of the sixth embodiment, wherein the subterranean fluid is returned to the surface with a returned wellbore servicing fluid, wherein the returned wellbore servicing fluid comprises a wellbore servicing fluid returned to the surface after introduction into the wellbore and passage along a flow path within the wellbore.

An eighth embodiment can include the method of any one of the first to seventh embodiments, wherein the one or more components comprise a hydrocarbon, a gas, or a combination thereof, returned to the surface with a returned wellbore servicing fluid.

A ninth embodiment can include the method of the eighth embodiment, wherein the gas comprises an acid gas.

A tenth embodiment can include the method of the eighth embodiment, wherein the gas comprises hydrogen sulfide ($H_2S$), carbon monoxide (CO), carbon dioxide ($CO_2$), methane ($CH_4$), or a combination thereof.

An eleventh embodiment can include the method of the tenth embodiment, wherein the determining of the concentration of the one or more components is performed at a downhole location, and wherein the sample is taken from a volume of the subterranean fluid downhole.

A twelfth embodiment can include the method of the tenth embodiment, wherein adjusting or maintaining at least one operating parameter of the wellbore servicing operation comprises adjusting a weight of a wellbore servicing fluid being introduced into the wellbore, reducing a pumping rate of a wellbore servicing fluid being introduced into the wellbore, ceasing the pumping of the wellbore servicing fluid into the wellbore, and/or choking and pressurizing at the surface in advance of a kick, or a combination thereof.

A thirteenth embodiment can include the method of the eighth embodiment, wherein the one or more components comprise a hydrocarbon, and wherein adjusting or maintaining at least one operating parameter of the wellbore servicing operation comprises adjusting an operating parameter relating to a treatment and/or discharge of the returned wellbore servicing fluid, adjusting a composition of the wellbore servicing fluid being introduced into the wellbore, or a combination thereof.

A fourteenth embodiment can include the method of any one of the first to thirteenth embodiments, wherein the determining of the concentration of the one or more components is performed at an uphole location, and wherein the sample is taken from a volume of the subterranean fluid subsequent passage of the volume of the subterranean fluid from below a surface of the wellbore to above the surface of the wellbore; wherein the determining of the concentration of the one or more components is performed at a downhole location, and wherein the sample is taken from a volume of the subterranean fluid downhole; or a combination thereof.

A fifteenth embodiment can include the method of the fourteenth embodiment, comprising determining the concentration of the one or more components at a downhole location, wherein the subterranean fluid comprises a formation fluid, and wherein the sample is a focused sample taken from a volume of the formation fluid downhole.

A sixteenth embodiment can include the method of the fifteenth embodiment further comprising obtaining the focused sample of the formation fluid via a downhole focused sampling apparatus.

A seventeenth embodiment can include the method of any one of the first to sixteenth embodiments, wherein the determining of the concentration of the one or more components is performed on samples of the subterranean fluid taken at two or more locations along a flow path of the subterranean fluid from a downhole location to an uphole location.

An eighteenth embodiment can include the method of the seventeenth embodiment, wherein the two or more locations include an uphole location, wherein the uphole location comprises a location along the flow path of the subterranean fluid upstream of a surface of the wellbore.

A nineteenth embodiment can include the method of any one of the first to eighteenth embodiments, wherein the determining of the concentration of the one or more components of the subterranean fluid further comprises: after contacting the sample with the MEMS device to provide the sample response, providing a treated sample by treating the sample to selectively alter a response of the MEMS device; contacting the treated sample with the MEMS device to provide a treated sample response; and utilizing a difference between the treated sample response and the sample response with calibration curves to determine the concentration of the one or more components of the subterranean fluid.

A twentieth embodiment can include the method of the nineteenth embodiment, wherein treating the sample further comprises treating the sample with a chemical additive that selectively alters the response of the MEMS device.

A twenty first embodiment can include the method of the twentieth embodiment, wherein the chemical additive comprises an acid, a base, an enzyme, an oxidizer, a reducer, and anti-oxidant, an oxygen scavenger, a free radical source, a free radical trap, a chemical reactant, a surfactant, a precipitant, a demulsifier, a flocculant, a deflocculant, or a combination thereof.

A twenty second embodiment can include the method of any one of the first to twenty first embodiments, wherein the sample of the subterranean fluid comprises a solids-reduced sample of the subterranean fluid, wherein the solids-reduced sample of the subterranean fluid comprises a reduced amount of solids relative to the subterranean fluid from which the sample is obtained.

A twenty third embodiment can include the method of the twenty second embodiment further comprising filtering the subterranean fluid from which the sample is obtained to provide the solids-reduced sample of the subterranean fluid.

A twenty fourth embodiment can include the method of any one of the first to twenty third embodiments further comprising carrying out the determining at least once every sampling time period, wherein the sampling time period is in a range of from 0.01 to 24 hours.

A twenty fifth embodiment can include the method of any one of the first to twenty fourth embodiments, wherein the sample response is provided via resonance frequency, heat, impedance, or a combination thereof within the MEMS device.

In a twenty sixth embodiment, a method of detecting and/or confirming a presence or absence of a fluid influx into a wellbore comprises: determining a concentration of one or more components of a subterranean fluid, wherein the one or more components are indicative of the fluid influx; and adjusting or maintaining at least one operating parameter of a wellbore servicing operation based on the determining of the concentration of the one or more components, wherein the subterranean fluid comprises a fluid obtained from a subterranean formation during the wellbore servicing operation, wherein the determining of the concentration of the one or more components comprises contacting a sample of the subterranean fluid with a microelectromechanical system (MEMS) device to provide a sample response indicative of the concentration of the one or more components.

In a twenty seventh embodiment, a wellbore servicing method for servicing a wellbore comprises: determining a concentration of one or more components of a subterranean fluid in one or more samples of the subterranean fluid; and adjusting or maintaining one or more operating parameters of the wellbore servicing based on the determining of the concentration of the one or more components in the one or more samples of the subterranean fluid, wherein the determining of the concentration of the one or more components comprises, for each of the one or more samples, contacting the sample of the subterranean fluid with a microelectromechanical system (MEMS) device to provide a sample response indicative of the concentration of the one or more components.

A twenty eighth embodiment can include the method of the twenty seventh embodiment, wherein the one or more samples comprise an uphole sample of the subterranean fluid taken along a flow path of the subterranean fluid above a surface of the wellbore; a downhole sample of the subterranean fluid taken along a flow path of the subterranean fluid below the surface of the wellbore; or a combination thereof.

A twenty ninth embodiment can include the method of the twenty eighth embodiment, wherein the adjusting or maintaining the one or more operating parameters based on the determining of the concentration of the one or more components is at least partially automated.

A thirtieth embodiment can include the method of any one of the twenty seventh to twenty ninth embodiments, wherein the determining the concentration of one or more components of the subterranean fluid in the one or more samples of the subterranean fluid is performed substantially in real time.

A thirty first embodiment can include the method of any one of the twenty seventh to thirtieth embodiments further comprising monitoring a trend in the determined concentration of one or more components of the subterranean fluid in the one or more samples of the subterranean fluid, and utilizing the monitoring of the trend in the adjusting or maintaining of the one or more operating parameters.

In a thirty second embodiment, a system for servicing a wellbore comprises: at least one microelectromechanical system (MEMS) device operable for determining a concentration of one or more components of a subterranean fluid via a sample response indicative of the concentration of the one or more components, wherein the sample response is obtained via contact of a sample of the subterranean fluid with the MEMS; and a feedback system operable to adjust or maintain one or more operating parameters of the servicing of the wellbore based on the determined concentration of the one or more components.

A thirty third embodiment can include the system of the thirty second embodiment, wherein the at least one MEMS device is located uphole or downhole.

A thirty fourth embodiment can include the system of any one of the thirty second or thirty third embodiments, comprising: a MEMS device configured for determining of the concentration of the one or more components at an uphole location on a sample of the subterranean fluid taken from an uphole volume of the subterranean fluid; a MEMS device configured for determining of the concentration of the one or more components at a downhole location on a sample of the subterranean fluid taken from a downhole volume of the subterranean fluid; or a combination thereof.

A thirty fifth embodiment can include the system of any one of the thirty second to thirty fourth embodiments, wherein the system provides substantially real time determining of the concentration of the one or more components of the subterranean fluid.

A thirty sixth embodiment can include the system of any one of the thirty second to thirty fifth embodiments, wherein the system is at least partially automated.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as includes, includes, having, etc. should be understood to provide support for narrower terms such as consisting of, consisting essentially of, included substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
   determining a concentration of one or more components of a subterranean fluid; and
   adjusting or maintaining at least one operating parameter of a wellbore servicing operation based on the determining of the concentration of the one or more components,
   wherein the subterranean fluid comprises a fluid obtained from a subterranean formation during the wellbore servicing operation, wherein the determining of the concentration of the one or more components comprises contacting a sample of the subterranean fluid with a microelectromechanical system (MEMS) device to provide a sample response indicative of the concentration of the one or more components;
   wherein the MEMS device comprises a sensor having microcantilever-based self-sensing array (SSA) technology;
   wherein the determining of the concentration of the one or more components is performed at a location below the surface of the wellbore, and wherein the sample is taken from a volume of the subterranean fluid below the surface of the wellbore;
   wherein the sample is taken via a focused sampling tool having a probe extendable from a body of the tool to contact a wall of the wellbore and obtain the sample of the subterranean fluid, wherein a fluid flow path extends from the probe into the body of the tool for transport of the sample from the probe into the body of the tool, and wherein the MEMS device is disposed within the flow path of the focused sampling tool to determine the concentration of the one or more components of a formation fluid sampled by the focused sampling tool.

2. The method of claim 1, wherein the subterranean fluid comprises a produced fluid, a formation fluid, a reservoir fluid, or a combination thereof.

3. The method of claim 1, wherein the one or more components comprise a hydrocarbon, a gas, or a combination thereof, returned to the surface with a returned wellbore servicing fluid.

4. The method of claim 3, wherein the gas comprises an acid gas, and wherein adjusting or maintaining the at least one operating parameter of the wellbore servicing operation comprises adjusting a weight of a wellbore servicing fluid being introduced into the wellbore, reducing a pumping rate of a wellbore servicing fluid being introduced into the wellbore, ceasing the pumping of the wellbore servicing fluid into the wellbore, and/or choking and pressurizing at the surface in advance of a kick, or a combination thereof.

5. The method of claim 3, wherein the one or more components comprise a hydrocarbon, and wherein adjusting or maintaining the at least one operating parameter of the wellbore servicing operation comprises adjusting an operating parameter relating to a treatment of the returned wellbore servicing fluid, adjusting a composition of the wellbore servicing fluid being introduced into the wellbore, or a combination thereof.

6. The method of claim 1, wherein the subterranean fluid comprises a formation fluid, and wherein the sample is a focused sample taken from a volume of the formation fluid below the surface of the wellbore.

7. A wellbore servicing method for servicing a wellbore, the method comprising:
   determining a concentration of one or more components of a subterranean fluid in one or more samples of the subterranean fluid; and
   adjusting or maintaining one or more operating parameters of the wellbore servicing based on the determining of the concentration of the one or more components in the one or more samples of the subterranean fluid,
   wherein the determining of the concentration of the one or more components comprises, for each of the one or more samples, contacting the sample of the subterranean fluid with a microelectromechanical system (MEMS) device to provide a sample response indicative of the concentration of the one or more components;
   wherein the MEMS device comprises a sensor having microcantilever-based self-sensing array (SSA) technology;
   wherein the determining of the concentration of the one or more components is performed at a location below the surface of the wellbore, and wherein the sample is taken from a volume of the subterranean fluid below the surface of the wellbore;
   wherein the sample is taken via a focused sampling tool having a probe extendable from a body of the tool to contact a wall of the wellbore and obtain the sample of the subterranean fluid, wherein a fluid flow path extends from the probe into the body of the tool for transport of the sample from the probe into the body of the tool, and wherein the MEMS device is disposed within the flow path of the focused sampling tool to determine the concentration of the one or more components of a formation fluid sampled by the focused sampling tool.

8. A system for servicing a wellbore, the system comprising:
   at least one microelectromechanical system (MEMS) device operable for determining a concentration of one or more components of a subterranean fluid via a sample response indicative of the concentration of the one or more components, wherein the sample response is obtained via contact of a sample of the subterranean fluid with the MEMS device; and
   a feedback system operable to adjust or maintain one or more operating parameters of the servicing of the wellbore based on the determined concentration of the one or more components; and
   a focused sampling tool having a probe extendable from a body of the tool to contact a wall of the wellbore and obtain the sample of the subterranean fluid, wherein a fluid flow path extends from the probe into the body of the tool for transport of the sample from the probe into the body of the tool;
   wherein the at least one MEMS device comprises a sensor having microcantilever-based self-sensing array (SSA) technology;
   wherein the at least one MEMS device includes a MEMS device configured for determining of the concentration of the one or more components at a location below the surface of the wellbore on a sample of the subterranean fluid taken from a volume of the subterranean fluid below the surface of the wellbore; and
   wherein the MEMS device is disposed within the flow path of the focused sampling tool to determine the concentration of the one or more components of a formation fluid sampled by the focused sampling tool.

9. A method comprising:
   determining a concentration of one or more components of a subterranean fluid; and
   adjusting or maintaining at least one operating parameter of a wellbore servicing operation based on the determining of the concentration of the one or more components,
   wherein the subterranean fluid comprises a fluid obtained from a subterranean formation during the wellbore servicing operation, wherein the determining of the concentration of the one or more components comprises contacting a sample of the subterranean fluid with a microelectromechanical system (MEMS) device to provide a sample response indicative of the concentration of the one or more components;
   wherein the MEMS device comprises a sensor having microcantilever-based self-sensing array (SSA) technology;
   wherein the determining of the concentration of the one or more components is performed at a location below the surface of the wellbore, and wherein the sample is taken from a volume of the subterranean fluid below the surface of the wellbore,
   wherein the subterranean fluid comprises a formation fluid, and wherein the sample is a focused sample taken from a volume of the formation fluid below the surface of the wellbore, and wherein the focused sample is obtained via a focused sampling system comprising:
   a sample line having a sample line inlet and a sample line outlet;
   a guard line having a guard line inlet and a guard line outlet;
   a common line having a common line inlet and a common line outlet, wherein the common line inlet is fluidly connected with the sample line outlet and the guard line outlet, and wherein the common line outlet is fluidly connected with a suction side inlet pump;
   the pump, wherein a discharge side outlet of the pump is fluidly connected with a discard line and a sampling line, wherein the sampling line is fluidly connected with one or more sample chambers;
   one or more fluid identification (ID) sensors positioned on the guard line, the sample line, the common line, or a combination thereof; and
   a flow restrictor operable to prevent flow of fluid from the guard line to the common line.

10. The method of claim 9, wherein the sensor comprises an array of microcantilevers with integrated piezoelectric sensing elements that provide electrical actuation and sensing of resonance frequency.

11. The method of claim 10, wherein the array of microcantilevers include, for each of the one or more components, one or more microcantilevers comprising a coating sensitive to an analyte specific to the each of the one or more components.

12. The method of claim 11, wherein the coating of at least a portion of the array of microcantilevers comprises a polymer.

13. The method of claim 9, wherein the determining of the concentration of the one or more components of the subterranean fluid further comprises:
   after contacting the sample with the MEMS device to provide the sample response, providing a treated sample by treating the sample to selectively alter a response of the MEMS device;
   contacting the treated sample with the MEMS device to provide a treated sample response; and
   utilizing a difference between the treated sample response and the sample response with calibration curves to determine the concentration of the one or more components of the subterranean fluid.

14. The method of claim 9, wherein the sample of the subterranean fluid comprises a solids-reduced sample of the subterranean fluid, wherein the solids-reduced sample of the subterranean fluid comprises a reduced amount of solids relative to the subterranean fluid from which the sample is obtained.

15. A wellbore servicing method for servicing a wellbore, the method comprising:
   determining a concentration of one or more components of a subterranean fluid in one or more samples of the subterranean fluid; and
   adjusting or maintaining one or more operating parameters of the wellbore servicing based on the determining of the concentration of the one or more components in the one or more samples of the subterranean fluid,
   wherein the determining of the concentration of the one or more components comprises, for each of the one or more samples, contacting the sample of the subterranean fluid with a microelectromechanical system (MEMS) device to provide a sample response indicative of the concentration of the one or more components;
   wherein the MEMS device comprises a sensor having microcantilever-based self-sensing array (SSA) technology; and
   wherein the determining of the concentration of the one or more components is performed at a location below the surface of the wellbore, and wherein the sample is taken from a volume of the subterranean fluid below the surface of the wellbore,
   wherein the subterranean fluid comprises a formation fluid, and wherein the sample is a focused sample taken from a volume of the formation fluid below the surface of the wellbore via a focused sampling system comprising:
   a sample line having a sample line inlet and a sample line outlet;
   a guard line having a guard line inlet and a guard line outlet;
   a common line having a common line inlet and a common line outlet, wherein the common line inlet is fluidly connected with the sample line outlet and the guard line outlet, and wherein the common line outlet is fluidly connected with a suction side inlet pump;
   the pump, wherein a discharge side outlet of the pump is fluidly connected with a discard line and a sampling line, wherein the sampling line is fluidly connected with one or more sample chambers;
   one or more fluid identification (ID) sensors positioned on the guard line, the sample line, the common line, or a combination thereof; and
   a flow restrictor operable to prevent flow of fluid from the guard line to the common line.

16. The method of claim 15, wherein the adjusting or maintaining the one or more operating parameters based on the determining of the concentration of the one or more components is at least partially automated, and/or, wherein the determining the concentration of one or more components of the subterranean fluid in the one or more samples of the subterranean fluid is performed substantially in real time.

17. The method of claim 15 further comprising monitoring a trend in the determined concentration of one or more components of the subterranean fluid in the one or more samples of the subterranean fluid, and utilizing the monitoring of the trend in the adjusting or maintaining of the one or more operating parameters.

18. A system for servicing a wellbore, the system comprising:
at least one microelectromechanical system (MEMS) device operable for determining a concentration of one or more components of a subterranean fluid via a sample response indicative of the concentration of the one or more components, wherein the sample response is obtained via contact of a sample of the subterranean fluid with the MEMS device; and
a feedback system operable to adjust or maintain one or more operating parameters of the servicing of the wellbore based on the determined concentration of the one or more components,
wherein the at least one MEMS device comprises a sensor having microcantilever-based self-sensing array (SSA) technology;
wherein the at least one MEMS device includes a MEMS device configured for determining of the concentration of the one or more components at a location below the surface of the wellbore on a sample of the subterranean fluid taken from a volume of the subterranean fluid below the surface of the wellbore, and
wherein the subterranean fluid comprises a formation fluid, and wherein the sample is a focused sample taken from a volume of the formation fluid below the surface of the wellbore via a focused sampling system comprising:
a sample line having a sample line inlet and a sample line outlet;
a guard line having a guard line inlet and a guard line outlet;
a common line having a common line inlet and a common line outlet, wherein the common line inlet is fluidly connected with the sample line outlet and the guard line outlet, and wherein the common line outlet is fluidly connected with a suction side inlet pump;
the pump, wherein a discharge side outlet of the pump is fluidly connected with a discard line and a sampling line, wherein the sampling line is fluidly connected with one or more sample chambers;
one or more fluid identification (ID) sensors positioned on the guard line, the sample line, the common line, or a combination thereof; and
a flow restrictor operable to prevent flow of fluid from the guard line to the common line.

19. The system of claim 18 wherein:
the at least one MEMS device further includes a MEMS device configured for determining of the concentration of the one or more components at a location above a surface of the wellbore on a sample of the subterranean fluid taken from a volume of the subterranean fluid above the surface of the wellbore.

20. The system of claim 18, wherein the system provides substantially real time determining of the concentration of the one or more components of the subterranean fluid, and/or wherein the system is at least partially automated.

* * * * *

UNITED STATES PATENT AND TRADEMARK OFFICE
CERTIFICATE OF CORRECTION

PATENT NO. : 11,255,189 B2  
APPLICATION NO. : 16/879170  
DATED : February 22, 2022  
INVENTOR(S) : Jamison et al.

Page 1 of 1

It is certified that error appears in the above-identified patent and that said Letters Patent is hereby corrected as shown below:

In the Specification

Column 23, Line 45, replace "3853" with --385B'--.  
Column 23, Line 48, replace "3853" with --385B'--.  
Column 23, Line 67, replace "3853" with --385B'--.  
Column 24, Line 7, replace "3853" with --385B'--.

Signed and Sealed this  
Seventeenth Day of May, 2022

Katherine Kelly Vidal  
*Director of the United States Patent and Trademark Office*